(12) United States Patent
Ho et al.

(10) Patent No.: US 10,775,183 B2
(45) Date of Patent: Sep. 15, 2020

(54) SYSTEM AND METHOD FOR ROUTING IN A RIDE-SHARE TRANSPORTATION NETWORK

(71) Applicant: rideOS, Inc., San Francisco, CA (US)

(72) Inventors: Justin Ho, San Francisco, CA (US); Christopher Blumenberg, San Francisco, CA (US); Billy Chen, San Francisco, CA (US); Rohan Paranjpe, San Francisco, CA (US); Christopher Moore, San Francisco, CA (US); Min Ji Lee, San Francisco, CA (US); Erik Reed, San Francisco, CA (US); Michel Tricot, San Francisco, CA (US)

(73) Assignee: rideOS, Inc., San Francisco, CA (US)

( * ) Notice: Subject to any disclaimer, the term of this patent is extended or adjusted under 35 U.S.C. 154(b) by 0 days.

(21) Appl. No.: 16/599,086

(22) Filed: Oct. 10, 2019

(65) Prior Publication Data
US 2020/0080856 A1 Mar. 12, 2020

Related U.S. Application Data

(63) Continuation of application No. PCT/US2018/056740, filed on Oct. 19, 2018, which
(Continued)

(51) Int. Cl.
*G01C 21/34* (2006.01)
*G06Q 50/30* (2012.01)
(Continued)

(52) U.S. Cl.
CPC ..... *G01C 21/3453* (2013.01); *G01C 21/3461* (2013.01); *G01C 21/3492* (2013.01);
(Continued)

(58) Field of Classification Search
CPC .................. G01C 21/3453; G01C 21/3461
See application file for complete search history.

(56) References Cited

U.S. PATENT DOCUMENTS

| | | | |
|---|---|---|---|
| 6,975,940 B1 * | 12/2005 | Childs | G01C 21/005 340/995.19 |
| 10,156,452 B2 * | 12/2018 | Thangaraj | G01C 21/3438 |

(Continued)

OTHER PUBLICATIONS

Ho, Office Action, U.S. Appl. No. 16/164,708, dated Feb. 15, 2019, 17 pgs.
(Continued)

*Primary Examiner* — Jess Whittington
(74) *Attorney, Agent, or Firm* — Morgan, Lewis & Bockius LLP

(57) ABSTRACT

A method includes storing representations of a passengers and fleet vehicles. The method includes generating a graph representation of a geographic map that includes requested pick-up locations and drop-off locations for the passengers and generating a state graph representation of the passengers and the fleet vehicles. The state graph representation includes a plurality of nodes connected by edges. Each of the plurality of nodes represents a candidate state of the passengers and the fleet vehicles. A respective edge of the state graph representation represents an action of a respective vehicle picking up or dropping off a passenger. The respective edge has a cost that is based at least in part on traversal of the graph representation of the geographic map. The method further includes using the state graph representation to generate a set of routes and route the fleet vehicles in accordance with the generated set of routes.

13 Claims, 30 Drawing Sheets

Related U.S. Application Data is a continuation of application No. 16/164,708, filed on Oct. 18, 2018.

(60) Provisional application No. 62/740,882, filed on Oct. 3, 2018, provisional application No. 62/685,106, filed on Jun. 14, 2018, provisional application No. 62/599,610, filed on Dec. 15, 2017, provisional application No. 62/574,737, filed on Oct. 19, 2017.

(51) Int. Cl.
*G06Q 10/06* (2012.01)
*G06Q 10/04* (2012.01)
*G06Q 30/02* (2012.01)
*G05D 1/00* (2006.01)

(52) U.S. Cl.
CPC ........... *G06Q 10/04* (2013.01); *G06Q 10/063* (2013.01); *G06Q 30/0284* (2013.01); *G06Q 50/30* (2013.01); *G05D 1/0088* (2013.01); *G05D 2201/0213* (2013.01)

(56) References Cited

U.S. PATENT DOCUMENTS

| | | | | |
|---|---|---|---|---|
| 10,248,913 | B1* | 4/2019 | Gururajan | G06Q 50/30 |
| 2006/0276960 | A1* | 12/2006 | Adamczyk | G06Q 10/06 |
| | | | | 701/516 |
| 2007/0014488 | A1 | 1/2007 | Chen et al. | |
| 2011/0141138 | A1 | 6/2011 | Geelen et al. | |
| 2011/0301843 | A1 | 12/2011 | Gale et al. | |
| 2013/0158869 | A1* | 6/2013 | Lerenc | G01C 21/3438 |
| | | | | 701/527 |
| 2013/0297207 | A1 | 11/2013 | Mason et al. | |
| 2014/0132608 | A1 | 5/2014 | Mund et al. | |
| 2015/0161554 | A1* | 6/2015 | Sweeney | G06Q 50/30 |
| | | | | 705/7.15 |
| 2015/0177011 | A1* | 6/2015 | Ibrahimi | G01C 21/343 |
| | | | | 701/465 |
| 2015/0338226 | A1 | 11/2015 | Mason et al. | |
| 2015/0339923 | A1 | 11/2015 | König et al. | |
| 2016/0167652 | A1 | 6/2016 | Slusar | |
| 2016/0209845 | A1 | 7/2016 | Kojo | |
| 2016/0307348 | A1 | 10/2016 | Yang et al. | |
| 2017/0010613 | A1 | 1/2017 | Fukumoto | |
| 2017/0169366 | A1* | 6/2017 | Klein | G06Q 50/30 |
| 2017/0192437 | A1 | 7/2017 | Bier et al. | |
| 2017/0219364 | A1 | 8/2017 | Lathrop et al. | |
| 2017/0261984 | A1 | 9/2017 | Ichikawa et al. | |
| 2017/0267256 | A1 | 9/2017 | Minster et al. | |
| 2017/0363433 | A1 | 12/2017 | Tennent et al. | |
| 2018/0052000 | A1 | 2/2018 | Larner et al. | |
| 2018/0059687 | A1 | 3/2018 | Hayes et al. | |
| 2018/0061230 | A1 | 3/2018 | Madigan et al. | |
| 2018/0065485 | A1 | 3/2018 | Koebler et al. | |
| 2018/0126901 | A1 | 5/2018 | Levkova et al. | |
| 2018/0143029 | A1 | 5/2018 | Nikulin et al. | |
| 2018/0143639 | A1 | 5/2018 | Singhal et al. | |
| 2018/0164825 | A1 | 6/2018 | Matus et al. | |
| 2018/0172462 | A1 | 6/2018 | De Nunzio et al. | |
| 2018/0202822 | A1 | 7/2018 | DeLizio | |
| 2018/0209801 | A1 | 7/2018 | Stentz et al. | |
| 2018/0304901 | A1 | 10/2018 | Duan et al. | |
| 2018/0315146 | A1 | 11/2018 | Matthiesen et al. | |
| 2018/0322775 | A1 | 11/2018 | Chase et al. | |
| 2018/0341880 | A1 | 11/2018 | Kislovskiy et al. | |
| 2018/0341895 | A1 | 11/2018 | Kislovskiy et al. | |
| 2018/0342113 | A1 | 11/2018 | Kislovskiy et al. | |
| 2018/0356830 | A1 | 12/2018 | Haghighat et al. | |
| 2018/0366004 | A1 | 12/2018 | Laetz | |
| 2019/0003846 | A1 | 1/2019 | Limber | |
| 2019/0107403 | A1 | 4/2019 | Takeuchi et al. | |
| 2019/0113353 | A1 | 4/2019 | Shimizu et al. | |
| 2019/0120643 | A1 | 4/2019 | Schmell et al. | |

OTHER PUBLICATIONS

Ho, Final Office Action, U.S. Appl. No. 16/164,708, dated Jun. 7, 2019, 21 pgs.

Ho, Office Action, U.S. Appl. No. 16/164,708, dated Oct. 2, 2019, 18 pgs.

Ho, Notice of Allowance, U.S. Appl. No. 16/597,801, dated Dec. 11, 2019, 10 pgs.

Rideos, International Search Report and Written Opinion, PCT/US2018/056740, dated Jan. 4, 2019, 9 pgs.

Ho, Office Action, U.S. Appl. No. 16/794,058, dated Apr. 7, 2020, 18 pgs.

Ho, Notice of Allowance, U.S. Appl. No. 16/794,058, dated May 20, 2020, 6 pgs.

Rideos, International Search Report and Written Opinion, PCT/US2020/028125, dated Jul. 2, 2020, 16 pgs.

\* cited by examiner

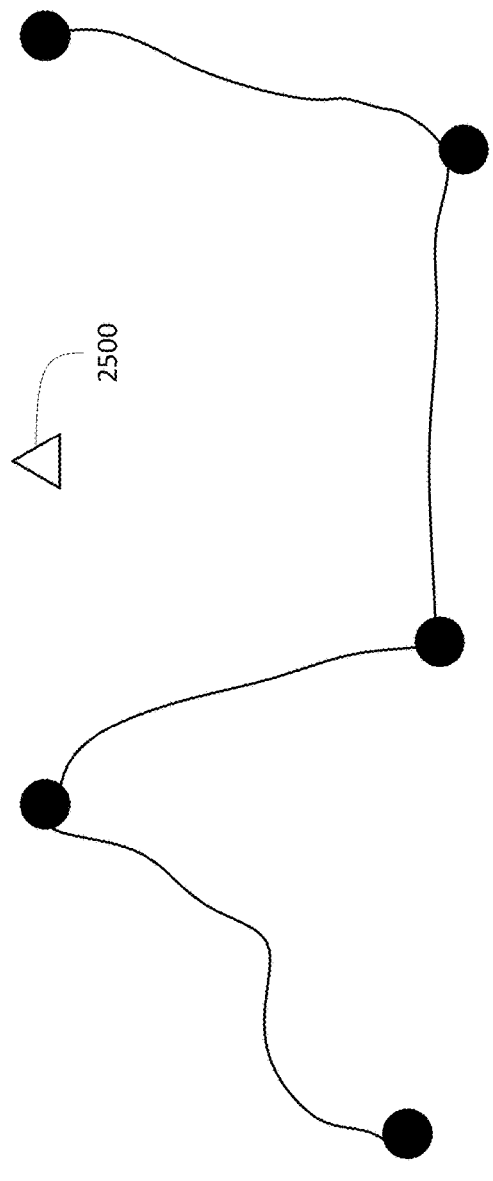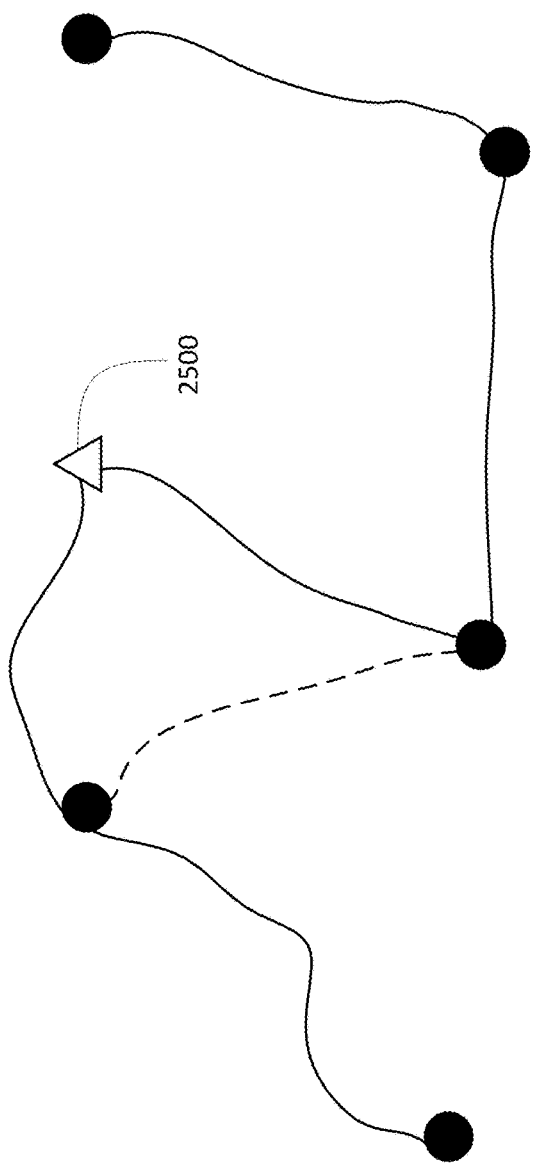
FIG. 25A
FIG. 25B

2600

| 2602 | Store representations of a plurality of first passengers. Each of the representations of the plurality of first passengers includes a requested pick-up location and a requested drop-off location for a respective first passenger of the plurality of first passengers. |

| 2604 | Store representations of a plurality of fleet vehicles |
| 2606 | The fleet vehicles include a plurality of autonomous vehicles |
| 2608 | The plurality of fleet vehicles is operated by a single operator |

| 2610 | Generate a graph representation of a geographic map that includes the requested pick-up locations and drop-off locations for the plurality of first passengers. |

| 2612 | Generate a state graph representation of the plurality of first passengers and the fleet vehicles.

The state graph representation includes a plurality of nodes connected by edges.

Each node of the plurality of nodes of the state graph representation represents a candidate state of the plurality of first passengers and the fleet vehicles.

A respective edge of the state graph representation represents an action of a respective vehicle picking up or dropping off a passenger.

The respective edge has a cost that is based at least in part on traversal of the graph representation of the geographic map. |

FIG. 26A

SYSTEM AND METHOD FOR ROUTING IN A RIDE-SHARE TRANSPORTATION NETWORK

RELATED APPLICATIONS

This application claims is a continuation of PCT Application PCT/US2018/056740, filed Oct. 19, 2018, entitled "Autonomous Vehicle Routing," which is a continuation of U.S. application Ser. No. 16/164,708 filed Oct. 18, 2018, entitled "Autonomous Vehicle Routing," which claims priority to U.S. Provisional Application No. 62/740,882 filed Oct. 3, 2018, entitled "Autonomous Vehicle Routing"; U.S. Provisional Application No. 62/685,106 filed Jun. 14, 2018, entitled "Autonomous Vehicle Routing"; U.S. Provisional Application No. 62/599,610 filed Dec. 15, 2017, entitled "Autonomous Vehicle Routing"; and U.S. Provisional Application No. 62/574,737 filed Oct. 19, 2017, entitled "Autonomous Vehicle Routing," each of which is incorporated herein by reference in its entirety.

TECHNICAL FIELD

The disclosed embodiments relate generally to routing autonomous vehicles.

BACKGROUND

In the coming years, autonomous vehicle (AV) technology will overcome the present challenges in motion planning and control. For example, autonomous vehicles will be able to stay in lanes, follow cars, avoid pedestrians and drive like a taxi driver patrolling the streets. Autonomous vehicles will need only to be told where to go and how to get there, making route planning critical in the AV-driven world.

Thus, as developers build core autonomy technology and start to scale their fleets of self-driving vehicles, whether for sale to individual consumers or for starting their own ride-sharing networks, they will need effective routing technology. The winners and losers in this race will be determined by which companies operate the most efficient networks with the highest vehicle utilization.

SUMMARY (A1) A method of routing an autonomous vehicle is provided. The method is performed at a computer system including one or more processors and memory. The method includes generating a cost model for routing the autonomous vehicle. The cost model includes one or more costs other than travel time, the one or more costs other than travel time selected from the group consisting of: a cost of traversing an area where autonomous driving is prohibited, a cost of a driving maneuver, a cost of a characteristic of the autonomous vehicle, a cost of a weather condition, a cost of a time of day, a cost of a sunlight angle, a cost of a pedestrian traffic pattern, a cost of a non-motorized vehicle traffic pattern, a cost of a pavement condition, a cost of a road age, a cost of an event present at the time of a routing request, a cost of a road lacking lane lines, a cost of an electric-charging constraint, and a cost of acceleration. The method further includes receiving a request to route the autonomous vehicle from a first location to a second location. The method includes, in response to the request to route the autonomous vehicle, selecting a route from the first location to the second location in accordance with the cost model and routing the autonomous vehicle along the selected route.

(A2) In some embodiments of (A1), the cost model is generated in response to the request to route the autonomous vehicle.

(A3) In some of the embodiments of any of (A1)-(A2), the cost model is a first cost model for the autonomous vehicle. The method includes receiving a request to route a non-autonomous vehicle from a third location to a fourth location. The method further includes generating a second cost model for routing the non-autonomous vehicle. The second cost model is distinct from the first cost model and does not include one or more of the costs other than travel time that are included in the first cost model. The method further includes, in response to the request to route the non-autonomous vehicle: selecting a route from the third location to the fourth location in accordance with the second cost model and routing the non-autonomous vehicle along the selected route for the non-autonomous vehicle.

(A4) In some of the embodiments of any of (A1)-(A3), the autonomous vehicle is a first autonomous vehicle having first autonomous driving capabilities. The cost model is a first cost model for the first autonomous vehicle. The one or more costs other than travel time for the first cost model include a cost corresponding to the first autonomous driving capabilities. The method includes receiving a request to route a second autonomous vehicle from a fifth location to a sixth location. The second autonomous vehicle has second autonomous driving capabilities different from the first autonomous driving capabilities. The method further includes generating a third cost model for routing the second autonomous vehicle. The third cost model is distinct from the first cost model and includes a cost corresponding to the second autonomous driving capabilities. The method further includes, in response to the request to route the second autonomous vehicle: selecting a route from the fifth location to the sixth location in accordance with the second cost model and routing the second autonomous vehicle along the selected route for the second autonomous vehicle.

(A5) In some of the embodiments of any of (A1)-(A4), the cost model further includes a travel-time cost and the route is selected in accordance with both the travel-time cost and the one or more costs other than travel time.

(A6) In some of the embodiments of any of (A1)-(A5), the one or more costs other than travel time include the cost of an event present at the time of the routing request and the event present at the time of the routing request is a construction project or a traffic accident.

(A7) In some of the embodiments of any of (A1)-(A6), the one or more costs other than travel time include the cost of an event present at the time of the routing request, the event present at the time of the routing request is a regularly-scheduled event, and the selecting the route is performed based at least in part on the cost of the regularly-scheduled event, in accordance with a determination that the regularly-scheduled event is occurring at the time of the routing request.

(A8) In some of the embodiments of any of (A1)-(A6), the one or more costs other than travel time include the cost of an event present at the time of the routing request, the event present at the time of the routing request is a regularly-scheduled event, and selecting the route is performed based at least in part on the cost of the regularly-scheduled event, in accordance with a determination that the regularly-scheduled event will be occurring at a time when the autonomous vehicle is expected to reach the regularly-scheduled event.

(A9) In some of the embodiments of any of (A1)-(A8), the driving maneuver is selected from the group consisting of a lane change, a right turn, a left turn, an unprotected left turn, a U-turn, and a highway merge.

(A10) In some of the embodiments of any of (A1)-(A9), the one or more costs other than travel time include the cost of a characteristic of the autonomous vehicle and the characteristic of the autonomous vehicle is a vehicle type.

(A11) In some of the embodiments of any of (A1)-(A10), the one or more costs other than travel time include the cost of a characteristic of the autonomous vehicle and the characteristic of the autonomous vehicle is an autonomous driving capability of the autonomous vehicle.

(A12) In some of the embodiments of any of (A1)-(A11), at least one of the one or more costs other than travel time is a cost for a particular geographical area, road, lane within a road, or maneuver.

(A13) In some of the embodiments of any of (A1)-(A12), the one or more costs other than travel time include, for a plurality of different roads, a plurality of distinct road-specific costs for a shared weather condition at the different roads.

(A14) In some of the embodiments of any of (A1)-(A13), the one or more costs other than travel time include, for a plurality of different roads, a plurality of distinct road-specific costs for different weather conditions at the different roads.

(A15) In some of the embodiments of any of (A1)-(A14), the one or more costs other than travel time include a plurality of distinct road-specific costs of the time of day for different roads.

(A16) In some of the embodiments of any of (A1)-(A15), the one or more costs other than travel time include a plurality of distinct road-specific costs of the sunlight angle for different roads.

(B1) A method of routing an autonomous vehicle is provided. The method is performed at a computer system including one or more processors and memory. The method includes receiving a request to route the autonomous vehicle from a first location to a second location, identifying a set of one or more autonomous driving capabilities of the autonomous vehicle, selecting a route from the first location to the second location in accordance with the set of one or more autonomous driving capabilities of the autonomous vehicle, and routing the autonomous vehicle in accordance with the selected route.

(B2) In some of the embodiments of (B1), the autonomous vehicle is a first autonomous vehicle. The method includes receiving a request to route a second autonomous vehicle from a third location to a fourth location. The method further includes identifying a set of one or more autonomous driving capabilities of the second autonomous vehicle, wherein the set of one or more autonomous driving capabilities of the second autonomous vehicle include at least one autonomous driving capability different from the set of one or more autonomous driving capabilities of the first autonomous vehicle. The method further includes selecting a route from the third location to the fourth location in accordance with the set of one or more autonomous driving capabilities of the second autonomous vehicle and routing the second autonomous vehicle in accordance with the selected route for the second autonomous vehicle.

(B3) In some of the embodiments of any of (B1)-(B2), identifying the set of one or more autonomous driving capabilities of the autonomous vehicle includes receiving an autonomous driving capability with the request.

(B4) In some of the embodiments of any of (B1)-(B3), the method further includes, at the computer system, receiving, with the request to route the autonomous vehicle, an identifier for the autonomous vehicle. The identifying comprises looking up one or more autonomous driving capabilities of the autonomous vehicle based on the identifier.

(B5) In some of the embodiments of any of (B1)-(B4), the method further includes, at the computer system, generating a cost model for routing the autonomous vehicle that includes one or more costs for the set of one or more autonomous driving capabilities of the autonomous vehicle. The selecting comprises selecting the route from the first location to the second location based at least in part on the cost model.

(B6) In some of the embodiments of any of (B1)-(B5), the set of one or more autonomous driving capabilities of the autonomous vehicle includes a capability of sensors of the autonomous vehicle.

(B7) In some of the embodiments of any of (B1)-(B6), the set of one or more autonomous driving capabilities of the autonomous vehicle includes a maneuverability of the autonomous vehicle.

(B8) In some of the embodiments of any of (B1)-(B7), the set of one or more autonomous driving capabilities of the autonomous vehicle includes a limitation on the autonomous vehicle determined from historical performance data for at least one of the autonomous vehicle and vehicles of a same type as the autonomous vehicle.

(B9) In some of the embodiments of any of (B1)-(B8), the set of one or more autonomous driving capabilities of the autonomous vehicle includes a safety rating for the autonomous vehicle and the selecting is performed based at least in part on the safety rating of the autonomous vehicle.

(B10) In some of the embodiments of any of (B1)-(B9), the set of one or more autonomous driving capabilities of the autonomous vehicle includes a plurality of autonomous driving capabilities of the autonomous vehicle and the selecting is performed based at least in part on the plurality of autonomous driving capabilities of the autonomous vehicle.

(C1) A method of routing an autonomous vehicle is provided. The method is performed at a computer system including one or more processors and memory. The method includes generating a cost model for routing the autonomous vehicle. The cost model includes, for an intersection, a plurality of costs for traversing distinct paths through the intersection. The method includes receiving a request to route the autonomous vehicle from a first location to a second location. The method includes, in response to the request to route the autonomous vehicle, selecting a route from the first location to the second location in accordance with the cost model. The selecting is based at least in part on one of the plurality of costs for traversing the distinct paths through the intersection. The method includes routing the autonomous vehicle in accordance with the selected route.

(C2) In some of the embodiments of (C1), the cost model is represented as a graph of nodes and edges, the respective edges having respective edge weights that represent costs. In some embodiments, the method further comprises, at the computer system, representing the intersection as a plurality of nodes and a plurality of edges having edge weights. Each edge of the representation of the intersection represents a distinct path through the intersection.

(C3) In some of the embodiments of (C2), the method further includes, at the computer system, forgoing representation of a forbidden path through the intersection.

(C4) In some of the embodiments of any of (C1)-(C3), the intersection is an intersection of a plurality of roads, each road in the plurality of roads having one or more costs distinct from the plurality of costs for traversing the distinct paths through the intersection.

(C5) In some of the embodiments of any of (C1)-(C4), the plurality of costs for traversing the distinct paths through the intersection include one or more costs of a driving maneuver for traversing one of the distinct paths through the intersection.

(C6) In some of the embodiments of (C5), the driving maneuver is selected from the group consisting of a lane change, a right turn, a left turn, an unprotected left turn, a U-turn, and a highway merge.

(D1) A method of routing an autonomous vehicle is provided. The method is performed at a computer system including one or more processors and memory. The method includes receiving information obtained from a camera on a second vehicle distinct from the autonomous vehicle, automatically identifying a road condition using image analysis of the information received from the camera on the second vehicle and receiving a request to route the autonomous vehicle from a first location to a second location. The method further includes, in response to the request, generating a cost model for routing the autonomous vehicle. The cost model includes a cost of the road condition automatically identified from the information received from the camera on the second vehicle. The method includes selecting a route from the first location to the second location in accordance with the cost model and routing an autonomous vehicle in accordance with the selected route.

(D2) In some of the embodiments of (D1), generating the cost model includes updating a previous cost model in response to the request.

(D3) In some of the embodiments of any of (D1)-(D2), the method includes, at the computer system, determining whether the road condition is present at the time of the request. In some embodiments, the cost of the road condition is included in the cost model in accordance with a determination that the road condition is present at the time of the request.

(D4) In some of the embodiments of any of (D1)-(D3), the road condition automatically identified from the information received from the camera on the second vehicle is a condition selected from the group consisting of: a weather condition, a road condition due to weather, a road condition due to construction, and a road condition due to a traffic accident.

(D5) In some of the embodiments of any of (D1)-(D3), the road condition automatically identified from the information received from the camera on the second vehicle is a condition selected from the group consisting of a sunlight angle, pedestrian traffic, non-motorized vehicle traffic, a pavement condition, and a lack of lane lines.

(D6) In some of the embodiments of any of (D1)-(D5), the camera is a dashcam.

(E1) A routing method for a ride-share transportation network is provided. The method includes storing representations of a plurality of first passengers. Each of the representations of the plurality of first passengers includes a requested pick-up location and a requested drop-off location for a respective first passenger of the plurality of first passengers.

The method further includes storing representations of a plurality of fleet vehicles. The method further includes generating a graph representation of a geographic map that includes the requested pick-up locations and drop-off locations for the plurality of first passengers. The method further includes generating a state graph representation of the plurality of first passengers and the fleet vehicles. The state graph representation includes a plurality of nodes connected by edges. Each node of the plurality of nodes of the state graph representation represents a candidate state of the plurality of first passengers and the fleet vehicles. A respective edge of the state graph representation represents an action of a respective vehicle picking up or dropping off a passenger. The respective edge has a cost that is based at least in part on traversal of the graph representation of the geographic map. The method further includes generating a set of routes for the fleet vehicles, including assigning each passenger of the plurality of first passengers to be picked up and dropped off by a respective vehicle of the fleet vehicles. The routes for the fleet vehicles are generated by performing a graph search of the state graph representation by evaluating a cost model that includes the costs of the respective edges. The method further includes routing the fleet vehicles in accordance with the generated set of routes.

(E2) In some of the embodiments of (E1), the fleet vehicles include a plurality of autonomous vehicles.

(E3) In some of the embodiments of any of (E1)-(E2), the plurality of fleet vehicles is operated by a single operator.

(E4) In some of the embodiments of any of (E1)-(E3), the method includes receiving a ride request from a second passenger, distinct from the plurality of first passengers, wherein the request includes a requested pick-up location and a requested drop-off location for the second passenger. The method further includes updating the route for a respective vehicle of the fleet vehicles, including assigning the second passenger to be picked up and dropped off by the respective vehicle, in accordance with one or more least-expensive-insertion criteria.

(E5) In some of the embodiments of (E4), updating the route for the respective vehicle of the fleet vehicles includes inserting a pick-up location and a drop-off location for the second passenger into an existing route for the respective vehicle without modifying pick-up and drop-off locations for passengers already assigned to the respective vehicle.

(E6) In some of the embodiments of (E4), updating the route for the respective vehicle of the fleet vehicles includes: inserting a pick-up location and a drop-off location for the second passenger into an existing route for the respective vehicle and reassigning a passenger already assigned to the respective vehicle to a different vehicle of the fleet vehicles.

(E7) In some of the embodiments of any of (E1)-(E6), generating the set of routes for the fleet vehicles includes: assigning each passenger of the first plurality of passengers to one or more candidate pick-up locations based on the first passenger's requested pick-up location; assigning each passenger of the first plurality of passengers to one or more candidate drop-off locations based on the first passenger's requested drop-off location; clustering the first plurality of passengers according to their assigned candidate pick-up locations and drop-off locations; assigning respective vehicles of the fleet vehicles to a plurality of clusters; and parallelizing the routing of the fleet vehicles according the assigned plurality of clusters for the respective vehicles of the fleet vehicles.

(E8) In some of the embodiments of (E7), the method further includes receiving a ride request from a second passenger, distinct from the plurality of first passengers. The request includes a requested pick-up location and a requested drop-off location for the second passenger. The method further includes updating the route for a respective vehicle of the fleet vehicles, including assigning the second passenger to be picked up and dropped off by the respective vehicle, by assigning the second passenger to an existing cluster and updating the route for the vehicle assigned to the existing cluster.

(E9) In some of the embodiments of any of (E1)-(E8), performing the graph search includes limiting a number of states explored in the state graph representation using a lowest-bound heuristic by forgoing subsequent exploration from any nodes in the state graph representation for which a lowest-bound of the cost function exceeds a cost of an already-determined set of routes for the fleet vehicles.

(E10) In some of the embodiments of any of (E1)-(E9), the cost model includes pick-up wait times for the first passengers.

(E11) In some of the embodiments of any of (E1)-(E10), the graph search is a bi-directional search.

Some embodiments of the present disclosure provide a computer system (e.g., a server system), comprising one or more processors and memory storing one or more programs. The one or more programs store instructions that, when executed by the one or more processors, cause the computer system to perform any of the methods described here Some embodiments of the present disclosure provide an autonomous vehicle. The autonomous vehicle includes a computer system, comprising one or more processors and memory storing one or more programs. The one or more programs store instructions that, when executed by the one or more processors, cause the one or more processors to perform any of the methods described herein.

Some embodiments of the present disclosure provide a non-transitory computer readable storage medium storing instructions that, when executed by a computer system having one or more processors, cause the computer system to perform any of the methods described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The embodiments disclosed herein are illustrated by way of example, and not by way of limitation, in the figures of the accompanying drawings. Like reference numerals refer to corresponding parts throughout the drawings.

FIGS. 25A-25B are two-dimensional spatial representations illustrating the addition of an insertion point to an existing route, in accordance with some embodiments.

FIGS. 26A-26C are a flowchart of a routing method for a ride-share transportation network, in accordance with some embodiments.

DETAILED DESCRIPTION

Figure 1:
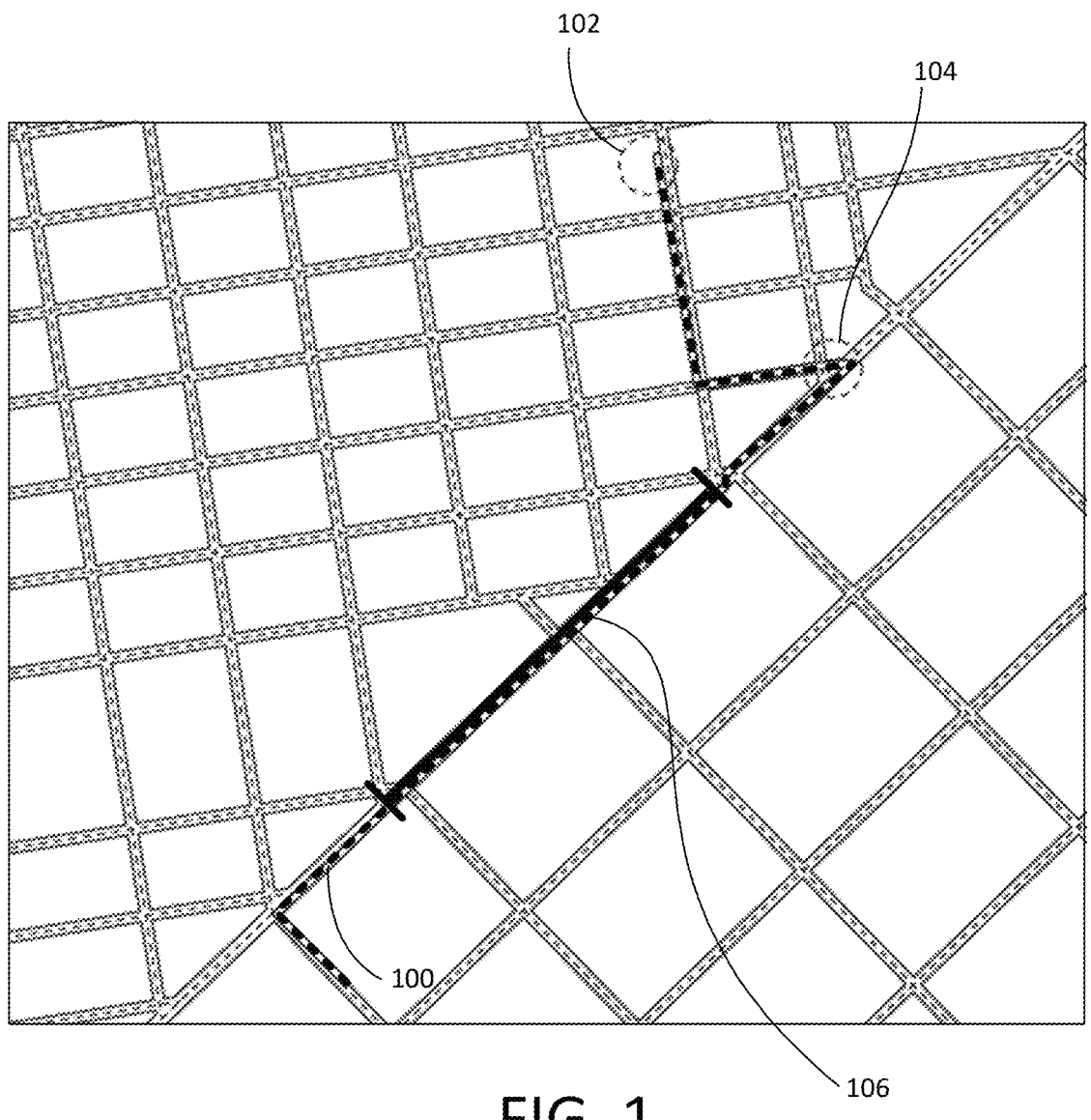
FIG. 1 is a two-dimensional map showing an example of a conventional (non-autonomous vehicle) route.

Autonomous vehicles are not able to robustly handle every situation they may encounter on the road. To address this problem, the present disclosure provides routing devices and methods that take into account AV-focused requirements and constraints (e.g., requirements and constraints that are particularly, although possibly not exclusively, important to autonomous vehicles). These methods and devices improve autonomous vehicles by avoiding situations they cannot handle or may have difficulty handling. By allowing autonomous vehicles to avoid such situations, the routing devices and methods described herein make autonomous vehicles safer for passengers and pedestrians, perhaps even saving lives, and may make riding in autonomous vehicles more comfortable as well.

The present disclosure provides methods and devices that use cost models in vehicle routing (e.g., autonomous vehicle routing). As used herein, the term "cost model," in the context of vehicle routing, means an assignment or schedule of "costs" associated with aspects of a trip (i.e., the trip being routed). The costs in the cost model need not be, and generally are not, financial costs. For example, in accordance with some embodiments, the cost models provided herein use travel time costs, costs of a passenger waiting to be picked-up, safety costs (e.g., costs of an autonomous vehicle making an unprotected left turn), and many others. In some embodiments, the overall cost of a route is the sum of all of the individual costs of that route (e.g., the sum of all of costs of respective aspects of the route for which costs have been assigned). Generally speaking, routes with lower costs are preferentially selected over routes with higher costs. Thus, for example, assigning a higher cost to an unprotected left turn means that the systems and methods provided herein will generate routes with fewer unprotected left turns. As another example, assigning a higher cost to a passenger waiting to be picked-up will result in shorter wait times for passengers to be picked up, even if that means a longer amount of time spent in the vehicle or having the vehicle make more unprotected left turns. Stated another way, the cost model described herein use numerical costs to weight relative preferences of various aspects of a potential routes.

To that end, some embodiments provide autonomous-vehicle (AV)-focused methods and devices that account for (e.g., optimize for) costs other than time and distance, taking into account, for example, different weights for human-intervention zone transitions, weather, and pedestrian zones. Also, the operation of autonomous vehicles benefits from high definition (HD) and lane-level maps. Such HD map coverage will, however, increase incrementally. The present disclosure bridges the gap by providing routing methods and devices that provide hybrid routes where a safety driver can take over in a regular road network and allow the autonomous vehicle to drive itself when HD map data is available.

For example, a conventional (non-AV) routing method might create the route shown in FIG. 1.

From an autonomous vehicle standpoint, there are numerous problems with this route. The route does not consider which maneuvers are safe for an autonomous vehicle or consider AV-safe pickup and drop-off points. For example, the route 100 (e.g., the bolded dashed lines) includes drop-off point 102, which is not considered an AV-safe drop-off point. The route 100 also includes intersection 104. The intersection 104 creates an illegal AV maneuver point (e.g., to make a left turn). Thus, the route is not customized based on the constraints of a particular autonomous vehicle. The route does nothing to prefer autonomous-vehicle zones (e.g., avoid human-only zones), reduce the number of human interventions that are necessary, or maximize the amount of time that the vehicle operates autonomously. For example, the route 100 also includes a human intervention zone 106.

Additionally, a route generated from a conventional routing engine is not usually represented in a format that autonomous vehicles can use (e.g., a route geometry is typically along the center of the road). For example, in a bidirectional road, the centerline goes along the lane line dividing opposing traffic. Because autonomous vehicles drive in lanes, they may need their routes defined in terms of those lanes. Techniques that attempt to "map match" a road-centered route to a lane-centered map are prone to matching error, especially at intersections, where the road geometry often does not correspond to the lane geometry.

Figure 2:
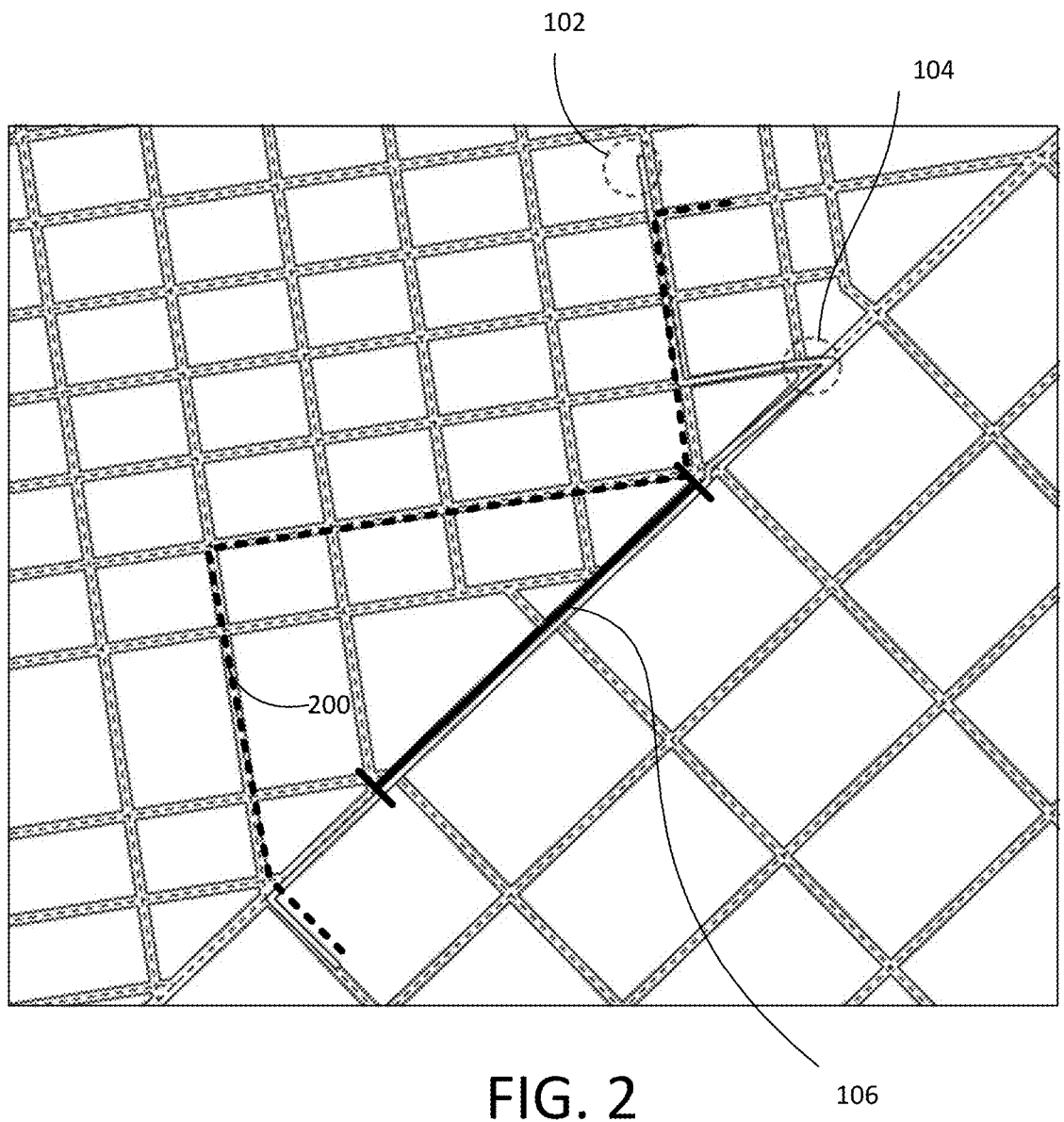
FIG. 2 is a two-dimensional map showing an example of an autonomous vehicle route, in accordance with some embodiments.

Furthermore, depending upon the level of autonomy for the autonomous vehicle, an AV-route may or may not need more details specific to the motion planner. Finally, the route shown above does not support both AV-level datasets (e.g., with lane data) and road-level data sets. The routing methods and devices described herein may take these issues into account when routing an autonomous vehicle. For example, the route 200 (e.g., represented by the bold dashed lines) shown in FIG. 2 may be generated in accordance with embodiments described herein. The route 200 shown in FIG. 2 considers which maneuvers are safe for an autonomous vehicle (e.g., avoids intersection 104), considers AV-safe pickup and drop-off points, (e.g., avoids unsafe drop-off point 102) and considers human-intervention zones (e.g., avoids human-intervention zone 106). A route such as the route 200 shown in FIG. 2 may be customized based on the constraints of a particular autonomous vehicle. The routing methods and devices described herein can handle both human and autonomous-vehicle requirements. For example, these methods and devices include some or all of the following features:

Both lane-level and road-level maps;
Consideration of both road-level traffic and lane-level traffic where available;
Consideration of autonomous vehicle constraints (e.g., assignment of costs for autonomous vehicle constraints in a cost model), including constraints specific to an individual vehicle or request (e.g., a cost due to the fact that a specific make and model can only autonomously travel on certain types of roads, such as bidirectional highways with no dividers) as well as constraints for autonomous vehicles generally (e.g., the methods and devices choose AV-focused routes that avoid black-listed areas and reduce/minimize human intervention);
Improvement/optimization for different objectives, e.g., fastest time, maximum autonomy time;
Flexibility to change costs in real-time;
Consideration of optimal pickup/drop-off locations for autonomous vehicles;
Consideration of charging constraints;
Uniform SDK for offline routing (e.g., in-vehicle or onboard) and online routing (e.g., in the cloud);
A focus on safety in addition to efficiency;
Scalability with a flexible architecture; and
Online and offline modes, the latter for when autonomous vehicles lose connectivity.

Table 1 highlights some of the differences between AV-routing and conventional routing in accordance with some embodiments.

TABLE 1

| | Conventional Routing | AV-Routing |
|---|---|---|
| Algorithm | Fastest-path algorithms | Flexible-path algorithms with custom constraints |

TABLE 1-continued

| | Conventional Routing | AV-Routing |
|---|---|---|
| Map Data | Road-level data only Meter-level accuracy | Hybrid routing across HD map data and road-level data Handling of any vendor's or customer's data Centimeter-level accuracy |
| Dynamic Data | Historical and real-time traffic | Historical and real-time traffic |
| | Human Input for incidents | Machine Input via video (e.g., computer vision algorithms) |
| Online/Offline | Online taking advantage of fresh data Offline - limited quality, but always available | Online and offline using same engine and producing consistent result |

Fundamentally, routing relies on 3 components: a graph of nodes and edges, edge weights, and algorithms to traverse the graph. The graph represents the traversable space of lanes and/or roads that the autonomous vehicle can travel. The edge weights are the costs of traversing each road/lane. Algorithms such as Dijkstra, A*, and Bidirectional Dijkstra explore the weighted graph to find paths which minimize a cost function between an origin and destination.

In some embodiments, the routing methods and devices make use of a hybrid map, built up from a conventional road map as well as a lane-level map. A base-layer road map can be sourced, for example, from Open Street Map (OSM). Lane-level maps can be obtained from OEM's and other 3rd-party providers or can be created from sensor data (e.g., autonomous vehicle sensor data or dashcam data from human-driven vehicles).

From the basic road map, a static road graph of default edge weights is constructed (e.g., accounting for human intervention zones, speed limits, autonomous vehicle turn restrictions, etc.). During run-time, a real-time data layer is kept in memory, which listens for updates from various real-time data pipelines. For each request, a new cost function (e.g., cost model) may be created and used to traverse the graph.

Figure 3A:
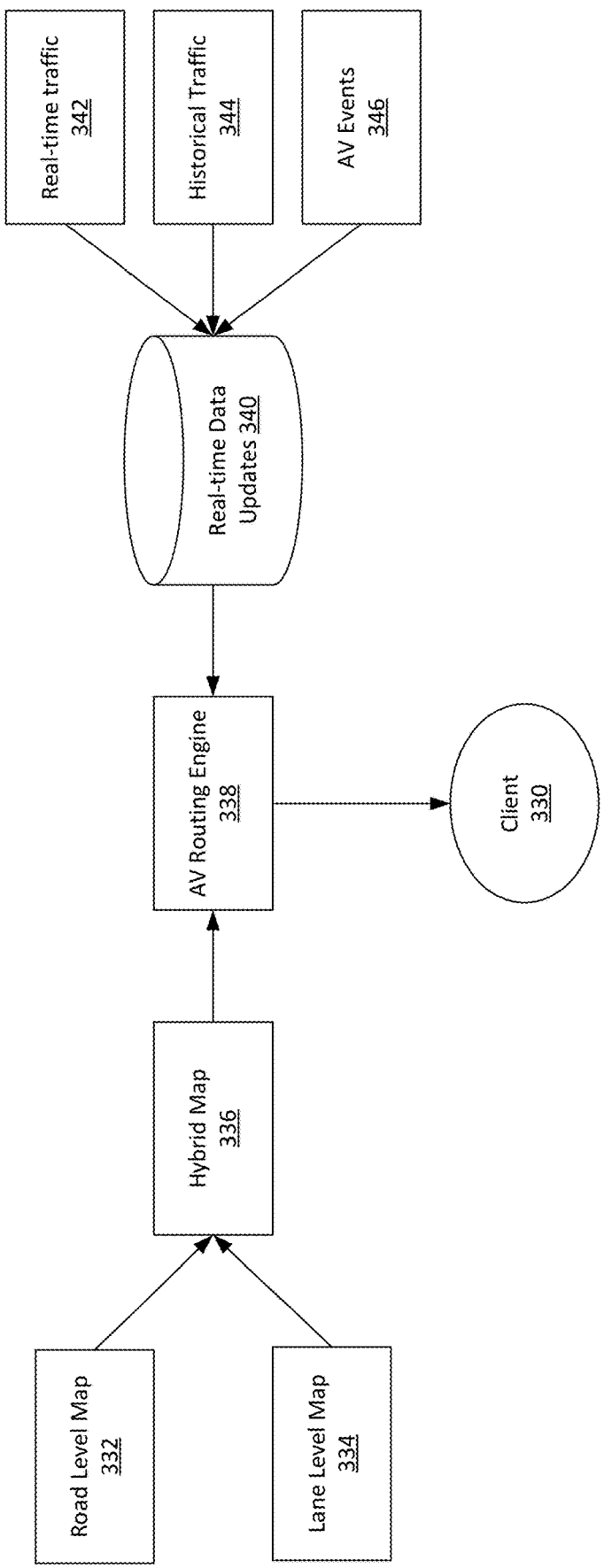
FIGS. 3A-3B is a block diagram illustrating an architecture of an autonomous vehicle routing engine, in accordance with some embodiments.

FIG. 3A is an example of an architecture of an autonomous-vehicle routing engine, in accordance with some embodiments. For example, the client 330 is the autonomous vehicle to be routed or an electronic device associated with the autonomous vehicle.

Real-time Data updates 340 includes a server system that receives and/or tracks real-time traffic 342, historical traffic 344, and AV Events 346 and processes/forwards the traffic and events to AV Routing Engine 338, such that AV Routing Engine 338 can create/update the route for client 330. The AV Routing Engine 338 also uses information received from hybrid map 336 (e.g., which is based on road level map 332 and lane level map 334) to create/update the route for client 330.

Figure 3B:
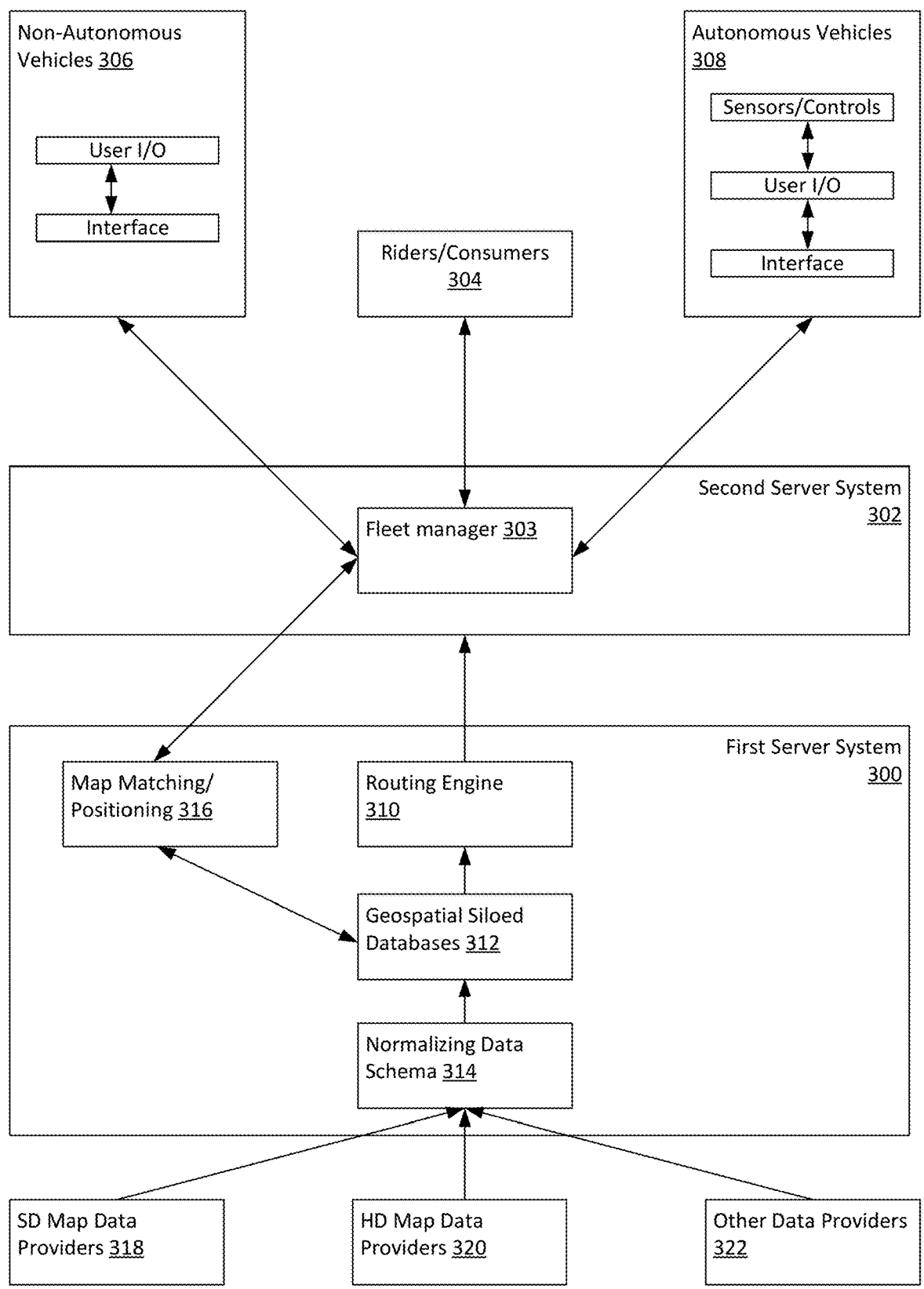

FIG. 3B illustrates another exemplary architecture (e.g., a so-called "stack") for a fleet of vehicles. The features of the exemplary architecture shown in FIG. 3B may optionally compliment, replace, or be combined with the features of the architecture described with respect to FIG. 3A. In some embodiments, the fleet of vehicles is a mixed fleet of vehicles including autonomous vehicles (e.g., autonomous vehicles 308) and non-autonomous vehicles (e.g., non-autonomous vehicles 306). In some circumstances, a fleet includes a mix of different vehicle types (e.g., automobiles, bicycles, scooters, and/or delivery robots). In some circumstances, the fleet provides services to riders (e.g., riders/consumers 304) by transporting riders from a first location to a second location. In some circumstances, the fleet provides services to other consumers, e.g., by delivering items to the consumers (e.g., delivering meals from restaurants, delivering packages from retail stores).

To facilitate the provision of these services using a mixed fleet of vehicles, the stack includes a first server system 300 that provides fleet management services and routing information. The first server system 300 includes one or more processors (e.g., CPUs) and memory storing instructions for the modules described with reference to the first server system (e.g., the map matching/positioning module 316, the routing engine 310, the geospatial silo-ed databases 312, and the normalizing data schema 314). The first server system 300 interfaces with a fleet manager 303 on a second server system 302. In the exemplary architecture shown in the figure, the second server system 302 acts as a client of the first server system 300, while riders, consumers (e.g., riders/consumers 304), and vehicles (e.g., non-autonomous vehicles 306 and/or autonomous vehicles 308) act as clients of the second server system 302.

In some embodiments, the second server system 302 is a separate and distinct server system from the first server system 300. The second server system 302 includes one or more processors (e.g., CPUs) and memory storing instructions for the modules described with reference to the second server system 302 (e.g., the fleet manager 303). The instructions are executed by the one or more processors. In some circumstances, the fleet manager 303 is one of a plurality of fleet managers serviced by the first server system 300. For example, the fleet manager 303 may be a fleet manager for a specific company's fleet, and the first server system 300 may provide services to multiple companies' fleets.

The first server system 300 includes a routing engine 310 that provides routes and estimated times of arrival for autonomous vehicles 308 and non-autonomous vehicles 306 in accordance with the various routing methods described herein (e.g., as described with reference to FIG. 17 and others). In some embodiments, a different instance of the routing engine is instantiated for each fleet.

The first server system includes one or more geospatial silo-ed databases 312 storing geospatial data (e.g., data stored with a corresponding geographical location, such ai latitude and longitude). The geospatial silo-ed databases 312 include "standard definition" (SD) map data received from SD map data providers (e.g., data such as streets locations/ geometries, street names). An example of an SD Map Data Provider is OpenStreetMap. In some embodiments, the geospatial data further includes "high definition" data such as lane-level data (e.g., lane locations/geometries, information about which maneuvers are permitted from which lanes) received from HD map data providers. The geospatial data further includes data from other data providers, such as information received from municipalities about construction and road closures, real-time data (acquired as described above with reference to FIG. 18), traffic data and other data. In addition, the geospatial silo-ed databases 312 store locations (e.g., map matched locations) of the vehicles in the various fleets.

In some embodiments, the geospatial silo-ed databases 312 store a plurality of distinct instances of data covering the same geographical region. For example, the geospatial silo-ed databases 312 store multiple maps (e.g., with geospatial data overlaid on those maps) covering the same region. In some circumstances, the different maps will include data appropriate to a specific fleet's vehicles (e.g., a fleet will include autonomous vehicles and delivery bots, and the geospatial silo-ed databases will store one or more maps with information appropriate to the fleet's vehicle types). Some instances of the map may be public to any client (e.g., any fleet manager), while other versions of the map may be private to certain clients (e.g., certain fleet managers). For example, a respective fleet may license data from a respective HD map data provider. The data provided by the respective HD map data provider are thus silo-ed and private to the respective fleet's fleet manager (e.g., fleet manager 303).

In some embodiments, the data ingested from the various data sources (e.g., the SD map data providers 318, the HD map data providers 320, the other data providers 322) is normalized by a normalizing data schema 314. The normalizing data schema 314 translates data from a plurality of first formats to a normalized second format that is independent of the first format (e.g., independent of the source of the data).

The first server system 300 further includes a map matching/positioning module 316 that matches location data received from vehicles to a map location (e.g., a location of a map stored in the geospatial silo-ed databases 312). For example, some vehicles generate location data (e.g., GPS data or data from another positioning system, such as GLONASS, Galileo, or BeiDou). In some circumstances, this data is noisy and may place the vehicle away from its actual location, e.g., on a sidewalk or in a building. The map matching/positioning module 316 receives the location data from a respective vehicle (e.g., through the fleet manager 303, which interfaces with the first server system 300), matches the noisy location data to a probable road location and/or lane location and updates the "map matched" location of the vehicle in the geospatial silo-ed databases 312 (e.g., updates the matched position). In addition, the map matched position is provided to the fleet manager 303 for various purposes (e.g., monitoring the fleet).

As noted above, the stack includes a second server system 302, optionally distinct and separate from the first server system 300. The second server system 302 includes the fleet manager 303, which acts as a client of the first server system 300 (e.g., a client of the routing engine). The fleet manager 303 dispatches vehicles (e.g., non-autonomous vehicles 306 and/or autonomous vehicles 308), assigns routes to vehicles, and assigns staging locations to vehicles within its corresponding fleet (e.g., using information and routes provided by the routing engine). In addition, the fleet manager 303 interfaces with riders/consumers 304 (e.g., via a mobile application on the rider's smartphone or other device). The fleet manager 303 provides information such as estimated times of arrival (ETAs) and trip costs to the riders/consumers 304 via their mobile devices. In some embodiments, the fleet manager 303 also receives data such as vehicle positions (e.g., location, including optionally lane-specific location and orientation (e.g., which way the vehicle is pointing)) from the individual vehicles.

In some embodiments, an autonomous vehicle includes an AV platform which serves as an operating system and framework for the autonomous functionality of the autonomous vehicle. The autonomous vehicle includes one or more processors (e.g., CPUs) and memory storing instructions for the modules described with reference to the autonomous vehicle (e.g., the interface module, the AV platform, drivers for the sensors/controls). The instructions are executed by the one or more processors. An example of an AV platform is the open source Robotics Operating System. The fleet manager (e.g., fleet manager 303) interacts with the autonomous vehicles (e.g., autonomous vehicles 308) through an interface module, which is a module that runs on the AV platform to provide routes to the AV platform and receive data from the autonomous vehicle's sensors. For example, in some circumstances, the interface module is provided by the developer of the routing engine to act as a liaison between the first server system and the robotics of the autonomous vehicle. The AV platform receives sensor data from the autonomous vehicles sensor's and, in some circumstances, makes the sensor data available to the fleet manager, which can make the sensor data available further down the stack, for example, to the map matching/position module. In some embodiments, the AV platform sends commands to the autonomous vehicle's controls (e.g., acceleration commands, breaking commands, turning commands, etc.) through a drive-by-wire system.

Constructing the Routing Graph

Figure 4A:
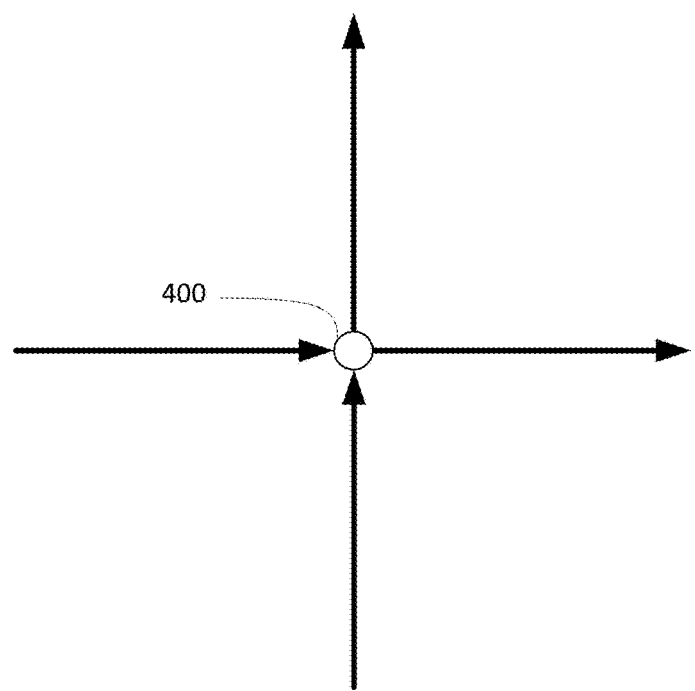
FIG. 4A is a two-dimensional birds-eye view illustrating an example of an intersection that is represented as a single node, in accordance with some embodiments.

In order to support the flexible cost scenarios above, a representation of the routing graph is constructed that can handle turn costs and lane-transition costs. In some embodiments, cost models include, for an intersection, costs for traversing different paths through the intersection (e.g., a path straight through the intersection, a left turn at the intersection, a right turn at the intersection, or a U-turn at the intersection). To do so, the intersection may be represented as a plurality of nodes (instead of a single node 400, as shown in FIG. 4A) and a plurality of edges, where some edges represent respective paths through the intersection. For example, a left turn is represented as nodes 402 and 404 connected by a first edge, which has a first weight. A path straight through the intersection is represented by nodes 402 and 406 connected by a second edge, which has a second weight (e.g., a different weight than the first weight). Illegal paths through the intersection (e.g., turning right to go the wrong way down a one-way street) are not represented in the graph, and thus cannot be explored by the routing process. For example, there is no edge shown between node 402 and 408 (e.g., a right turn).

Figure 5:
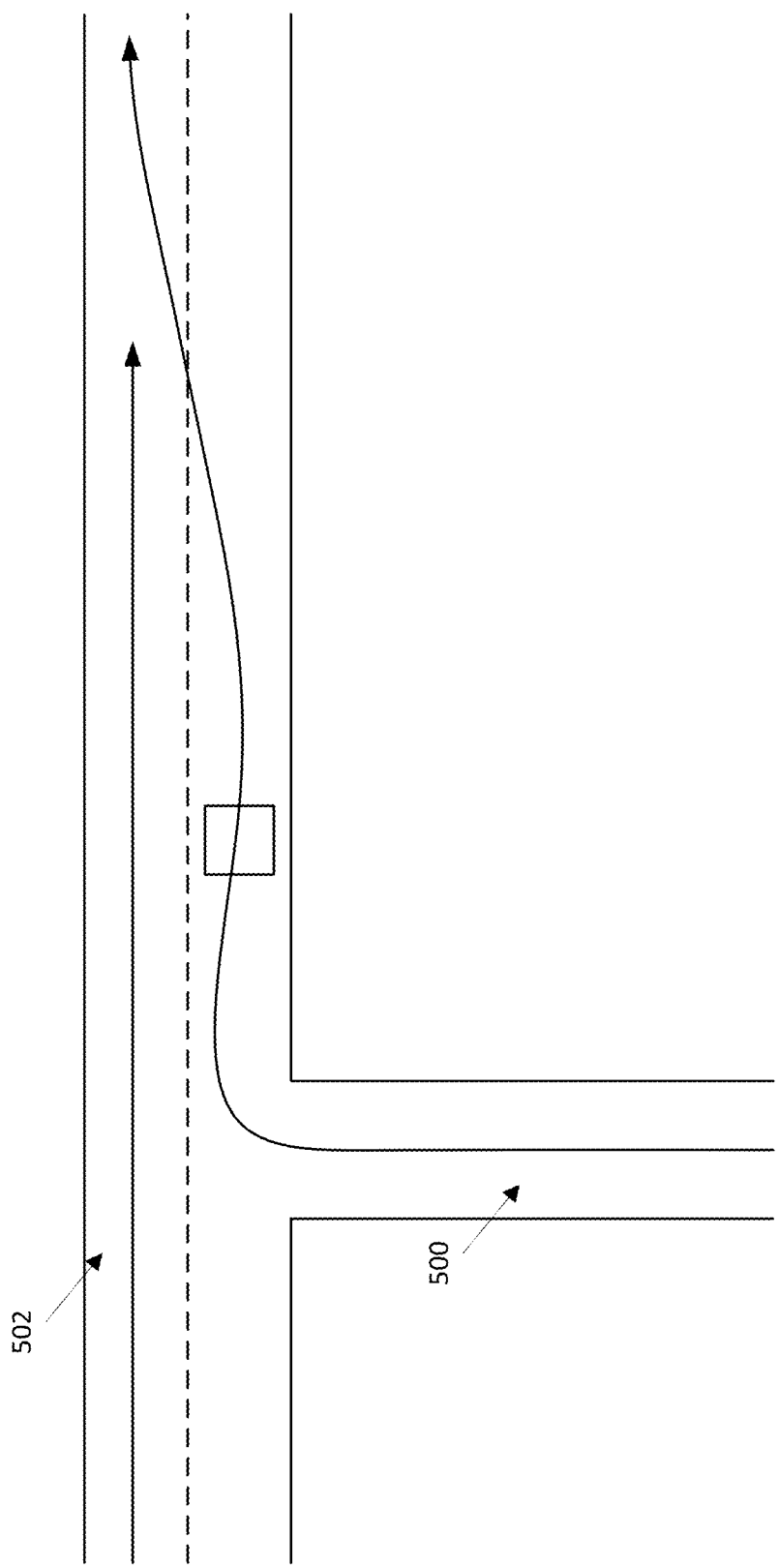
FIG. 5 is a two-dimensional birds-eye view illustrating an example of a route feature in which lane-level details and constraints are useful for providing drivable routes for autonomous vehicles, in accordance with some embodiments.

Similarly, lane transition edges are added between lanes when necessary, which can capture the cost for the autonomous vehicle to change lanes. For example, lane transition edges are added anytime there is a change in the number of lanes in the road map. FIG. 5 illustrates an example of a lane transition. A first road 500 in the road map of FIG. 5 is a single lane. A second road 502 includes two lanes (e.g., a double lane). There are real-world situations where lane-level details and constraints are useful to provide drivable (e.g., optimal) routes for autonomous vehicles as shown in the example in FIG. 5.

In some embodiments, rather than being associated directly with weights, graph edges are associated with tags or attributes (e.g., the edge is tagged as a human-intervention zone). A cost function evaluates the actual cost of each edge (e.g., in real-time). This allows certain aspects of the graph to remain static (e.g., the possible paths through an intersection) while allowing the costs associated with those aspects of the graph to be dynamic (e.g., an autonomous vehicle can request a route with a particularly strong preference against human-intervention zones).

Figure 6:
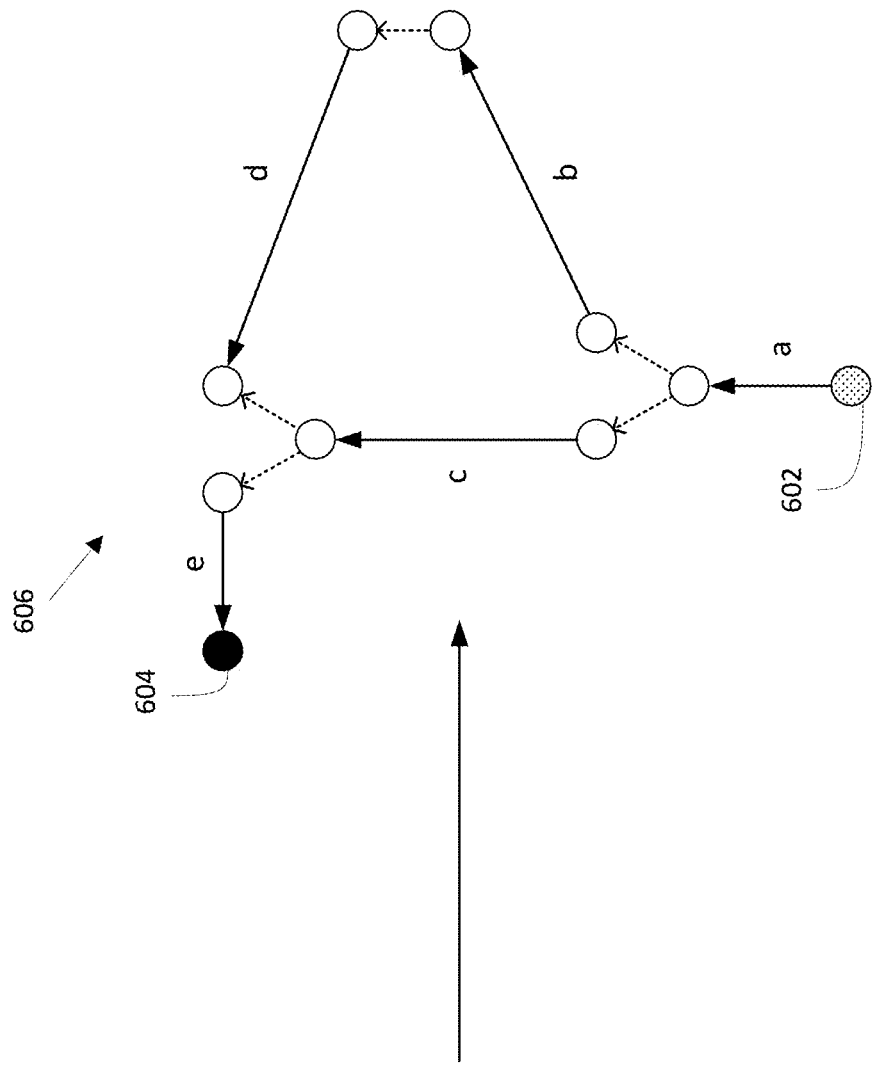
FIG. 6 is a two-dimensional birds-eye view illustrating another example where paths through an intersection are represented with their own edges in a graph, in accordance with some embodiments.
Figure 6:
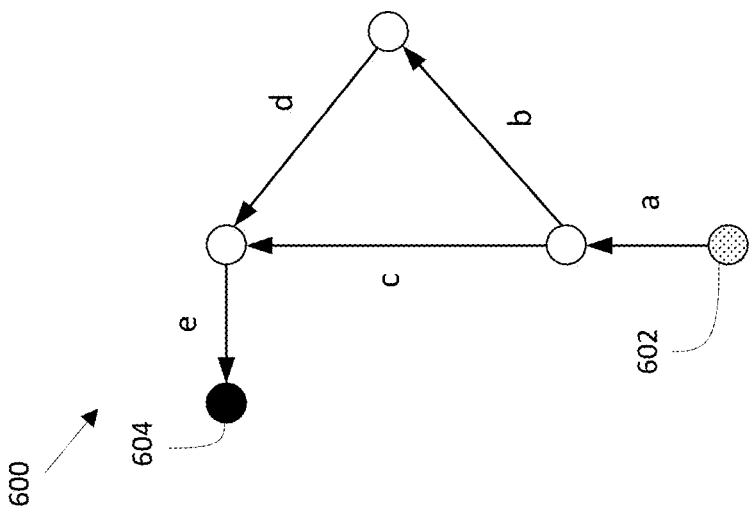

Normally, edges in a road graph are represented as either unidirectional or bidirectional. This is prevalent in the industry and most routing engines use complex representations to handle edges based on their directionality. In order to more simply represent the graph, however, some embodiments eliminate bidirectional edges in the graph. All edges are thus unidirectional, and are aligned with their geometry. Edges may fall into one of two categories, "original edges" or "transition edges." Transition edges are created when expanding the original representation, and can capture turn/ transition costs between specific original edges. This expansion helps capture turn costs correctly and provide low-cost (e.g., optimal) paths. An illustrative example is shown in FIG. 6.

If a route is generated on the original graph 600 (on the left of FIG. 6) from the origin 602 to the destination 604, the turn costs may be added once a given node is already being explored (i.e., once the node has been marked for resolution in Dijkstra's shortest-path algorithm). In this case, it is entirely possible to mark the node between c and e for resolution even before seeing whether coming from d is cheaper.

In this example, a path a→c→e has a total cost:

$$C(a\to c\to e)=C(a)+T(a\to c)+C(c)+T(c\to e)+C(e)$$

The second path has the following cost:

$$C(a\to b\to d\to e)=C(a)+T(a\to b)+C(b)+T(b\to d)+C(d)+T(d\to e)+C(e)$$

Note that the second path can have a smaller cost if:

$$C(a\to b\to d\to e)<C(a\to c\to e)$$

$$C(a)+T(a\to b)+C(b)+T(b\to d)+C(d)+T(d\to e)+C(e)<C(a)+T(a\to c)+C(c)+\ldots T(c\to e)+C(e)$$

$$C(b)+C(d)+T(a\to b)+T(b\to d)+T(d\to e)<C(c)+T(a\to c)+T(c\to e)$$

$$T(c\to e)>C(b)+C(d)-C(c)+T(a\to b)+T(b\to d)+T(d\to e)-T(a\to c)$$

This shows that one can arbitrarily raise the turn cost from c→e and find suboptimal paths in the original representation. In the expanded graph 606, however, because added extra nodes have been added to handle extra state, one can find optimal paths when considering transition costs between two edges. This situation can arise in cases where a transition is characterized as extremely difficult to make (e.g., unprotected left turns for autonomous vehicles).

To fully characterize this expanded graph 606, the total numbers of nodes and edges is significantly increased. In the example provided in FIG. 6 there is an increase in nodes from 3 nodes (in graph 600) to 8 nodes (in expanded graph 606), and total edges from 5 edges (in graph 600) to 10 edges (in graph 606). These increases can be offset by operating in small road networks, emphasizing flexibility and correctness.

The original edges and transition edges have differences in terms of attribution. Table 2 illustrates some of the differences in attributes between original edges and transitional edges in accordance with some embodiments:

TABLE 2

| Feature/Attribute | Original Edge | Transition Edge |
| --- | --- | --- |
| Geometry | Yes | No |
| Street Name | Yes | No |
| Turn Cost | No | Yes |
| Highway Class | Yes | No |
| Time Cost | Yes | Yes (Optional) |
| Distance Cost | Yes | No |
| AV-Human Transition | No | Yes |

Hard-coded turn restrictions in the turn graph representation can be easily handled as well. If a turn between two edges is restricted, the transition edge between the two is excluded altogether.

Traversing the Graph (Selecting a Route)

During traversal, a cost model may be used to evaluate the costs of the edges that are explored (e.g., weights are assigned as the costs of the edges based on tags or attributes associated with the edges). This is done using a cost function (e.g., determined at run time by the client's request). An optimal path may be returned that minimizes this cost function. Examples of costs that the cost function accounts for include, but are not limited to:

Time: The amount of time to traverse an edge
Distance: The distance (e.g., in meters) of an edge
Turn: A cost associated with turns (this cost returns 0 for all non-transition edges)
Human-Intervention: A cost associated with going from a non-human intervention to a human intervention zone (returns 0 for all non-transition edges).

Similarly, the routing can completely restrict certain edges or transitions if necessary. A client can customize their own linear combination of costs (or corresponding cost functions) to create a hybrid weight for an edge like so:

```
{
    "weights": {
        "time": 1,
        "distance": 0.25,
        "turn": 1,
        "human_intervention_transition": 10
    },
    "restrictions": ["no_left_turns"]
}
```

Which represents the following weight for an edge e:

$$\text{weight}(e)=\text{time}(e)+0.25*\text{distance}(e)+\text{turn}(e)+10*\text{human}(e)$$

Figure 7:
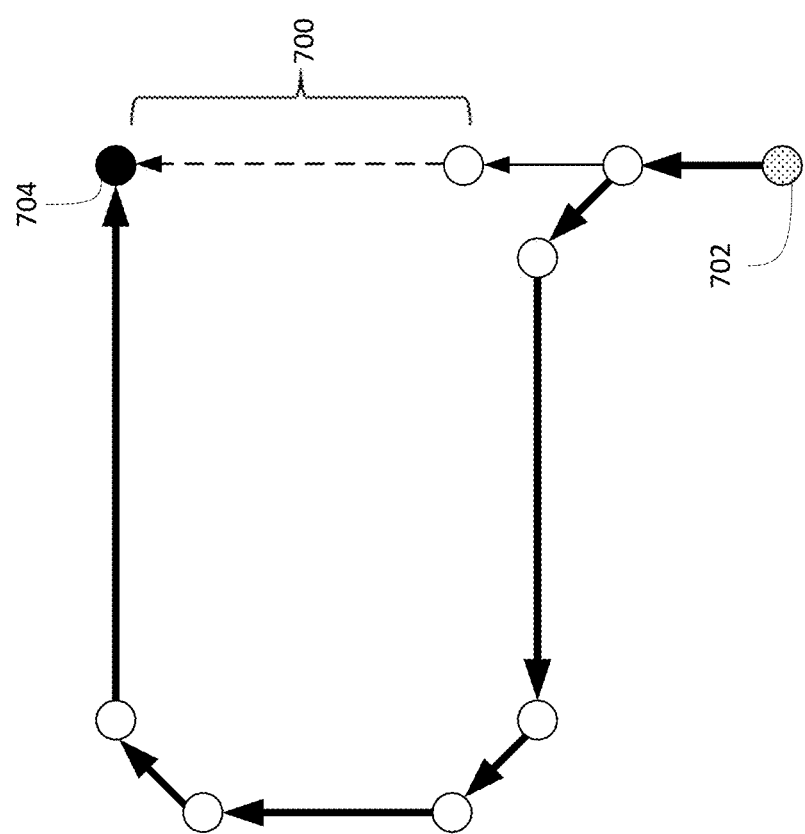
FIG. 7 is a two-dimensional birds-eye view illustrating an example of a route that heavily penalizes human-intervention-zone transitions, in accordance with some embodiments.

There are no conversions for dimensions included here. Each cost function is individually unit-less, and can therefore be compared easily with other costs. FIG. 7 illustrates an example of an optimal route that penalizes human-intervention-zone transitions very heavily. For example, a first route from origin 702 to destination 704 that involves a straight line (e.g., the shortest path) between origin 702 and 704 includes a human-intervention zone 700. When the penalty of the human-intervention zone is large, the optimal route between origin 702 and 704 instead takes a longer path in order to avoid the human-intervention zone 700.

As more data is gathered, optimal weights can be captured for different modes of autonomous vehicle operation (e.g., a "safety" mode or an "avoid human interventions" mode). Different routing modes thus may use different cost models and functions, resulting in different routes. Routing therefore may be preceding by selection of a mode in accordance with some embodiments.

In some embodiments, on top of the static data, a real-time data layer periodically updates the edge attributes on the graph and can affect the path calculation. For example, a real-time traffic data pipeline may provide real-time speeds for a subset of the edges, or autonomous vehicle sensor data may provide real-time road or lane closure information. If desired, the client can override the real-time information with historical cost functions.

Figure 8:
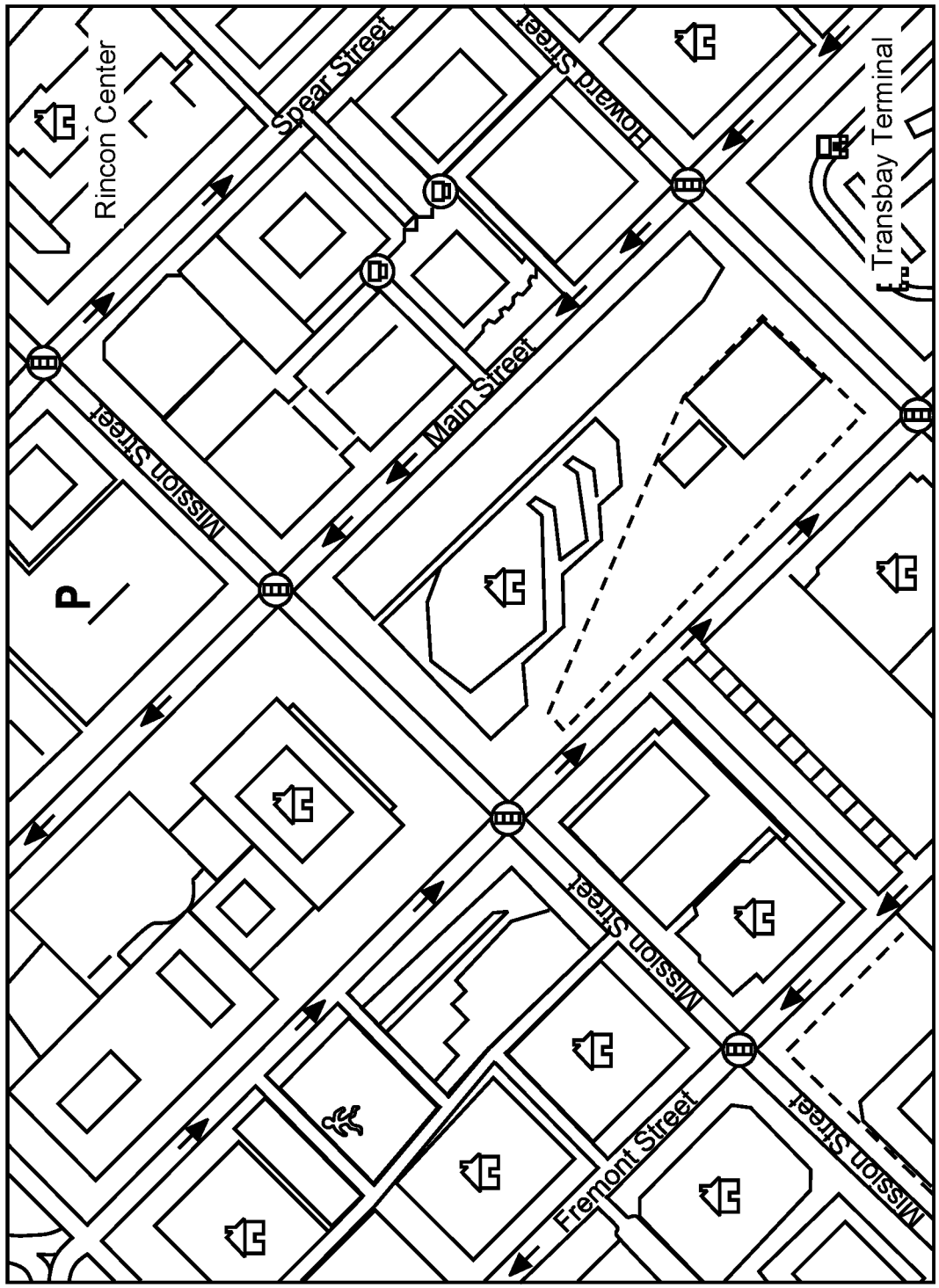
FIG. 8 is a two-dimensional map illustrating a conventional example of a routing graph where roads are edges and intersections are nodes.

The shortest path problem is the problem of finding a path from an origin to a destination, which optimizes (e.g., minimizes) the sum of the weights of the path edges according to a cost function. To compute this optimal path, routing relies on 3 components: a graph, its weights, and algorithms to traverse the graph. The graph is a planar topology that represents the traversable space. For human routing, this graph is directly correlated to the road network, with edges and nodes representing road segments and intersections, respectively. For example, FIG. 8 illustrates a conventional example of a routing graph where roads are edges and intersections are nodes. In this section, the discussion is restricted to graphs whose edge weights are non-negative.

Other graph representations are possible. For example, an edge-based graph is represented by taking the dual of the graph, where nodes map to road segments and edges map to transitions between subsequent road segments. This representation can be useful as it allows for the introduction or removal of transition edges in order to capture turn costs and restrictions respectively. The graph edges represent the entire road (ignoring lanes). Even with just a road representation, the graph is very large. For example, the planet-wide OSM build currently contains on the order of 4 billion unique nodes. To ameliorate data explosion, other graph representations build multiple levels of details, partition into sub-graphs, or compute additional metadata such as distance to landmarks.

Finding tighter lower bounds makes A* even more selective and hence faster. The ALT algorithm (A*, Landmarks, Triangle inequality) pre-computes shortest path costs from each node in the graph to a set of nodes called landmarks and exploits the triangle inequality to precompute even tighter lower bounds for A*. Specifically, for a destination node t, a landmark node L, and a node x:

$$d(x,t)+d(t,L) \geq d(x,L) \Rightarrow d(x,t) \geq d(x,L)-d(t,L)=hL(x)$$

This means the subtracted distance (d(x, L)−d(t, L)) can be used as a lower bound for the actual distance d(x,t). In practice, many landmarks are chosen, and the maximum of the subtracted distances can be taken in order to obtain the tightest lower-bound heuristic.

In order to find a shortest path, each graph edge must have an associated weight, which represents the cost of traversal. In simple routing algorithms, the cost of a routing edge is the time it takes a vehicle to travel over it. Usually the cost is a scalar value, but it can also have multiple costs (e.g., time and distance) and/or confidence probabilities. Pareto/multi-value optimization has been used in the former and stochastic routing in the latter. For time-dependent routing problems the costs themselves can change over time and require a different approach to solve optimally.

The first algorithms created to find shortest path on non-negatively weighted graphs were Dijkstra's and the Bellman-Ford algorithm. Unfortunately, these approaches do not scale well with even city-sized road graphs. Recent advances have focused on applying these fundamental graph exploration algorithms in clever ways to scale to real-world graph sizes. One improvement is to apply Dijkstra's from both the origin and the destination node and employ clever termination conditions to the frontiers of both searches to reduce the size of the search space.

The A* search algorithm is another popular technique that guides Dijkstra's search using a heuristic cost which acts as a lower bound for the optimal cost. Conventionally, A* uses a priority queue for the nodes to visit where the priority of a node x is the sum of its current cost d(s, x) and its heuristic cost h(x). In turn, this helps deprioritize nodes with prohibitively high costs. A typical lower bound for the shortest time cost is the haversine distance from a node to the destination divided by a maximum car speed. One can think of A* as a generalization of Dijkstra's naive routing algorithm with a zero-cost heuristic (i.e., h(x)=0 for all x).

A* can also be used to optimally solve a weighted cost functions determined at run-time given that the weights are non-negative. Specifically, for a set of cost functions $f_i$:

$$f(x)=\Sigma w_i f_i(x)$$

The minimum over f(x) is an upper bound for the weighted sum of the minimums of $f_i(x)$. By defining the values f*, $f_i$*, as the minimum values taken for f(x), $f_i(x)$, respectively, and x*, $x_i$*, as the minimizing arguments for those functions, respectively:

$$f_i^* \leq f_i(x)$$

$$f_i^* \leq f_i(x^*)$$

$$w_i f_i^* \leq w_i f_i(x^*)$$

$$\Sigma w_i f_i^* \leq w_i f_i(x^*) = f(x^*)$$

Thus, the weighted sum of the minima can be used for each function as a valid lower bound for any hybrid cost function required at run time. This makes ALT a compelling algorithm for flexible costing as well.

Real-Time Data for Powering Fleets of Autonomous Vehicles

As autonomous vehicles (AVs) begin to operate, they heavily rely on previously collected and processed high-definition (HD) map data (e.g., data that includes lane and direction information) for functionality like localization, which allows them to track their positions in the real world. To operate more safely and efficiently, however, autonomous vehicles benefit from a separate layer of real-time data. For example, location data (e.g., GPS data or data from another positioning system, such as GLONASS, Galileo, or BeiDou) collected from autonomous vehicles and non-autonomous vehicles in real-time indicates real-time traffic, which helps produce more accurate estimated arrival times and more efficient routes.

In some embodiments, camera systems are used on autonomous vehicles (e.g., autonomous-vehicle camera sensors) and human-driven vehicles (e.g., dashcams) to collect real-time data on road conditions (e.g., road closures, obstacles, traffic, etc.). This information, when used to route autonomous vehicles, allows autonomous vehicles to avoid certain roads or navigate safely around them. Table 3 is a partial list of such road conditions (CV=computer vision):

TABLE 3

| Feature (historical, real-time) | Acquisition Method |
| --- | --- |
| Weather (rain, fog, sunlight angle) | CV and license |
| Posted speed limit | CV, GPS, license |
| Road closures and other signs | CV and license |
| Road attributes | CV, license, |
| potholes | accelerometers, GPS |
| road quality | |
| lane line markers | |
| lane width | |
| barrier | |
| curvature | |
| unprotected left | |
| complex intersection (traffic light relevance) | |
| Mobility density (bicycle, vehicle, pedestrian, etc.) used for events like parades, baseball games, school crossings, etc. | CV |
| Police, fire, and other emergency personnel | CV |
| Road construction | CV and license |
| Pick-up/Drop-off (automatically finding good ones from video) | CV and license |
| Blackout areas | Fleet |
| Car accidents | Human, GPS/ accelerometer, license. |

As referred to herein, "license" refers to data available from another source. For example, data available from a government (e.g. a municipality, a local government, a state government, the federal government) about construction zones may be licensed from the government. The licensed data may be complete or incomplete. When incomplete, other methods of acquiring the data (e.g., computer vision (CV) with GPS or other location technology) can be used to complement the data.

As illustrated in Table 3, computer vision detects many of the features in camera data that impact an autonomous vehicle's safety and efficiency. In some embodiments, labeled and unlabeled camera data, convolutional neural nets (CNNs), and/or both cloud and edge computing are leveraged to solve computer vision detection problems. Table 4 enumerates further examples (RT is real-time):

TABLE 4

| Sensors | Real-time Data | Impact |
| --- | --- | --- |
| GPS | RT traffic | More accurate ETA, more efficient routes |
| GPS + cameras | Lane-level traffic data | More accurate ETA, more efficient routes |
| GPS + cameras | Traffic incidents | Photos of traffic to give rides context about upcoming traffic, data on incidents that may confuse a SDV |
| Cameras | Road closure | Fewer reroutes, less human intervention, better routes |
| Cameras | Available parking spots | Place for AVs to park when not on trips. |

The list below, as well as Table 5, provides still more examples of road conditions that can be detected using computer vision and accounted for in cost models:
- Weather or road conditions due to weather (e.g., sun, rain, wind, snow, fog);
- Sunlight angles (e.g., an angle of less than, or less than or equal to, a specified number of degrees (e.g., 20 degrees) to the horizon may impair visual sensors, which may affect a vision-based system);
- Complex environments (e.g., dense pedestrian or bicycle traffic);
- Pavement conditions or type (e.g., new, modern, ancient, cracked, well-paved, pot-holed, dirt, asphalt, cobblestone); and
- Incidents (e.g., construction zones, police, road closures, accidents, events such as parades, temporary regulatory signs).

Some embodiments detect only features that impact autonomous vehicle safety and efficiency (e.g., forgo detection of features that do not impact autonomous vehicle safety and efficiency). This constrained detection space enables the capture of many specific images to solve specific detection problems. For example, in some embodiments, the computer vision does not recognize objects that are not relevant to the detection problems. Additionally, supervised learning techniques (like the aforementioned CNN) are preferred over unsupervised learning, even though the latter data exists in much larger quantities and could pave the future towards stronger artificial intelligence.

Another data advantage in these detection and classification problems is access to historical images as well as the real-time ones. For example, a historical image's location (e.g., GPS location) is snapped to the road network so to correlate images of the same road at multiple times. This domain-specific data helps us more reliably detect outliers (like weather and road construction) in the real-time data and allows us to use some unsupervised learning on unlabeled data (e.g., clustering for weather classification, below).

Some embodiments take advantage of both cloud and edge computing. In traditional cloud computing, all data (e.g., from internet-of-things devices) are transmitted to the cloud for batch processing (e.g., distributed machine learning for computer vision). Unfortunately, this not only requires large and complex clusters to meet the computational needs, but also becomes a bottleneck for using data in real-time. The value of the data diminishes quickly over time. With edge computing, the computing power on the mobile device is used to perform similar but less accurate detections to filter out noise early in the detection pipeline. In the cloud, potentially positive detections are refined with more complex models trained by more data and running on more powerful computers. Simple interest points like Harris corners may also be captured and used later for motion detection and tracking.

The approach in the edge versus the cloud may be largely the same, save the complexity of the edge model and its relatively lower precision but potentially higher recall.

TABLE 5

| Feature | Acquisition Method | Detection Approach |
| --- | --- | --- |
| Weather (rain, fog, snow, ice, sunlight angle) | CV and license | Histogram of gradients/colors; CNN |
| Posted speed limit | CV, GPS, license | CNN, sensor fusion, SVM for speed classification |
| Road closures and other signs | CV and license | CNN |
| Road attributes | CV, license, accelerometers, GPS | CNN, sensor fusion, polynomial fitting |
| potholes | | |
| road quality | | |
| lane line markers | | |
| lane width | | |
| barrier | | |
| curvature | | |
| unprotected left | | |
| complex intersection (traffic light relevance) | | |
| Mobility density (bicycle, vehicle, pedestrian, etc.) used for events like parades, baseball games, school crossings, etc. | CV | CNN |
| Police, fire, and other emergency personnel | CV | CNN |
| Road construction | CV and license | CNN, scene recognition |
| Pick-up/Drop-off (automatically finding good ones from video) | CV and license | N/A |
| Blackout areas | Fleet | N/A |
| Car Accidents | Human, GPS, accelerometers, license | N/A |

Weather Recognition

In some embodiments, weather conditions that impair the autonomous vehicle's vision system are detected (e.g., rain, fog, or sunlight glare). The intuition is that weather conditions are global across the image. A general approach is to extract global descriptors across the image, compile them into a feature vector and learn the discriminating ones for multi-class classification with training data. In some embodiments, local weather feeds ("rainy today," "sunny," "fog in the morning in San Francisco") are used as another descriptor in the image feature vector (e.g., are appended to the image feature vector).

Figure 9:
FIG. 9 is saturation histograms for a road under sunny and snowy conditions (shown in photographs also included in FIG. 9). The saturation histograms are an example of an analysis that can be used to automatically determine road conditions and assign costs or attributes to roads that are then used in autonomous vehicle routing, in accordance with some embodiments.
Figure 9:
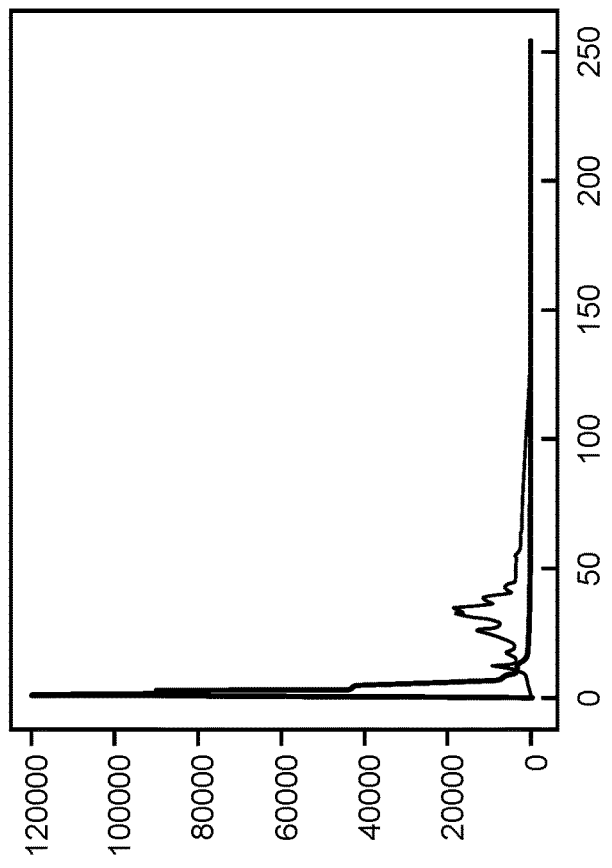

For the global image descriptors, histogram of gradients (HOG) and color histograms may be used, as shown in FIG. 9.

Given these feature vectors in a training set, a linear multi-classifier (Multi-class SVM) may be trained. There are more rich Machine Learning models that can be employed, such as those that perform smarter feature selection (e.g., M. Varma and B. R. Babu, "More generality in efficient multiple kernel learning," ACM International Conference on Machine Learning, 2009). CNNs may be used (see, e.g., Elhoseiny et al., "Weather classification with deep convolutional neural networks," International Conference on Image Processing, 2015).

In some embodiments, using historical images of the same road at the same hour, but over different days, histograms are clustered in a histogram feature space using DBSCAN (Ester et al., "A density-based algorithm for discovering clusters in large spatial databases with noise," Proceedings of the Second International Conference on Knowledge Discovery and Data Mining, 1996) to detect outliers.

Moving to more spatially granular classification, posted speed limit signs may be detected. This specific classification class of the more general class of traffic signs can leverage another signal: location (e.g., GPS location). For example, a combination of a vision-based classifier and an Extended Kalman Filter (EKF) for speed allows for reliable detection and recognition of speed signs and their posted speed limits.

Vision-Based Classifier

Figure 10:
FIG. 10 is a visualization of a boosted cascaded Haar classifier, in accordance with some embodiments.

Some embodiments use two approaches for classification: (1) boosted cascaded Haar-like feature classification (FIG. 10) and (2) CNNs. Boosted cascaded Haar-like feature classification may be used initially to bootstrap image acquisition since the number of parameters to solve is less than a CNN. This approach has been used successfully for face detection (Viola, Jones, "Robust Real-Time Face Detection," International Journal of Computer Vision, 2004) in the past. The basic idea is that a set of weak classifiers (Haar features) which are only required to be slightly better than random are boosted together (via AdaBoost, for example) to provide a higher prediction quality. The cascaded aspect means that features are chained together in classification and early bad classifiers can be used to reject subsequent features.

The cascaded weak classifiers are run over a sliding window (at different levels of a Gaussian pyramid of the image) and the windows with highest detection rates are kept. Finally, one window is selected via non-maximal suppression. The classification and detection (e.g., localization of the class within the image) is done in two separate steps.

Figure 11:
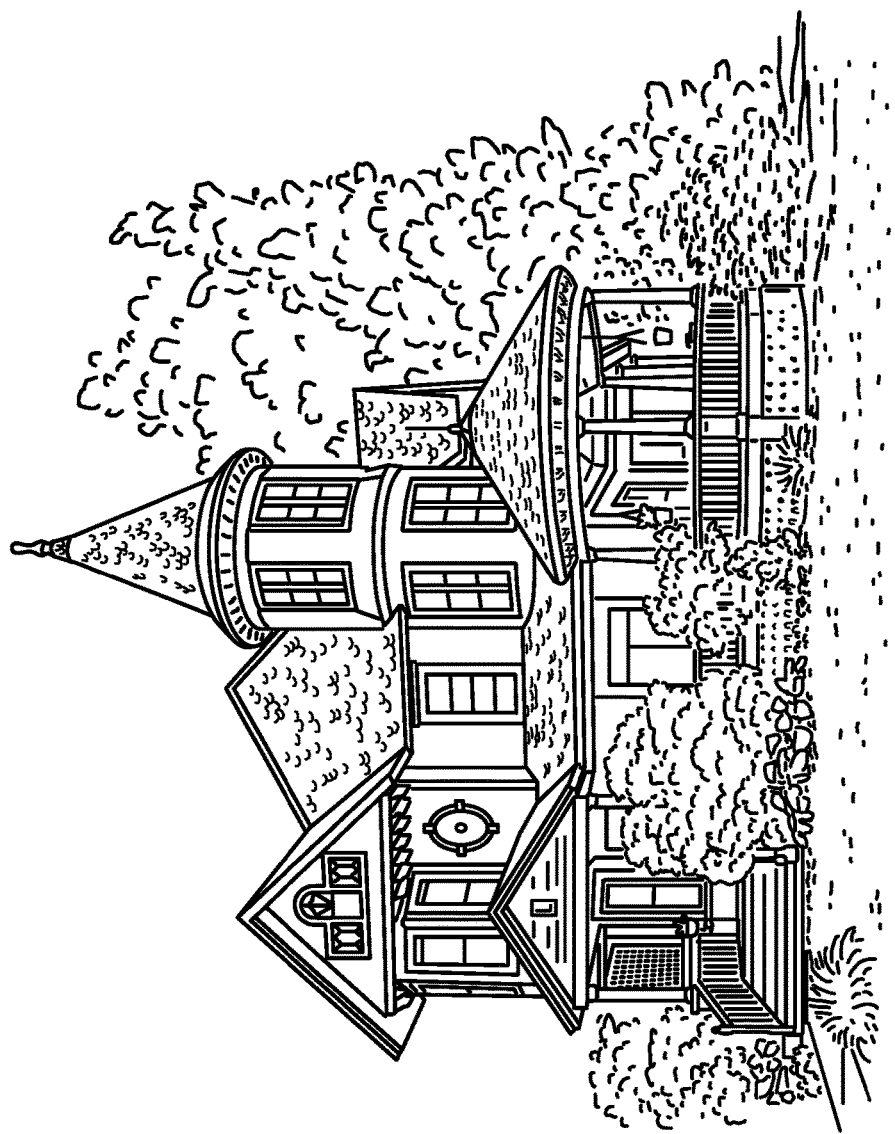
FIG. 11 is block diagram screen shot of a cascaded LBP classifier, in accordance with some embodiments.
Figure 11:
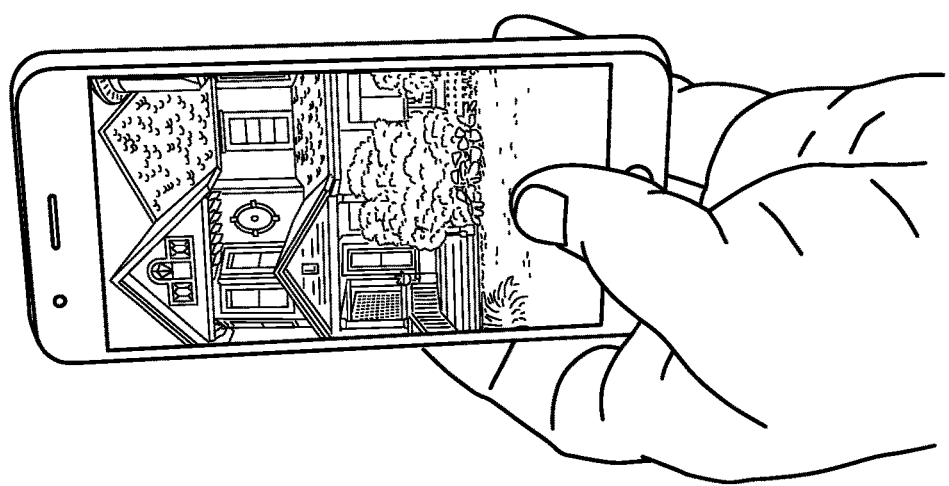

FIG. 11 illustrates a boosted cascaded local binary patterns (LBP) classifier.

Extended Kalman Filter for Estimating Position and Speed to Improve Detection

Before describing the general CNN vision approach, the use of Sensor Fusion to help detect speed limit signs is briefly explained. The standard Extended Kalman Filter (EKF) is used to fuse the inertial measurement unit (IMU) (accelerometer, gyroscope, and magnetometer) with location (e.g., GPS location) to predict location and velocity. For the sensor co-variances, map domain knowledge is used to provide better estimates over standard calibration (e.g., in urban canyons there is an increase in noise, but in some embodiments, normally distributed noise is still assumed). Intuitively, drivers change their speed when the posted speed limit changes. The better location and speed estimates over adjacent road segments (over many trips) can be fed as additional parameters for the CNN to specifically detect posted speed limit signs at speed changes.

General Traffic Signs and Objects

With boosted cascaded classifiers, the number of parameters is smaller than a CNN, but it requires the use of Haar filters and the limitations that come them. With CNNs, copious amounts of labeled data are used for training to let the net optimize for the best convolutions to perform.

Figure 12:
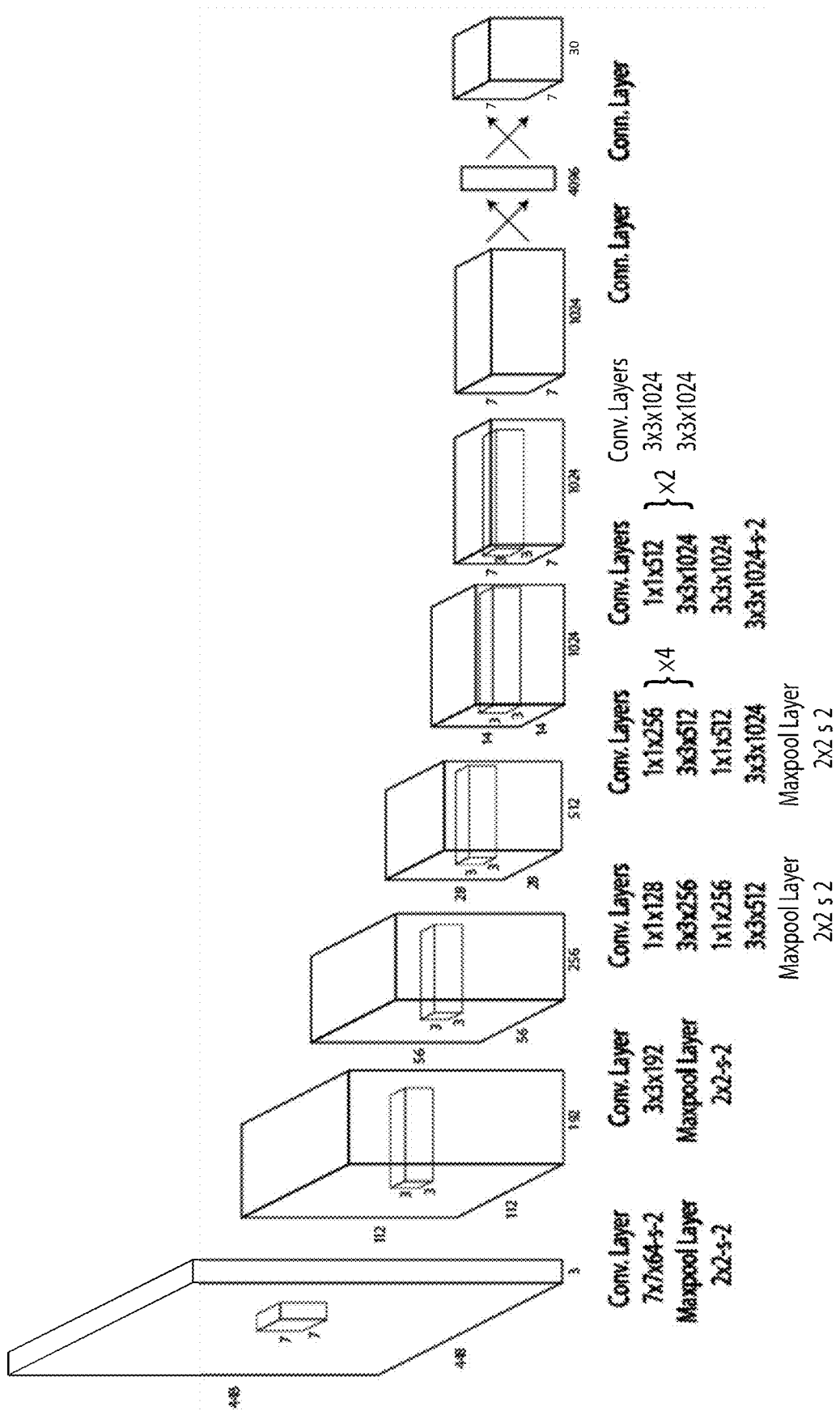
FIG. 12 is a block diagram of a "You Only Look Once" (YOLO) architecture for real-time object detection, in accordance with some embodiments.

CNNs are a special type of deep neural net specifically used for computer vision classification. Similar to their general counterparts, CNNs consist of multiple layers of nodes, where each node is described by a simple weight and bias (whose value is learned). CNNs also employ ReLUs for capturing non-linearities and employ the same techniques of regularization and stochastic optimization (e.g., SGD) to minimize loss. CNNs differ from general neural nets in that some nodes actually describe an image convolution or filter response on the previous layer. Additionally, researchers have employed image-domain specific insights, like max pooling, to increase CNN recognition accuracy. This and other insights allow machine learning engineers to intuitively understand how the CNN progressively searches for image features from simple features to complex aggregated patterns. Recent work has shown high accuracy (91%) for traffic sign detection (Zhu et al, CVPR, 2016). Thus, CNNs are trained to detect general traffic signs and any other object (but not scene), e.g., using a You Only Look Once (YOLO) architecture (e.g., implemented with Keras using Tensorflow), shown in FIG. 12.

Figure 13:
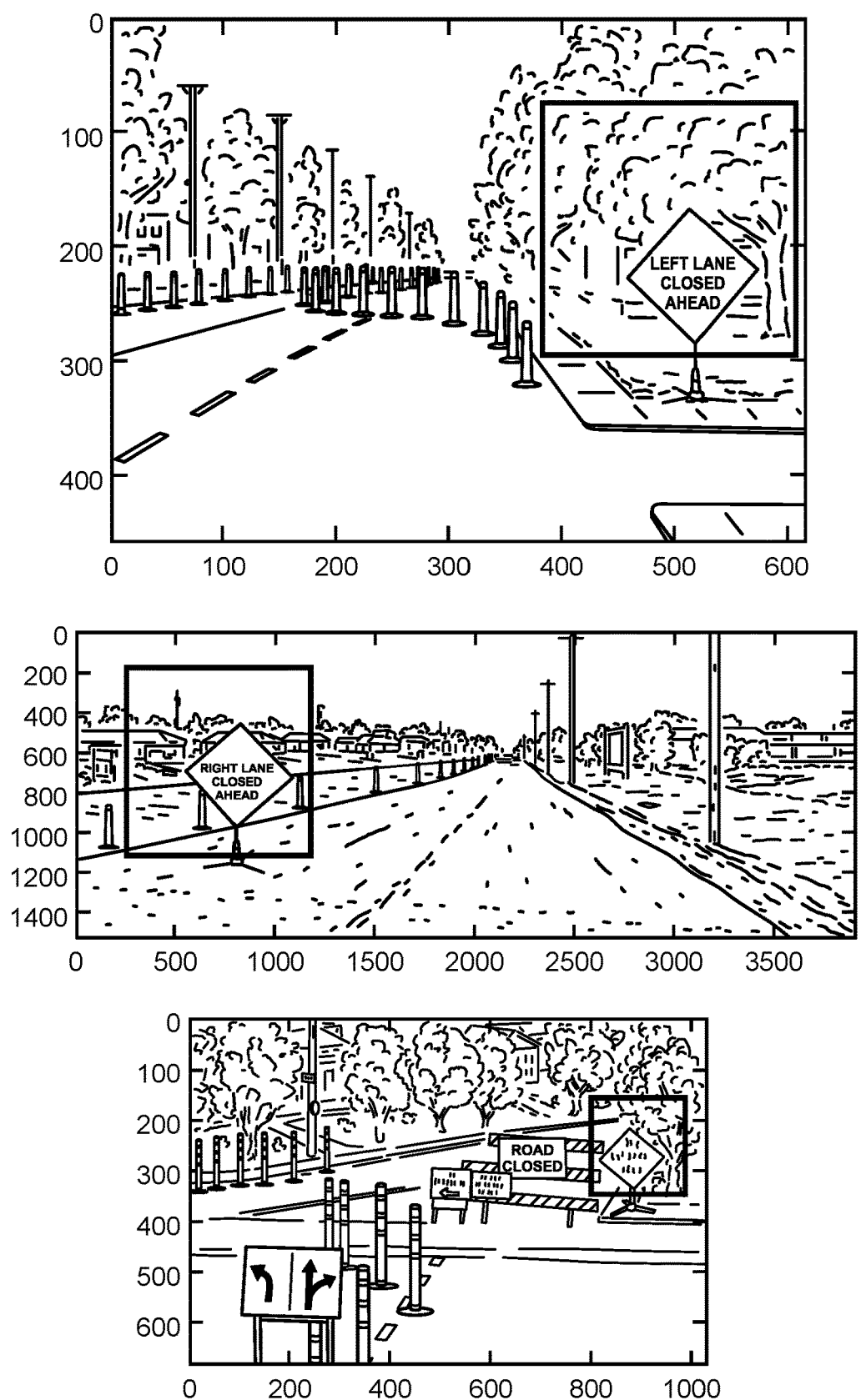
FIG. 13 is a series of photographs illustrating detection of various traffic signs using a convolutional neural net model, in accordance with some embodiments.

FIG. 13 illustrates detection of various traffic signs, in accordance with some embodiments.

Platform

Some embodiments of the present disclosure are implemented using Java, and more specifically GraphHopper. For an offline implementation, a Java Virtual Machine (JVM) may be run onboard the autonomous vehicle. To lessen the amount of memory needed on an onboard device, some embodiments shard the routing graph to load only the necessary graph components into memory.

Alternatively, some embodiments run autonomous vehicle routing on a separate mobile device, which interfaces with the car via local communication (Bluetooth, LAN, USB, etc.). In this case, running autonomous vehicle routing in an offline mode is equivalent to running it on the mobile device.

Operating Environment

Figure 14:
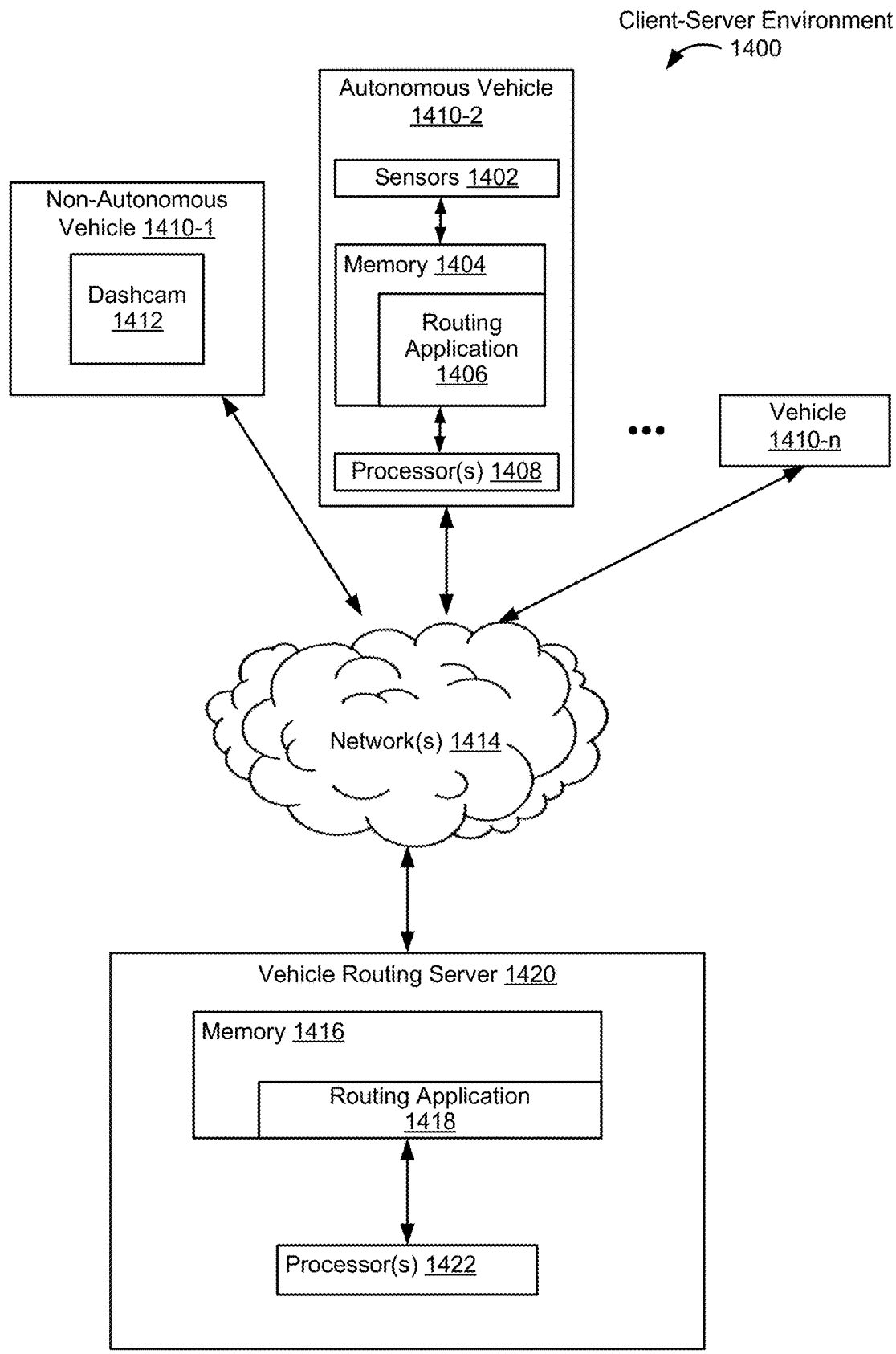
FIG. 14 is a block diagram illustrating a client-server environment, in accordance with some embodiments.

FIG. 14 is a block diagram of a client-server environment 1400 in accordance with some embodiments. The client-server environment 1400 includes vehicles 1410 (e.g., 1410-1, 1410-2, . . . , 1410-n) that are connected to a vehicle routing server 1420 through one or more networks 1414. In some embodiments, vehicles 1410 are or are analogous to vehicles 306/308 (FIG. 3B) In some circumstances, the vehicles 1410 operate as clients of vehicle routing server 1420. The one or more networks 1414 can be any network (or combination of networks) such as the Internet, other Wide Area Networks, Local Area Networks, metropolitan area networks, VPNs, peer-to-peer, ad-hoc connections, and so on.

The non-autonomous vehicle 1410-1 is a representative human-driven vehicle (e.g., a car, truck, or motorcycle). In some embodiments, non-autonomous vehicle 1410-1 is or is analogous to non-autonomous vehicle 306 (FIG. 3B) In some embodiments, non-autonomous vehicle 1410 includes a dashcam 1412 that acquires and sends camera images to vehicle routing server 1420, which can automatically identify road conditions from the dashcam images (as well as from autonomous vehicle camera sensor data from autonomous vehicles, such as from sensors 1402 in autonomous vehicle 1410-2).

The autonomous vehicle 1410-2 (e.g., a car, truck, or motorcycle) includes non-transitory memory 1404 (e.g., non-volatile memory) that stores instructions for one or more client routing applications 1406. In some embodiments, autonomous vehicle 1410-2 is or is analogous to autonomous vehicle 308 (FIG. 3B) Client routing applications 1406 are executed by one or more processors (e.g., CPUs) 1408 on the autonomous vehicle 1410-2. In some embodiments, the client routing applications 1406 send requests for routes to the vehicle routing server 1420 and receive selected routes from the vehicle routing server 1420. In some embodiments, the client routing applications 1406 direct the autonomous vehicles 1410-2 along the selected routes. Client routing applications 1406 may be embodied as any appropriate combination of programs, firmware, operating systems, or other logical or physical aspects of the autonomous vehicle 1410-2. Autonomous vehicle 1410-2 also optionally includes one or more network interfaces and one or more communication buses for interconnecting these components. Autonomous vehicle 1410-2 further includes vehicle components, such as an engine/motor, a steering mechanism, lights, signaling mechanisms, etc., some or all of which may be under the control of programs (e.g., a client routing application 1406) stored in memory 1404.

In some circumstances, a fleet of vehicles e.g., up to vehicle 1410-*n*) is in communication with vehicle routing server 1420. The fleet may be a mix of autonomous and human driven vehicles or may be entirely autonomous.

Vehicle routing server 1420 includes non-transitory memory 1416 (e.g., non-volatile memory) that stores instructions for one or more server routing applications 1418 (sometimes referred to as "routing engines"). Vehicle routing server 1420 further includes one or more processors (e.g., CPUs) 1422 for executing server routing applications 1418. The server routing applications, stored in the non-transitory memory, include instructions for performing any of the methods described herein (e.g., method 1500, 1600, 1700, and/or 1800, FIGS. 15A-15B, 16-18). Server routing applications 1418 may be embodied as any appropriate combination of programs, firmware, operating systems, or other logical or physical aspects of the autonomous vehicle 1410-2. Vehicle routing server 1420 also optionally includes one or more network interfaces and one or more communication buses for interconnecting these components.

The above identified applications correspond to sets of instructions for performing functions described herein. The applications need not be implemented as separate software programs, procedures, or modules, and thus various subsets of these instructions may be combined or otherwise re-arranged in various embodiments.

Method for Vehicle Routing Using a Cost Model with Costs Other than Travel Time

Figure 15A:
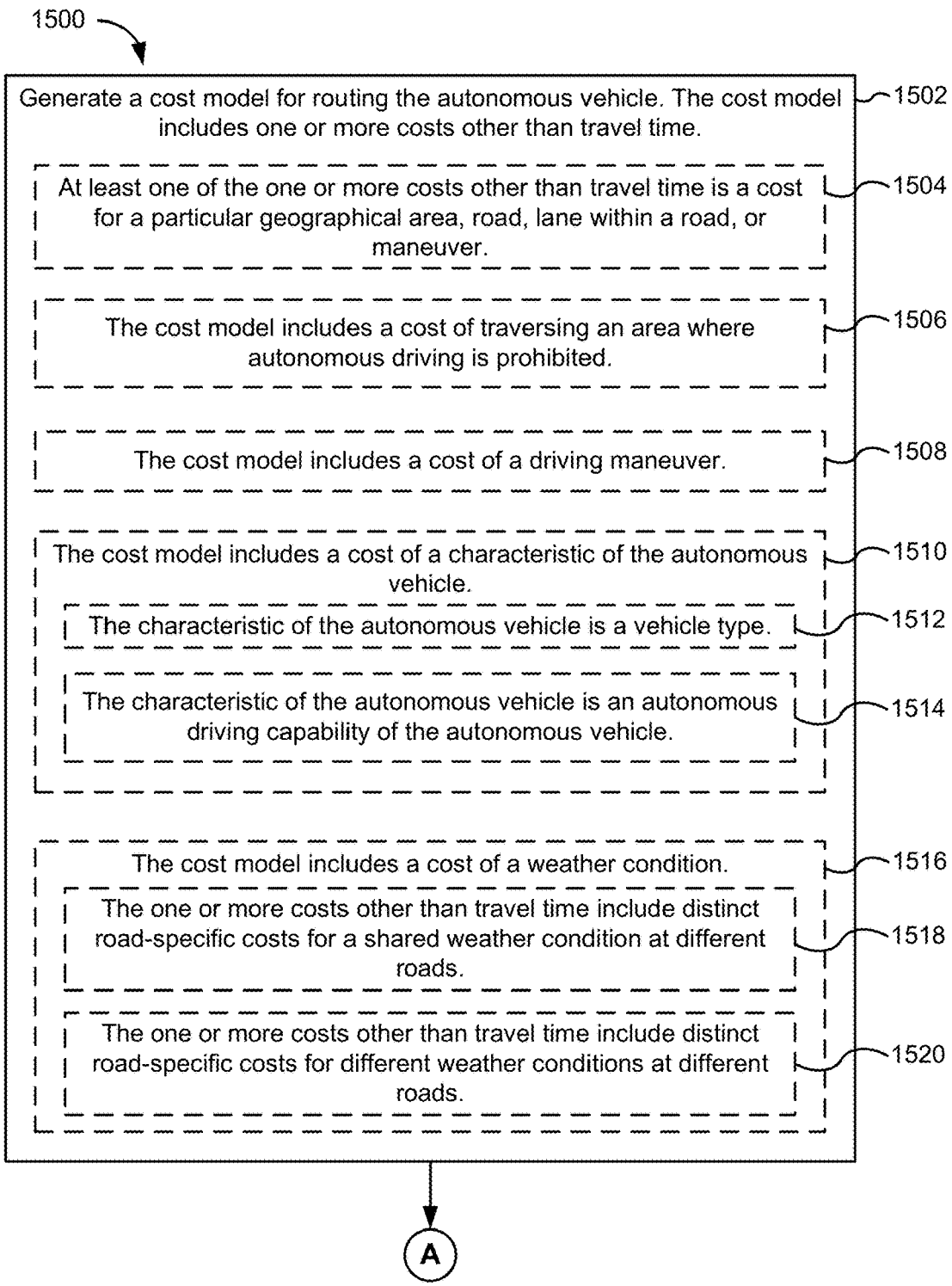
FIGS. 15A-15B are a flowchart of a vehicle routing method using a cost model with costs other than travel time, in accordance with some embodiments.
Figure 15B:
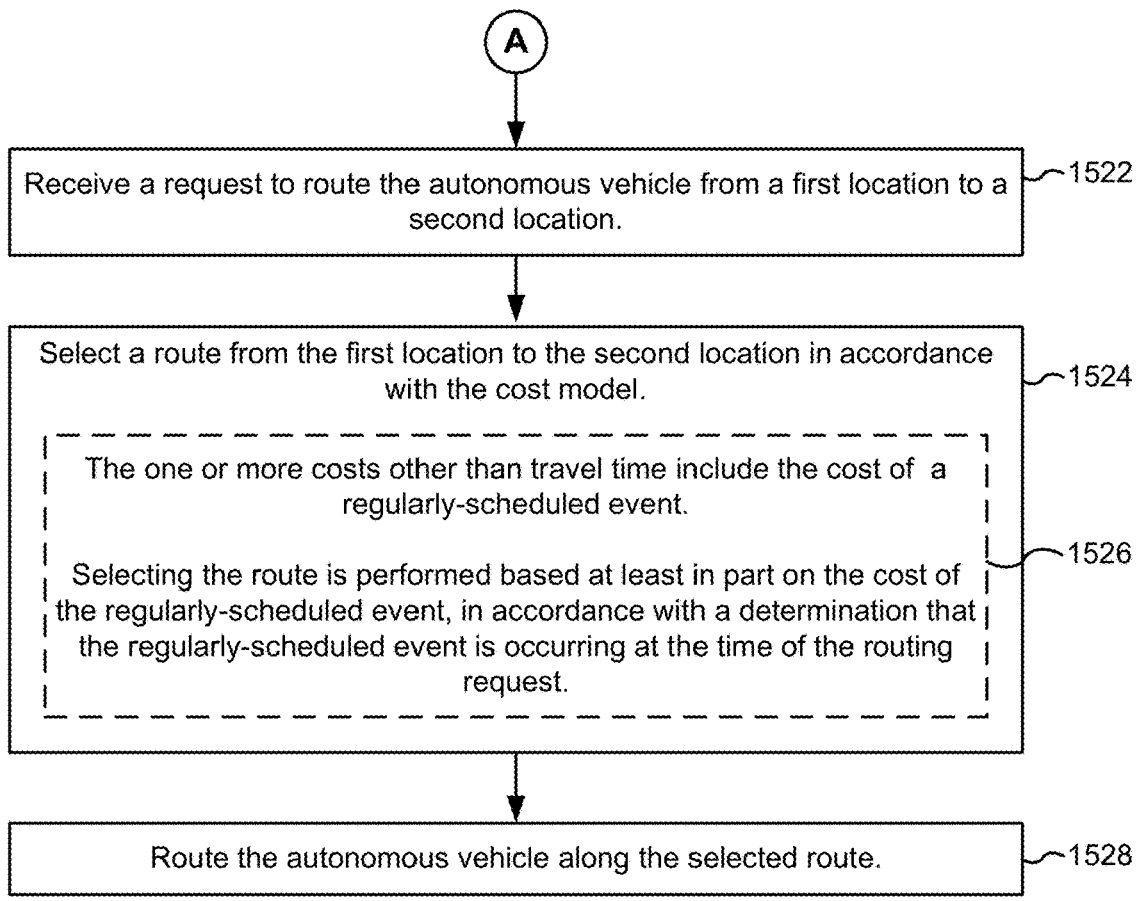

FIGS. 15A-15B are a flow diagram illustrating a method 1500 for routing a vehicle using a cost model with costs other than travel time, in accordance with some embodiments. The method 1500 is performed at an electronic device (e.g., vehicle routing server 1420, FIG. 14). While the following discussion describes implementations where the vehicle routing server 1420 performs the steps of the method 1500, in other embodiments, one or more (e.g., all) of the steps are performed by another electronic device, such as autonomous vehicle 1410-2 (e.g., a computer system on vehicle 1410-2 with non-transitory memory storing instructions for executing the method and one or more processors for executing the instructions). Moreover, some operations in method 1500 are, optionally, combined and/or the order of some operations is, optionally, changed. In some embodiments, some or all of the operations of method 1500 are performed automatically, without human intervention.

As described below, method 1500 provides technical solutions to problems that arise when routing autonomous vehicles. In particular, method 1500 addresses shortcomings in the abilities of autonomous vehicles by sending the autonomous vehicles on routes that mitigate these shortcomings (e.g., reduce the likelihood that an autonomous vehicle will encounter a situation for which it is ill-equipped). Routing autonomous vehicles in a way that is tailored to their capabilities increases passenger comfort and safety, conserves resources (e.g., cuts down on carbon emissions and/or battery usage from autonomous vehicles), reduces traffic.

The vehicle routing server 1420 generates (1502) a cost model for routing the autonomous vehicle. The cost model includes one or more costs other than travel time (or other than both travel time and distance). In some embodiments, the cost model includes a representation of a graph of nodes and edges. The respective edges have respective edge weights that represent costs. In some embodiments, the graph is stored without edge weights, and the edges are associated with tags or attributes (e.g., road conditions). In some embodiments, generating the cost model includes assigning the edges weights (e.g., based on their tags or attributes) at run-time (e.g., when a routing request is received). In some embodiments, the costs correspond to particular geographical areas, roads, lanes within roads, maneuvers, and/or paths through an intersection.

In some embodiments, at least one of the one or more costs other than travel time is (1504) a cost for a particular geographical area, road, lane within a road, or maneuver. For example, various edges of the graph described above correspond to a road, a line within a road, or a maneuver.

As an example of a cost associated with a particular area, in some embodiments, the cost model includes (1506) a cost of traversing (e.g., entering) an area where autonomous driving is prohibited. In some circumstances, autonomous vehicles are blacklisted from a particular area. If this occurs in a driverless vehicle, the area must be avoided altogether and the cost assigned is prohibitively high. When the vehicle has a human back-up driver, the cost may be set according to a preference for avoiding situations in which the human back-up driver must take control (e.g., the preference can be set by the human back-up driver or another human, such as the car's owner). In some embodiments, the area where autonomous driving is prohibited is geo-fenced (e.g., has a virtual geographic boundary defined, for example, by GPS, that enables software to trigger a response when an autonomous vehicle enters or leaves a particular area, such as instructing a human to take over driving when the autonomous vehicle has entered the geo-fenced area and offering to resume control when the autonomous vehicle has left the geo-fenced area). In some embodiments, the cost for the particular geographical area is added to any costs associated with particular roads within the area (e.g., a road within a geo-fenced area may have a cost associated with pedestrian traffic which is added to the cost due to the fact that the road is within a restricted area).

In some embodiments, the cost model includes (1508) a cost of a driving maneuver (e.g., a lane change, a right turn, a left turn, an unprotected left turn, a U-turn, or a highway merge). In some embodiments, maneuvers that are unsafe for autonomous vehicles are assigned prohibitively high costs. In some embodiments, the cost for a right turn is less than or equal to a cost for a protected left turn, which is less than a cost for an unprotected left turn. The effect of a higher cost is that vehicle routing server 1420 is less likely to select a route that has the higher cost feature. Thus, by making unprotected left turns higher cost maneuvers than right turns, the autonomous vehicle is less likely to be routed along a route that has unprotected left turns, resulting in fewer unprotected left turns. In some embodiments, the cost of an unprotected left turn is set to be prohibitively high, to avoid unprotected left turns completely.

Figure 16:
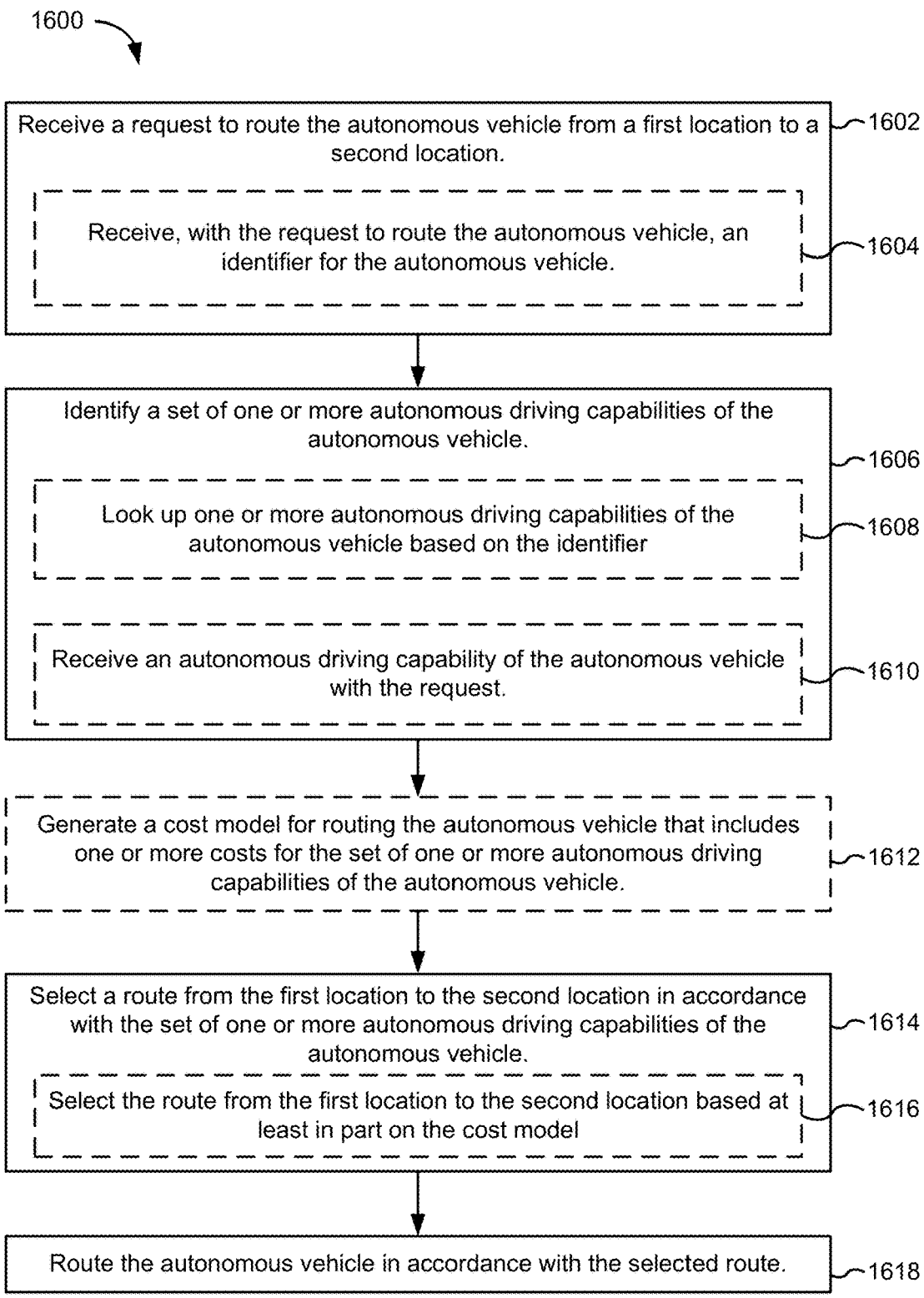
FIG. 16 is a flowchart of a method of autonomous-vehicle routing using a cost model with vehicle constraints, in accordance with some embodiments.

In some embodiments, the cost model includes (1510) a cost of (or associated with) a characteristic of the autonomous vehicle. In some embodiments, the characteristic of the autonomous vehicle is (1512) a vehicle type (e.g., a make or model of the vehicle, whether the vehicle is a sedan, sports utility vehicle, van, or larger vehicle). For example, in some embodiments, smaller roads have an associated lower cost for smaller vehicles as compared to higher vehicles. In some embodiments, the characteristic of the autonomous vehicle is (1514) an autonomous driving capability (or equivalently, an autonomous driving limitation) of the autonomous vehicle (e.g., a sensor capability or maneuvering capability). For example, in some embodiments, roads without lane lines have a higher cost for autonomous vehicles that cannot determine lanes on their own. Routing according to costs of characteristics of the autonomous vehicle is described in more detail with reference to method 1600 (FIG. 16).

In some embodiments, the cost model includes (1516) a cost of a weather condition, such as the current weather (e.g., it is snowing). In some embodiments, the cost of the weather condition is a cost of a road condition due to weather (e.g., there is snow on the road). In some embodiments, the one or more costs other than travel time include (1518) distinct road-specific costs for a shared weather condition at different roads. For example, a small road may be assigned a higher cost in a snow storm than a highway (especially if the small road is one that is infrequently plowed, e.g., as determined from camera data as described with reference to method 1800, FIG. 18). In some embodiments, the one or more costs other than travel time include (1520) distinct road-specific costs for different weather conditions at different roads. For example, for a long trip, or a trip in a region with microclimates, it may be possible to avoid conditions such as snow and fog altogether. Roads having the weather condition are assigned one cost, while roads without the weather condition (e.g., roads with better weather) are assigned a lower cost.

In some embodiments, the one or more costs other than travel time include a cost of a time of day (e.g., distinct road-specific costs of the time of day for different roads). For example, small country roads may be less safe at night than large highways. Thus, at night, small country roads are assigned an extra cost that lowers the preference for small country roads over highways even more than the daytime preference.

In some embodiments, the one or more costs other than travel time include a cost of a sunlight angle (e.g., distinct road-specific costs of the sunlight angle for different roads). For example, roads that are pointed nearly directly into the sun receive a higher cost at sunset than roads that are more angled with respect to the position of the sun. In some embodiments, the cost of the sunlight angle is assigned in accordance with a time of year (e.g., the road only points directly into the sun during sunsets in the winter, and thus the cost assigned to the sunset angle is assigned only during sunset times in the winter).

In some embodiments, the one or more costs other than travel time include a cost of a pedestrian traffic pattern (e.g., a predicted or measured density of pedestrian traffic). In some embodiments, the one or more costs other than travel time include a cost of a non-motorized vehicle (e.g., bicycle) traffic pattern. In some embodiments, the pedestrian/non-motorized vehicle traffic pattern is a temporal pattern. In some embodiments, the pedestrian/non-motorized vehicle traffic pattern is a spatial pattern (e.g., the autonomous vehicle routing attempts to avoid areas of high pedestrian traffic, such as Times Square). In some embodiments, the pedestrian/non-motorized vehicle traffic pattern is based on historical data (e.g., the pedestrian/non-motorized vehicle traffic pattern is not ascertained by the autonomous vehicle while driving along the route, but is ascertained before routing so that the pedestrian/non-motorized vehicle traffic pattern can be used in the routing).

In some embodiments, the one or more costs other than travel time include a cost of a pavement condition. In some embodiments, the one or more costs other than travel time include a cost of a road age (e.g., older roads are assigned a higher cost than newer roads).

In some embodiments, the one or more costs other than travel time include a cost of a road lacking lane lines (e.g., roads with lane lines are assigned a lower cost than roads without lane lines).

In some embodiments, the one or more costs other than travel time include a cost of an electric-charging constraint (e.g., roads without electric-charging facilities for long stretches are assigned a higher cost than roads with frequent electric-charging facilities). This constraint may correspond to a range of an electric vehicle.

In some embodiments, the one or more costs other than travel time include a cost of acceleration. Motion sickness is common in autonomous vehicles. This is at least in part because autonomous vehicles have not yet learned to mimic human driving, so autonomous vehicles tend to accelerate (e.g., change speed and/or direction) in ways that feel unnatural to passengers. To mitigate motion sickness in autonomous vehicles, some embodiments of method 1500 assign a cost to acceleration (e.g., include the acceleration cost in the cost model) to disfavor routes with unnatural acceleration profiles.

In some embodiments, the cost model further includes a travel-time cost (and/or distance cost), and the route is selected in accordance with both the travel-time cost (and/or distance cost) and the one or more other costs. The costs other than travel time (and/or distance) thus may operate in tandem with (e.g., in addition to) travel-time and/or distance costs, preventing the vehicle routing server 1420 from routing the autonomous vehicle along an unreasonably long route to, for example, avoid human intervention zones.

The vehicle routing server 1420 receives (1522) a request to route the autonomous vehicle from a first location to a second location. In some embodiments, the request to route the autonomous vehicle is received prior to generating the cost model. For example, the first location and the second location are physical locations each corresponding to a street address, an intersection, a landmark (e.g., "City Hall"), or the like. In some embodiments, the request identifies the first location and the second location. In some embodiments, the first location is an origin of the trip. In some embodiments, the second location is the destination of the trip. Alternatively, the autonomous vehicle routing can be done piecemeal, with the first location and the second location being intermediate points along a larger route. In some embodiments, the request to route the autonomous vehicle is received from a vehicle (e.g., vehicle 1410-2 or 1410-*n*) or a passenger within the vehicle (e.g., using the passenger's smart phone).

In response to the request to route the autonomous vehicle, the vehicle routing server 1420 selects (1524) a route from the first location to the second location in accordance with the cost model. In some embodiments, selection of the route is performed as described above under the heading "Traversing the Graph (Selecting a Route)."

In some embodiments, the one or more costs other than travel time include a cost of an event present at the time of a routing request (e.g., a construction project, traffic accident, or sporting event). In some embodiments, the one or more costs other than travel time include a cost of an event beginning and/or ending at the time of the routing request (e.g., a sports game beginning and/or ending). Selecting the route is performed based at least in part on the cost of the event. For example, the one or more costs other than travel time include (1526) the cost of a regularly-scheduled event. Selecting the route is performed based at least in part on the cost of the regularly-scheduled event, in accordance with a determination that the regularly-scheduled event is occurring at the time of the routing request. For example, when a sporting event is occurring when the request is received, the streets around the venue (e.g., stadium) are assigned an additional cost to disfavor routes that go near the venue.

In some embodiments, selecting the route is performed based at least in part on the cost of the regularly-scheduled event, in accordance with a determination that the regularly-scheduled event will be occurring when the autonomous vehicle is expected to reach the event. For example, a route that will reach the area around the venue within a specified time period corresponding to a start time of the event is disfavored.

Routing vehicles away from events present at the time of routing increases passenger comfort and safety, conserves resources (e.g., cuts down on carbon emissions and/or battery usage from autonomous vehicles), reduces traffic.

Further in response to the request, the vehicle routing server 1420 routes (1528) the autonomous vehicle along the selected route. In some embodiments, routing the autonomous vehicle includes controlling the mechanical operation of the vehicle, including controlling the steering, acceleration, breaking, and signaling of the autonomous vehicle. In some embodiments, routing the autonomous vehicle includes directing the autonomous vehicle to follow the selected route. In some embodiments, directing the autonomous vehicle to follow the selected route includes directing a separate computer-implemented module (e.g., routing application 1406 onboard vehicle 1410-2 or 1410-*n*) to follow the selected route (e.g., providing the onboard module with the selected route). The onboard module handles the mechanical control of the vehicle (e.g., handles the breaking, acceleration, steering, and signaling of the vehicle, avoiding pedestrians and the like). In some embodiments, the vehicle follows the route automatically and without human intervention (e.g., passenger intervention).

In some embodiments, the cost model is generated in response to the request to route the autonomous vehicle and the cost model is a first cost model for the autonomous vehicle. In some embodiments, the vehicle routing server 1420 receives a request to route a non-autonomous vehicle (e.g., a human-driven vehicle without autonomous capabilities) from a third location to a fourth location. The vehicle routing server 1420 generates a second cost model for routing the non-autonomous vehicle. The second cost model is distinct from the first cost model and does not include one or more of the costs other than travel time that are included in the first cost model (e.g., does not include a cost of traversing an area where autonomous driving is prohibited, does not include a cost of an acceleration). In some embodiments, the second cost model includes different costs for factors that were taken into account for the first cost model. For example, the first cost model includes a first cost of a respective driving maneuver and the second cost model includes a second cost of the same respective driving maneuver, where the second cost is different from the first cost. In response to the request to route the non-autonomous vehicle, the vehicle routing server 1420 selects a route from the third location to the fourth location in accordance with the second cost model and routes the non-autonomous vehicle along the selected route for the non-autonomous vehicle (e.g., the selected route for the autonomous vehicle is a first selected route and the selected route for the non-autonomous vehicle is a second selected route).

Routing autonomous vehicles and non-autonomous vehicles differently, e.g., by using different cost models for autonomous vehicles and non-autonomous vehicles, respectively, tailors routes to the respective abilities of autonomous and non-autonomous vehicles. Routing vehicles in a way that is tailored to their capabilities increases passenger comfort and safety, conserves resources (e.g., cuts down on carbon emissions and/or battery usage from autonomous vehicles), reduces traffic.

In some embodiments, the autonomous vehicle is a first autonomous vehicle having first autonomous driving capabilities and the cost model is a first cost model for the first autonomous vehicle. The one or more costs other than travel time for the first cost model include a cost corresponding to the first autonomous driving capabilities. In some embodiments, the vehicle routing server 1420 receives a request to route a second autonomous vehicle from a fifth location to a sixth location. The second autonomous vehicle has second autonomous driving capabilities are different from the first autonomous driving capabilities. The vehicle routing server 1420 generates a third cost model for routing the second autonomous vehicle. The third cost model is distinct from the first cost model and includes a cost corresponding to the second autonomous driving capabilities (e.g., that's different from the cost corresponding the first autonomous driving capabilities for the first cost model for the first autonomous vehicle). In response to the request to route the second autonomous vehicle, the vehicle routing server 1420 selects a route from the fifth location to the sixth location in accordance with the second cost model routes the second autonomous vehicle along the selected route for the second autonomous vehicle.

Routing autonomous vehicles differently depending on their capabilities, e.g., by using different cost models for different autonomous vehicles with different capabilities, respectively, tailors routes to the respective abilities of the autonomous vehicles. Routing vehicles in a way that is tailored to their capabilities increases passenger comfort and safety, conserves resources (e.g., cuts down on carbon emissions and/or battery usage from autonomous vehicles), reduces traffic.

It should be understood that the particular order in which the operations in FIGS. 15A-15B have been described is merely exemplary and is not intended to indicate that the described order is the only order in which the operations could be performed. One of ordinary skill in the art would recognize various ways to reorder the operations described herein. For brevity, these details are not repeated here. In addition, the operations in FIGS. 15A-15B may be combined with other operations described elsewhere (e.g., with reference to FIGS. 16-18) or have characteristics described with reference to analogous operations described elsewhere (e.g., the routing operation of method 1500 may optionally share any of the characteristics of other routing operations described elsewhere herein).

Method of Autonomous Vehicle Routing Using a Cost Model with Vehicle Constraints FIG. 16 is a flow diagram illustrating a method 1600 of autonomous vehicle routing using a cost model with vehicle constraints, in accordance with some embodiments. The method 1600 is performed at an electronic device (e.g., vehicle routing server 1420, FIG. 14). While the following discussion describes implementations where the vehicle routing server 1420 performs the steps of the method 1600, in other embodiments, one or more (e.g., all) of the steps are performed by another electronic device, such as vehicle 1410-2 (e.g., a computer system on vehicle 1410-2 with non-transitory memory storing instructions for executing the method and one or more processors for executing the instructions). Moreover, some operations in method 1600 are, optionally, combined and/or the order of some operations is, optionally, changed. In some embodiments, some or all of the operations of method 1600 are performed automatically, without human intervention.

As described below, method 1600 provides technical solutions to problems that arise when routing autonomous vehicles. In particular, method 1600 recognizes the fact that different autonomous vehicles have different driving capabilities. To that end, in some embodiments, method 1600 routes an autonomous vehicle according the autonomous vehicle's specific capabilities. Routing an autonomous vehicle in a way that is tailored to its specific capabilities increases passenger comfort and safety, conserves resources (e.g., cuts down on carbon emissions and/or battery usage from autonomous vehicles), reduces traffic.

The vehicle routing server 1420 receives (1602) a request to route the autonomous vehicle from a first location to a second location (e.g., a request to provide a route for a trip). In some embodiments, the vehicle routing server 1420 receives a current location of the autonomous vehicle. For example, the request to route the autonomous vehicle from the first location to the second location includes the current location of the autonomous vehicle (e.g., the first location). The request may have any of the characteristics of the request described with respect to operation 1522, method 1500 (FIGS. 15A-15B).

In some embodiments, the vehicle routing server 1420 receives a current location of the fleet vehicles. In some embodiments, the vehicle routing server 1420 determines staging locations for the fleet of vehicles (e.g., locations from which the routes will begin).

In addition, in some embodiments, the vehicle routing server 1420 receives (1604), with the request to route the autonomous vehicle, an identifier for the autonomous vehicle. For example, the identifier of the autonomous vehicle may be a vehicle identification number (VIN number); a make, model, and year of the autonomous vehicle; or an account number for the autonomous vehicle. In some embodiments, the vehicle routing server 1420 receives a current location of the autonomous vehicle. For example, the request to route the autonomous vehicle from the first location to the second location includes the current location of the autonomous vehicle (e.g., the first location).

The vehicle routing server 1420 identifies (1606) a set of one or more autonomous driving capabilities of the autonomous vehicle. In some embodiments, the vehicle routing server looks up (1608) one or more autonomous driving capabilities of the autonomous vehicle based on the identifier (e.g., in a vehicle capability database). In some embodiments, the set of one or more autonomous driving capabilities of the autonomous vehicle includes a capability of a sensor of the autonomous vehicle (e.g., a sensor 1402, FIG. 14). The vehicle routing server 1420 uses the identifier that is received with the routing request to look up the vehicle in a database. The database returns information indicating what types of sensors the vehicle has and/or what the sensors' capabilities are.

In some embodiments, identifying the set of one or more autonomous driving capabilities of the autonomous vehicle includes (1610) receiving an autonomous driving capability with the request. For example, the request includes information identifying what types of sensors the vehicle has. In some embodiments, one or more of the autonomous driving capabilities is included in the request, which also identifies the vehicle, and one or more additional driving capabilities are determined from looking up the vehicle in a database. In some embodiments, the set of one or more autonomous driving capabilities includes a plurality of autonomous driving capabilities.

In some embodiments, the set of one or more autonomous driving capabilities of the autonomous vehicle includes a maneuverability of the autonomous vehicle. For example, the set of autonomous driving capabilities may include a rating, score, or cost, for a particular vehicle or vehicle type, for an ability to make unprotected lefts, change lanes, or merge onto highways.

In some embodiments, the set of one or more autonomous driving capabilities of the autonomous vehicle includes a limitation on the autonomous vehicle determined from historical performance data for at least one of the autonomous vehicle and vehicles of a same type as the autonomous vehicle. For example, sensor data from autonomous vehicles that were involved in accidents or near accidents can be used to identify situations in which the vehicle or vehicle type performs poorly. As a more specific example, it may be determined based on historical performance data that a particular make, model, and year of autonomous vehicle performs poorly in dense pedestrian traffic or with low sunlight angles.

In some embodiments, the set of one or more autonomous driving capabilities of the autonomous vehicle includes a safety rating for the autonomous vehicle (e.g., a composite safety score based on NHTSA safety ratings).

In some embodiments, the vehicle routing server 1420 generates (1612) a cost model for routing the autonomous vehicle that includes one or more costs for the set of one or more autonomous driving capabilities of the autonomous vehicle (e.g., respective costs for respective capabilities in the set). In some embodiments, generating the cost model includes assigning costs in accordance with the set of one or more autonomous driving capabilities. For example, the cost model may include a graph representing a map (e.g., that is stored before the cost model is generated). A particular edge in the graph may correspond to a highway merge, and be tagged with "highway merge" as an attribute. The vehicle routing server 1420 assigns, as part of the generating operation, a cost to the edge based on the requesting vehicle's capabilities with respect to merging onto highways.

The vehicle routing server 1420 selects (1614) a route from the first location to the second location in accordance with the set of one or more autonomous driving capabilities of the autonomous vehicle (e.g., the vehicle routing server 1420 selects (1616) the route from the first location to the second location based at least in part on the cost model). For example, when an autonomous vehicle does poorly with highway merges, the assigned costs for the highway merge edges are higher. As a result, vehicle routing server 1420 is less likely to select a route that includes a highway merge.

As another example, in some embodiments, the selecting is performed based at least in part on the safety rating of the autonomous vehicle. In some embodiments, a vehicle with a low safety rating is routed along a safer route than a vehicle with a higher safety rating (e.g., a safer route is selected). In some embodiments, the set of one or more autonomous driving capabilities includes situation-specific (e.g., maneuver-specific, weather-specific, location-specific, etc.) safety ratings (e.g., a front passenger side safety rating is used to increase or decrease the preference routes with unprotected lefts).

The vehicle routing server 1420 routes (1618) the autonomous vehicle in accordance with the selected route. Routing operation 1618 is analogous to routing operation 1528, described above with reference to method 1500 (FIGS. 15A-15B).

In some embodiments, the autonomous vehicle is a first autonomous vehicle. In some embodiments, the vehicle routing server 1420 receives a request to route a second autonomous vehicle from a third location to a fourth location. The vehicle routing server 1420 identifies a set of one or more autonomous driving capabilities of the second autonomous vehicle (e.g., different sensor, different specifications on abilities to detect objects/lanes, etc.). The set of one or more autonomous driving capabilities of the second autonomous vehicle include at least one autonomous driving capability different from the set of one or more autonomous driving capabilities of the first autonomous vehicle. The vehicle routing server 1420 selects a route from the third location to the fourth location in accordance with the set of one or more autonomous driving capabilities of the second autonomous vehicle and routing the second autonomous vehicle in accordance with the selected route for the second autonomous vehicle.

Routing autonomous vehicles differently depending on their capabilities, e.g., by using different cost models for different autonomous vehicles with different capabilities, respectively, tailors routes to the respective abilities of the autonomous vehicles. Routing vehicles in a way that is tailored to their capabilities increases passenger comfort and safety, conserves resources (e.g., cuts down on carbon emissions and/or battery usage from autonomous vehicles), reduces traffic.

It should be understood that the particular order in which the operations in FIG. 16 have been described is merely exemplary and is not intended to indicate that the described order is the only order in which the operations could be performed. One of ordinary skill in the art would recognize various ways to reorder the operations described herein. For brevity, these details are not repeated here. In addition, the operations in FIG. 16 may be combined with other operations described elsewhere (e.g., with reference to FIGS. 15A-15B and 17-18) or have characteristics described with reference to analogous operations described elsewhere (e.g., the routing operation of method 1600 may optionally share any of the characteristics of other routing operations described elsewhere herein).

Method of Autonomous Vehicle Routing Using a Cost Model with Intersection Costs

Figure 17:
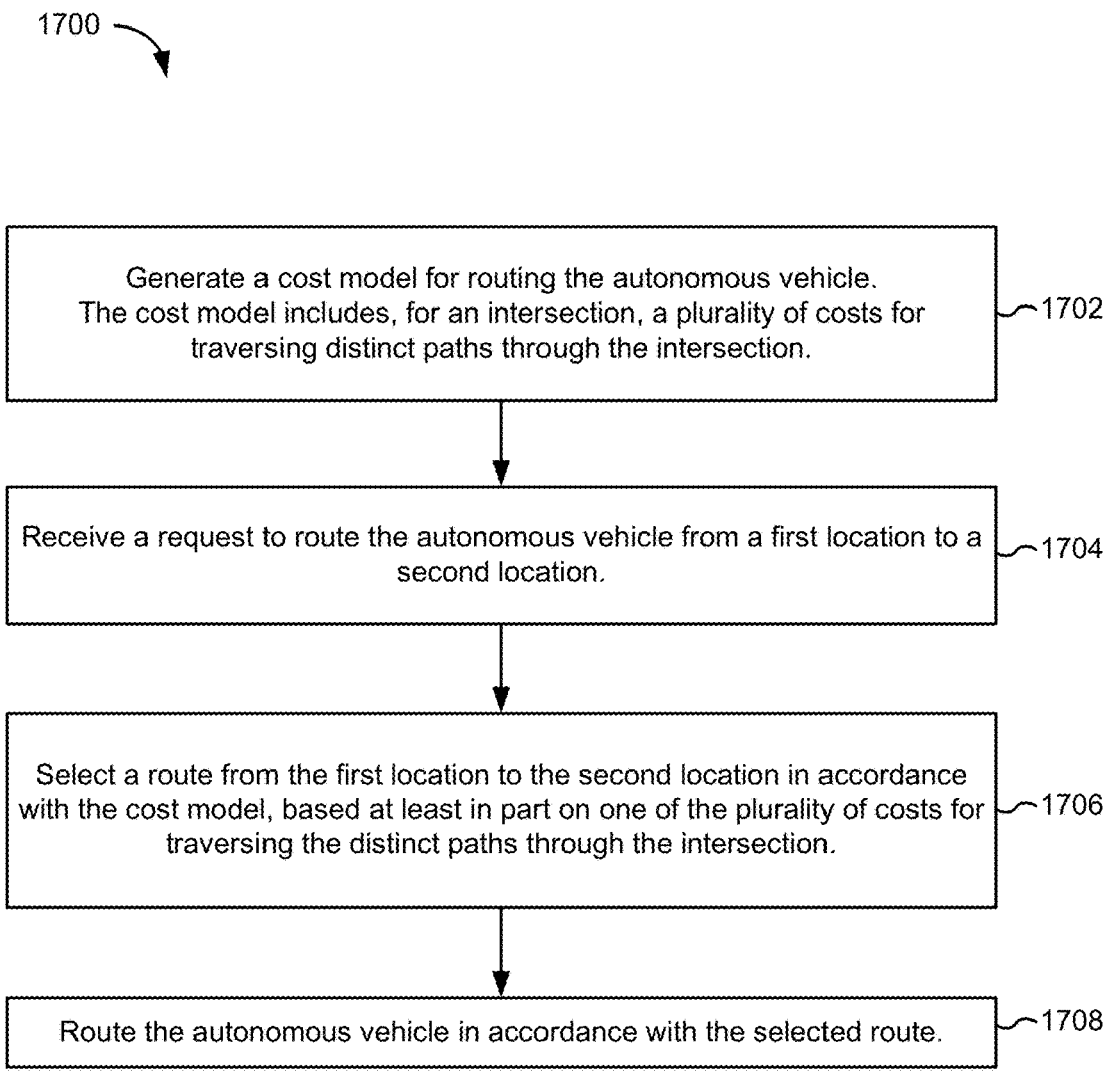
FIG. 17 is a flowchart of a method of autonomous-vehicle routing using a cost model with intersection costs, in accordance with some embodiments.

FIG. 17 is a flow diagram illustrating a method 1700 of autonomous-vehicle routing using a cost model with intersection costs, in accordance with some embodiments. The method 1700 is performed at an electronic device (e.g., vehicle routing server 1420, FIG. 14). While the following discussion describes implementations where the vehicle routing server 1420 performs the steps of the method 1700, in other embodiments, one or more of the steps are performed by another electronic device, such as vehicle 1410-2 (e.g., a computer system on vehicle 1410-2 with non-transitory memory storing instructions for executing the method and one or more processors for executing the instructions). Moreover, some operations in method 1700 are, optionally, combined and/or the order of some operations is, optionally, changed. In some embodiments, some or all of the operations of method 1700 are performed automatically, without human intervention.

As described below, method 1700 provides technical solutions to problems that arise when routing autonomous vehicles. In particular, method 1700 addresses shortcomings in the abilities of autonomous vehicles by perform certain maneuvers at intersections by sending the autonomous vehicles on routes that reduce the likelihood that the autonomous vehicle will have to make such a maneuver. For example, it is generally easier to make a right-hand turn than an un-protected left turn. In some circumstances, method 1700 will make un-protected left turns "more expensive" (in terms of a cost in a cost model), than right-hand turns, thus reducing the number of unprotected left turns made by the autonomous vehicle. Routing autonomous vehicles in a way that is tailored to their capabilities increases passenger comfort and safety, conserves resources (e.g., cuts down on carbon emissions and/or battery usage from autonomous vehicles), reduces traffic.

Figure 4B:
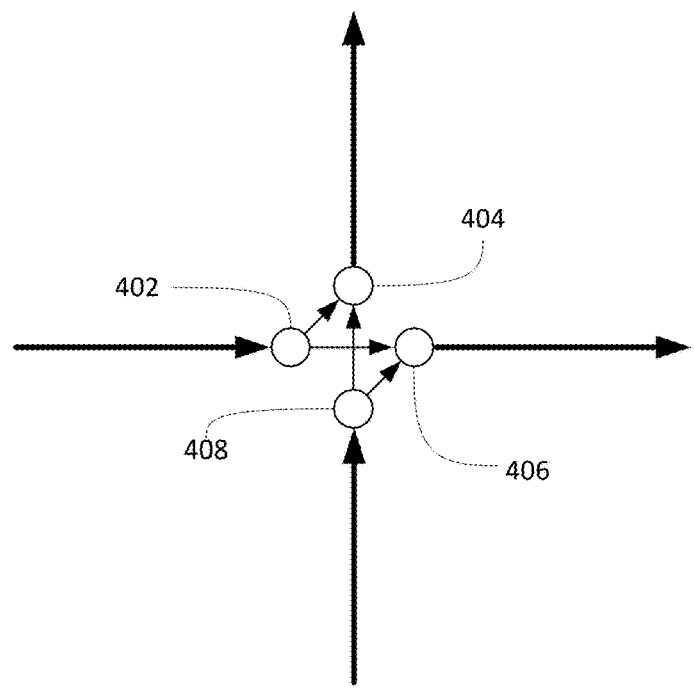
FIG. 4B is a two-dimensional birds-eye view illustrating an example of an intersection that is represented as a plurality of nodes (instead of a single node) and a plurality of edges, where some of the edges represent paths through the intersection, in accordance with some embodiments.

The vehicle routing server 1420 generates (1702) a cost model for routing the autonomous vehicle from a first location to a second location. The cost model includes, for an intersection, a plurality of costs for traversing distinct paths through the intersection. Respective costs correspond to respective paths through the intersection. In some embodiments, the cost model includes representations of intersections, as described with reference to the section above under the heading "Constructing the Routing Graph." In some embodiments, the cost model is represented as a graph of nodes and edges. The respective edges have respective edge weights that represent costs. The vehicle routing server 1420 represents the intersection as a plurality of nodes and a plurality of edges in the graph. Each edge of the representation of the intersection represents a distinct path through the intersection. For example, FIG. 4 illustrates a plurality of paths through an intersection represented as edges (e.g., a path from the southern side (S) of the north-south road to the eastern side (E) of the east-west road; a path from the southern side (S) of the north-south road to the northern side (N) of the north-south road).

Further, the generating operation 1702 may have any of the characteristics of the generating operations described elsewhere herein (e.g., edge weights are assigned in response to the request and optionally include costs associated with a particular vehicle's constraints).

In some embodiments, the vehicle routing server 1420 forgoes representation of a forbidden path through the intersection. For example, in FIG. 4, no edge exists between the southern side (S) of the north-south road and the western side (W) of the east-west road because the east-west road is a one-way road going east).

In some embodiments, the intersection is an intersection of a plurality of roads. Each road in the plurality of roads has one or more costs distinct from the plurality of costs for traversing the distinct paths through the intersection (e.g., the roads that intersect at the intersection have their own costs that are distinct from the costs for the paths through the intersection). In some embodiments, the edges representing paths through the intersection have different characteristics from the edges representing roads (e.g., as shown in Table 1 above).

In some embodiments, the plurality of costs for traversing the distinct paths through the intersection include one or more costs of a driving maneuver for traversing one of the distinct paths through the intersection (e.g., a lane change, a right turn, a left turn, an unprotected left turn, a U-turn, and a highway merge). The cost of driving maneuvers, and the technical benefits thereof, are described in greater detail with reference method 1500.

The vehicle routing server 1420 receives (1704) a request to route the autonomous vehicle from a first location to a second location. In some embodiments, the cost model is generated after receiving the request (e.g., in response to receiving the request). In some embodiments, the vehicle routing server 1420 receives a current location of the autonomous vehicle. For example, the request to route the autonomous vehicle from the first location to the second location includes the current location of the autonomous vehicle (e.g., the first location). The request may have any of the characteristics of the request described with respect to the request receiving operations in methods 1500 and 1600 (FIGS. 15A-15B, 16).

In response to the request, the vehicle routing server 1420 selects (1706) a route from the first location to the second location in accordance with the cost model, based at least in part on one of the plurality of costs for traversing the distinct paths through the intersection (e.g., as described above with respect to the selecting operations in methods 1500 and 1600).

Further in response to the request, the vehicle routing server 1420 routes (1708) the autonomous vehicle in accordance with the selected route (e.g., as described above with respect to the routing operations in methods 1500 and 1600).

It should be understood that the particular order in which the operations in FIG. 17 have been described is merely exemplary and is not intended to indicate that the described order is the only order in which the operations could be performed. One of ordinary skill in the art would recognize various ways to reorder the operations described herein. For brevity, these details are not repeated here. In addition, the operations in FIG. 17 may be combined with other operations described elsewhere (e.g., with reference to FIGS. 15A-15B, 16, and 18) or have characteristics described with reference to analogous operations described elsewhere (e.g., the routing operation of method 1700 may optionally share any of the characteristics of other routing operations described elsewhere herein).

Figure 18:
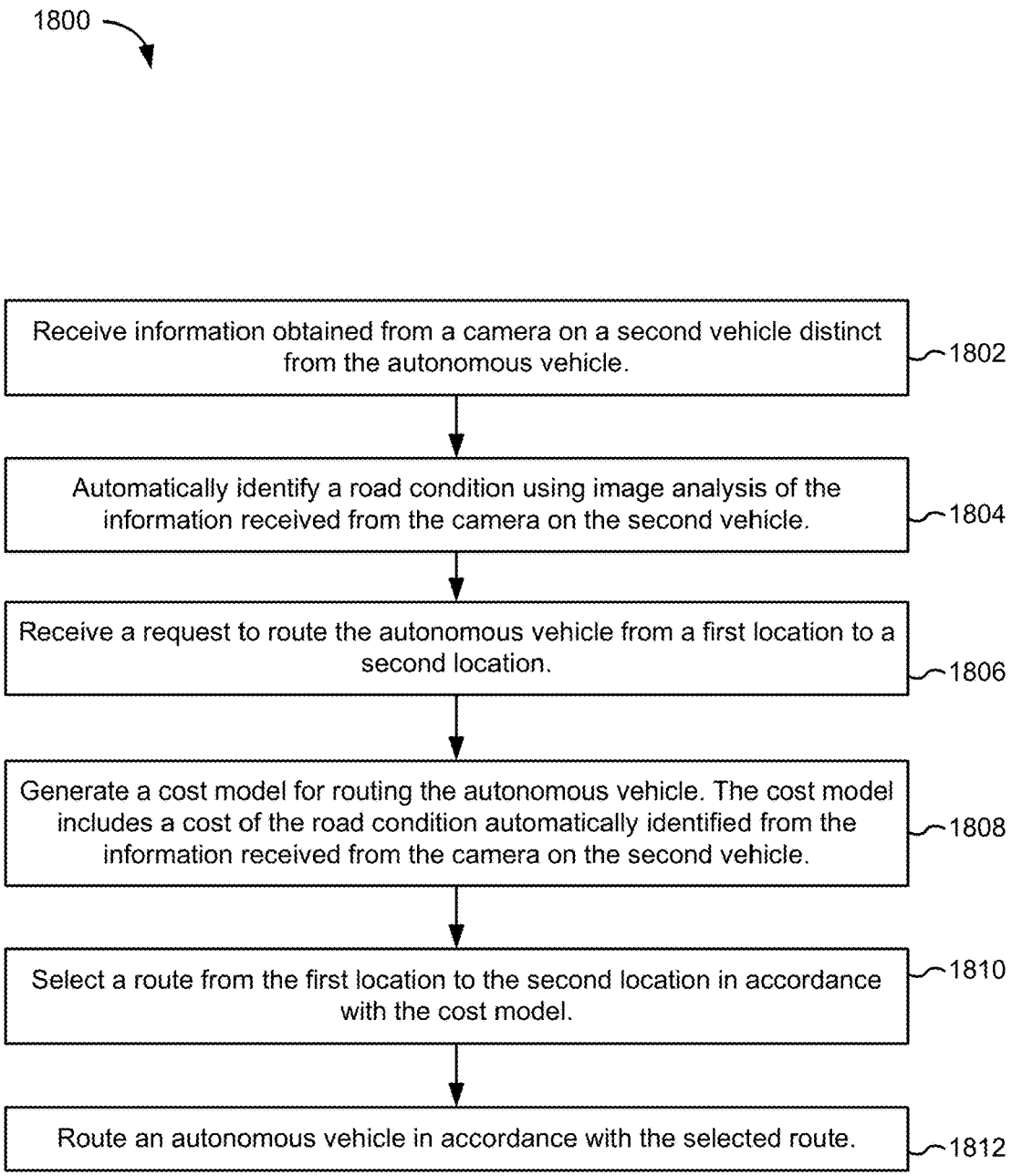
FIG. 18 is a flowchart of a method of overlaying real-time data onto an autonomous-vehicle-routing cost model, in accordance with some embodiments.

Method of Overlaying Real-Time Data onto an Autonomous Vehicle Routing Cost Model FIG. 18 is a flow diagram illustrating a method 1800 of overlaying real-time data onto an autonomous-vehicle-routing cost model, in accordance with some embodiments. The method 1800 is performed at an electronic device (e.g., vehicle routing server 1420, as shown in FIG. 14). While the following discussion describes implementations where the vehicle routing server 1420 performs the steps of the method 1800, in other embodiments, one or more of the steps are performed by another electronic device, such as a vehicle 1410-2 (e.g., a computer system on vehicle 1410-2 with non-transitory memory storing instructions for executing the method and one or more processors for executing the instructions). Moreover, some operations in method 1800 are, optionally, combined and/or the order of some operations is, optionally, changed. In some embodiments, some or all of the operations of method 1800 are performed automatically, without human intervention.

As described below, method 1802 provides technical solutions to problems that arise when routing autonomous vehicles by recognizing the importance of vehicles in the Internet of Things (IoT). In particular, method 1802 recognizes that vehicles, especially autonomous vehicles, are not just modes of transportation but also represent a vast array of moving sensors, capable of detecting conditions that are relevant to the technical problem of routing autonomous vehicles. Thus, in some embodiments, method 1802 routes an autonomous vehicle using road conditions automatically determined using information from sensors on other vehicles, allowing the autonomous vehicle to be routed more efficiently. Routing autonomous vehicles more efficiently conserves resources (e.g., cuts down on carbon emissions and/or battery usage from autonomous vehicles), increases passenger comfort and safety, reduces traffic.

The vehicle routing server 1420 receives (1802) information obtained from a camera (e.g., a dashcam or an autonomous vehicle camera sensor) on a second vehicle (e.g., additional vehicle) distinct from the autonomous vehicle to be routed. In some embodiments, information is obtained from cameras in a fleet of cameras, some human driven (e.g., with dashcams) and/or some autonomous (e.g., with dashcams and/or autonomous vehicle camera sensors). In some embodiments, the information is obtained in real-time as it is acquired by the camera (e.g., received without an intentionally introduced delay so that it is available to vehicle routing server 1420 within a matter of seconds after being acquired by the camera). In some embodiments, vehicle routing server 1420 continuously receives the information obtained from the camera (e.g., the vehicle routing server 1420 continuously monitors for new camera information). In some embodiments, the information obtained from the camera includes one or more images that are analyzed by vehicle routing server 1420 (e.g., as described below with respect to operation 1804). In some embodiments, the images include still pictures. In some embodiments, the images comprise a video feed. In some embodiments, the images are analyzed by a computer on the vehicle 1410 and the information obtained from the camera includes the automatically identified road conditions (e.g., as described below with reference to operation 1804).

The vehicle routing server 1420 automatically identifies (1804) a road condition using image analysis of the information received from the camera on the second vehicle. Identification of road conditions is described above with reference to the sections under the headings "Real-Time Data for Powering Fleets of Autonomous Vehicles," "Weather Recognition," "Vision-based Classifier," and "Extended Kalman Filter for Estimating Position and Speed to Improve Detection."

The vehicle routing server 1420 receives (1806) a request to route the autonomous vehicle from a first location to a second location. In some embodiments, the vehicle routing server 1420 receives a current location of the autonomous vehicle. For example, the request to route the autonomous vehicle from the first location to the second location includes the current location of the autonomous vehicle (e.g., the first location). Route request receiving operation 1806 has any of the characteristics of the route request receiving operations above (e.g., with reference to methods 1500, 1600, and 1700, FIGS. 15A-15B, 16-17).

The vehicle routing server 1420 generates (1808) a cost model for routing the autonomous vehicle (e.g., generates a cost model as described above, by assigning weights to edges of a graph-based on attributes). The cost model includes a cost of the road condition automatically identified from the information received from the camera on the second vehicle. In some embodiments, the cost model is generated in response to the request. In some embodiments, generating the cost model includes updating a previous cost model in response to the request. In some embodiments, the cost model is updated in real-time as road conditions are identified from cameras on other vehicles. In some embodiments, generating the cost model includes assigning an attribute to a road, lane in a road, driving maneuver, or geographical area based on a road condition automatically identified for that road, lane, driving maneuver, or geographical area using camera information.

In some embodiments, the vehicle routing server 1420 determines whether the road condition is present at the time of the request. The cost of the road condition is included in the cost model in accordance with a determination that the road condition is present at the time of the request.

For example, the vehicle routing server 1420 may determine that it is snowing on Mountain Road based on dashcam data from a vehicle being driven on Mountain Road. The vehicle routing server 1420 then assigns the attribute "snowing" to Mountain Road until it can be determined that it is no longer snowing on Mountain Road. When a route request is received while Mountain Road has the "snowing" attribute, the vehicle routing server 1420 assigns a cost to Mountain Road for the snowing attribute (e.g., a fixed cost or a cost based on the requesting autonomous vehicle's ability to drive in the snow).

In some embodiments, the vehicle routing server 1420 determines from second camera information (e.g., from a third vehicle distinct from the second vehicle (e.g., additional) and the autonomous vehicle) that the road condition is no longer present. For example, the vehicle routing server 1420 determines from another vehicle that it is now "sunny" on Mountain Road and that Mountain Road is clear of snow, and removes the attribute for "snowing."

In some embodiments, the road condition automatically identified from the information received from the camera on the second vehicle (e.g., additional) is a condition selected from the group consisting of a weather condition, a road condition due to weather, a road condition due to construction, and a road condition due to a traffic accident.

In some embodiments, the road condition automatically identified from the information received from the camera on the second vehicle (e.g., additional) is a condition selected from the group consisting of a sunlight angle, pedestrian traffic, non-motorized vehicle traffic, a pavement condition, and a lack of lane lines.

Further in response to the request, the vehicle routing server 1420 selects (1810) a route from the first location to the second location in accordance with the cost model (e.g., as described with respect to the selecting operations above).

Still further in response to the request, the vehicle routing server 1420 routes (1812) the autonomous vehicle in accordance with the selected route (e.g., as described with the routing operations above)

It should be understood that the particular order in which the operations in FIG. 18 have been described is merely exemplary and is not intended to indicate that the described order is the only order in which the operations could be performed. One of ordinary skill in the art would recognize various ways to reorder the operations described herein. For brevity, these details are not repeated here. In addition, the operations in FIG. 18 may be combined with other operations described elsewhere (e.g., with reference to FIGS. 15A-15B and 16-17) or have characteristics described with reference to analogous operations described elsewhere (e.g., the routing operation of method 1800 may optionally share any of the characteristics of other routing operations described elsewhere in this document).

Many-to-Many Vehicle Routing and Management

There have been efforts in the past to solve problems such as the Vehicle Routing Problem (VRP), and some of its variants (e.g., Dial-A-Ride, Capacitated VRP, etc.). Some implementations described below solve sizable problems at scale. Broadly speaking, some implementations involve breaking the larger problem down into smaller sub-problems using spatio-temporal clustering, and then parallelizing these sub-problems across specialized solver instances to find solutions quickly.

Fleet Routing Problem (FRP)

A fleet routing problem (FRP) can be defined as follows: given set of vehicles with heterogeneous capacity (e.g., a non-constant fleet size), with vehicles at various locations and multiple pickup/drop-off requests that can be time-window constrained (e.g., no one should wait more than 10 minutes for a pick-up), assign a subset of the vehicles with the task of picking up and dropping off everyone while minimizing an objective function. An objective function can take various forms, including a so-called canonical form:

$$C = \Sigma_V(w_1 R_v + w_2 D(R_v))$$

In the equation above, C is an overall cost function for the entire fleet, V is a set of vehicles, Rv is a cost of a route taken by a vehicle v, and D is a discomfort cost function of the passengers according to the route. For example, the cost function D balances a passenger's waiting time and overall travel time using weight coefficients $w_1$ and $w_2$.

Because VRP is an NP-Hard optimization problem, generalized VRP solvers (e.g. MILPs or CPs) take an unacceptably long time to solve, even when applied to problems of modest size (e.g. 10 vehicles for 100 requests). For situations involving real-time request patterns and updates, there is a need to solve much larger problems in real-time.

Architecture

Figure 19:
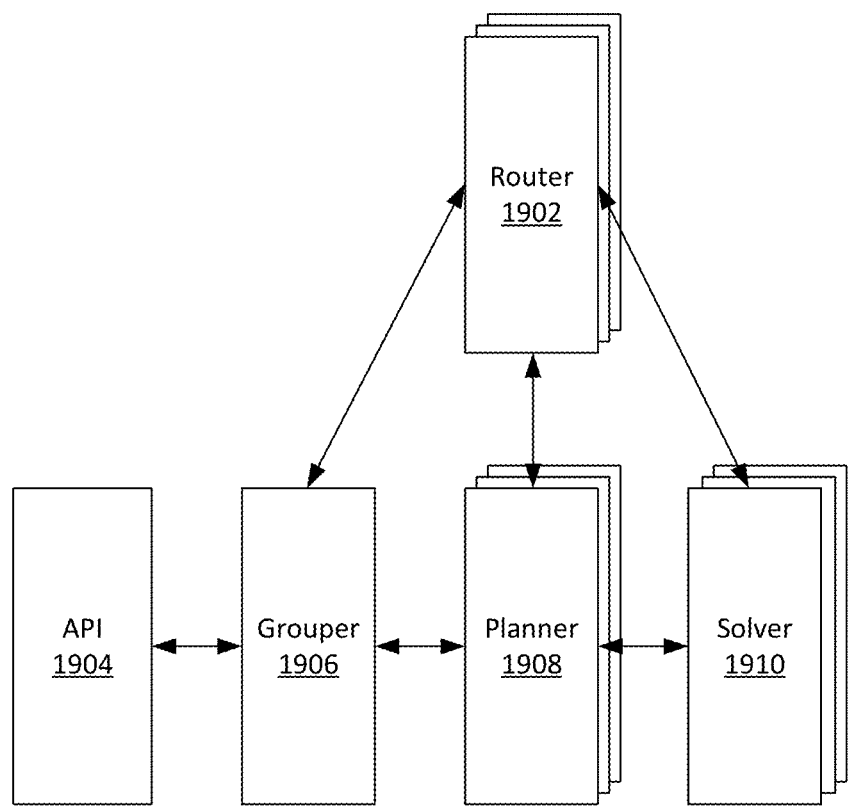
FIG. 19 is a block diagram illustrating an example architecture for routing a fleet of vehicles, in accordance with some embodiments.

An example architecture for solving an approximated version of the fleet routing problem is shown in FIG. 19. The router 1902 determines routes as described elsewhere in this document, calculates estimated times of arrival and costs for many-to-many requests (e.g., a plurality of passengers making requests, each of which can be serviced by any one of a plurality of vehicles). The solver 1910 services the instances of the FRP problem from the planner 1908, as described below. In some embodiments, each vehicle of the plurality of vehicles (e.g., in a fleet) is solved in parallel by planner 1908.

The grouper 1906 breaks larger FRP problem into a plurality of smaller FRP problem instances via spatio-temporal clustering.

In some embodiments, the grouper 1906 assigns passengers to a set of potential stops and performs agglomerative clustering to partition stops into independently solvable groups by planner 1908, allowing a parallelizable divide-and-conquer.

Figure 20:
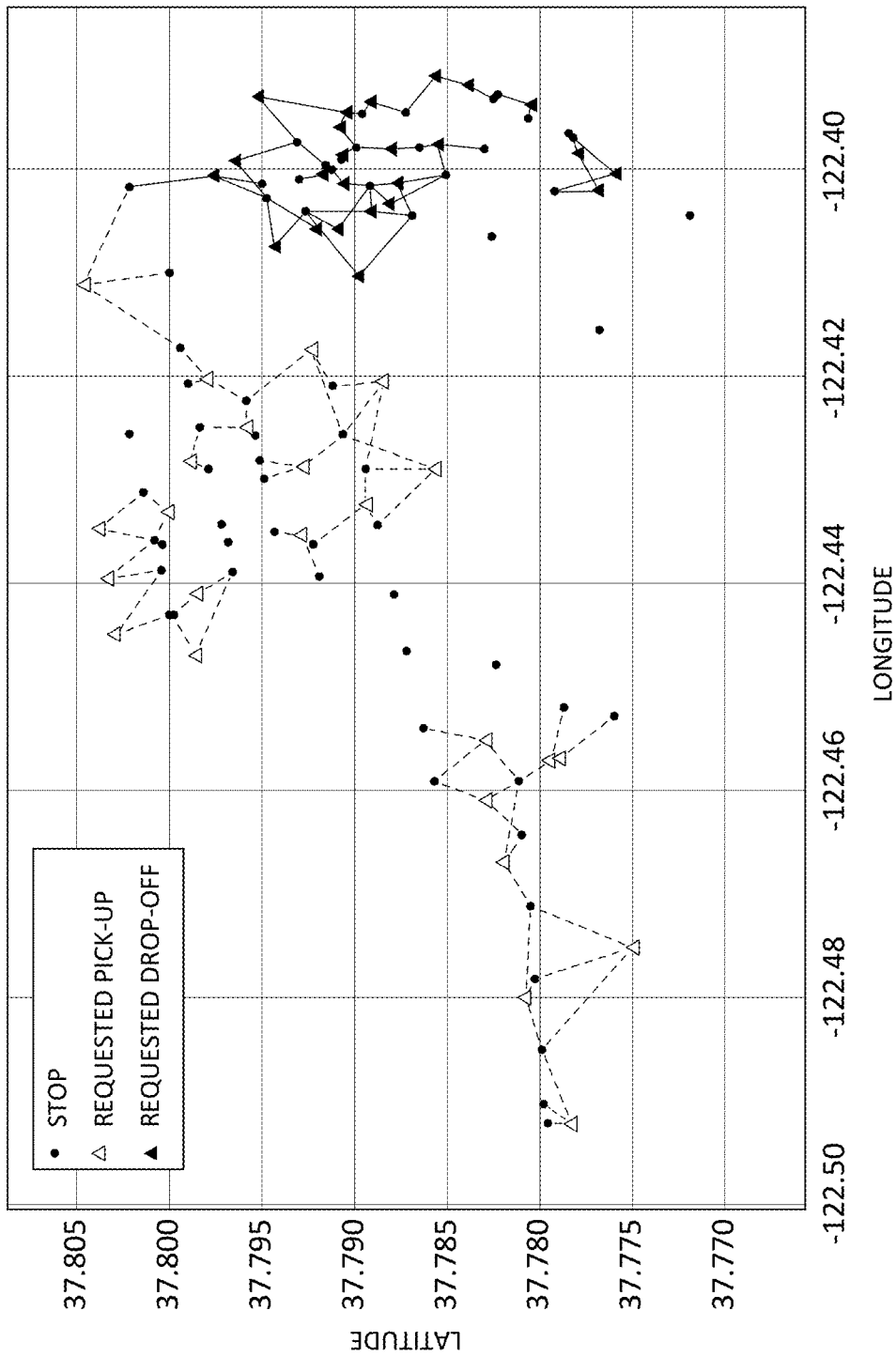
FIG. 20 illustrates stops assigned to requested pick-up and drop-off locations, in accordance with some embodiments.

In some embodiments, passenger pickup/drop-offs are assigned to a set of N potential stops, ranked by walking distance. FIG. 20 illustrates requested pick-ups and drop-offs assigned to (e.g., represented by a line connecting the stop and the location of the request) potential stops based on a distance between the requested pick-up/drop-off locations.

Figure 21:
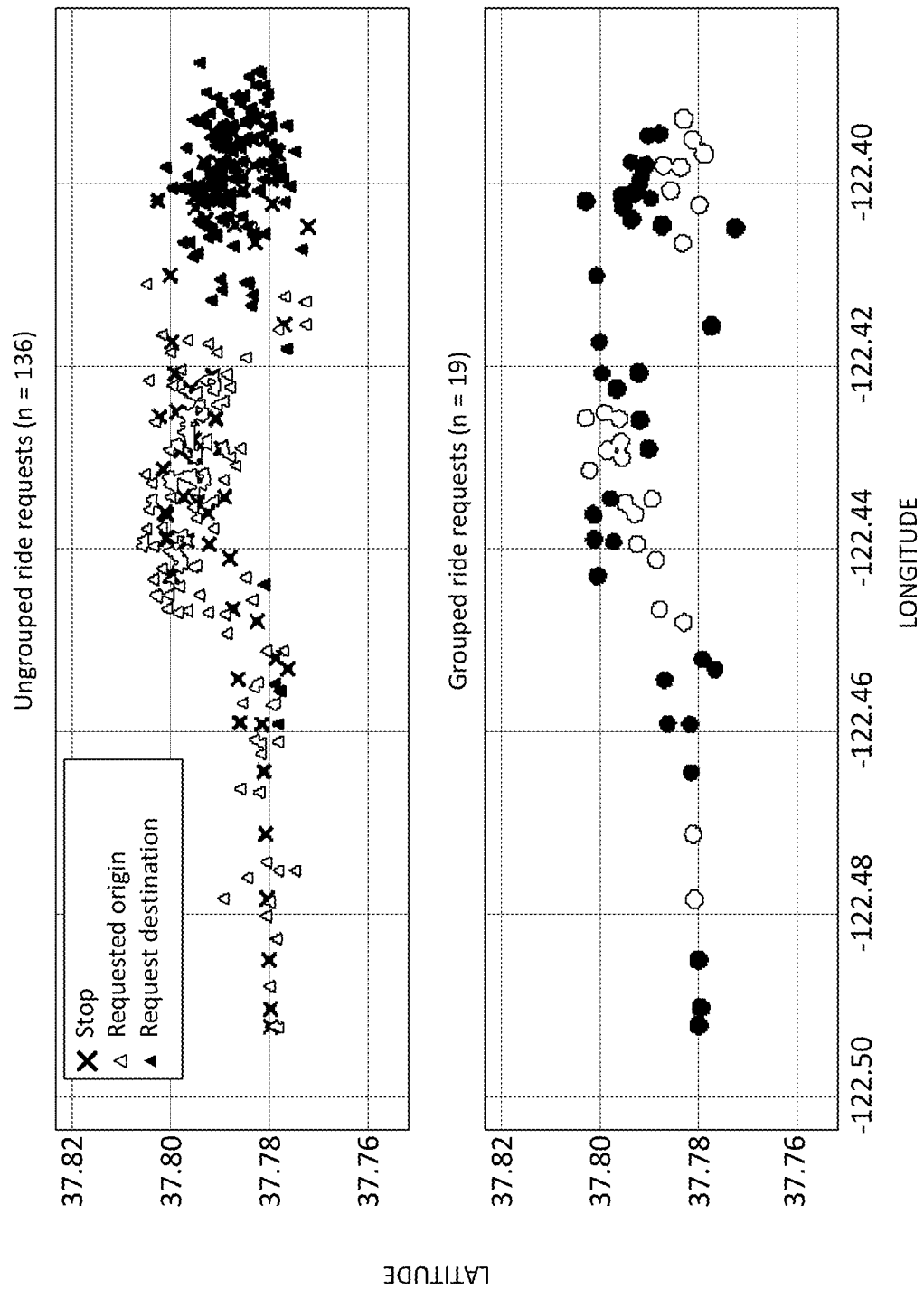
FIG. 21 illustrates ride request graphs for ungrouped and grouped ride requests, in accordance with some embodiments.

FIG. 21 illustrates that, in some embodiments, requests are grouped spatially via agglomerative clustering with complete/maximum linkage using real-time driving ETAs (e.g., provided by the router) as a distance/cost function. This clustering corresponds to minimizing the maximum distance between any two stops in a cluster. A target k clusters is used such that the maximum number elements in a cluster is solvable by planner to hit a target latency (e.g., 5 seconds).

After clustering, a plurality of vehicles is assigned to pairs of clusters. In some embodiments, vehicles are filled to capacity while minimizing their travel distance.

Figure 22:
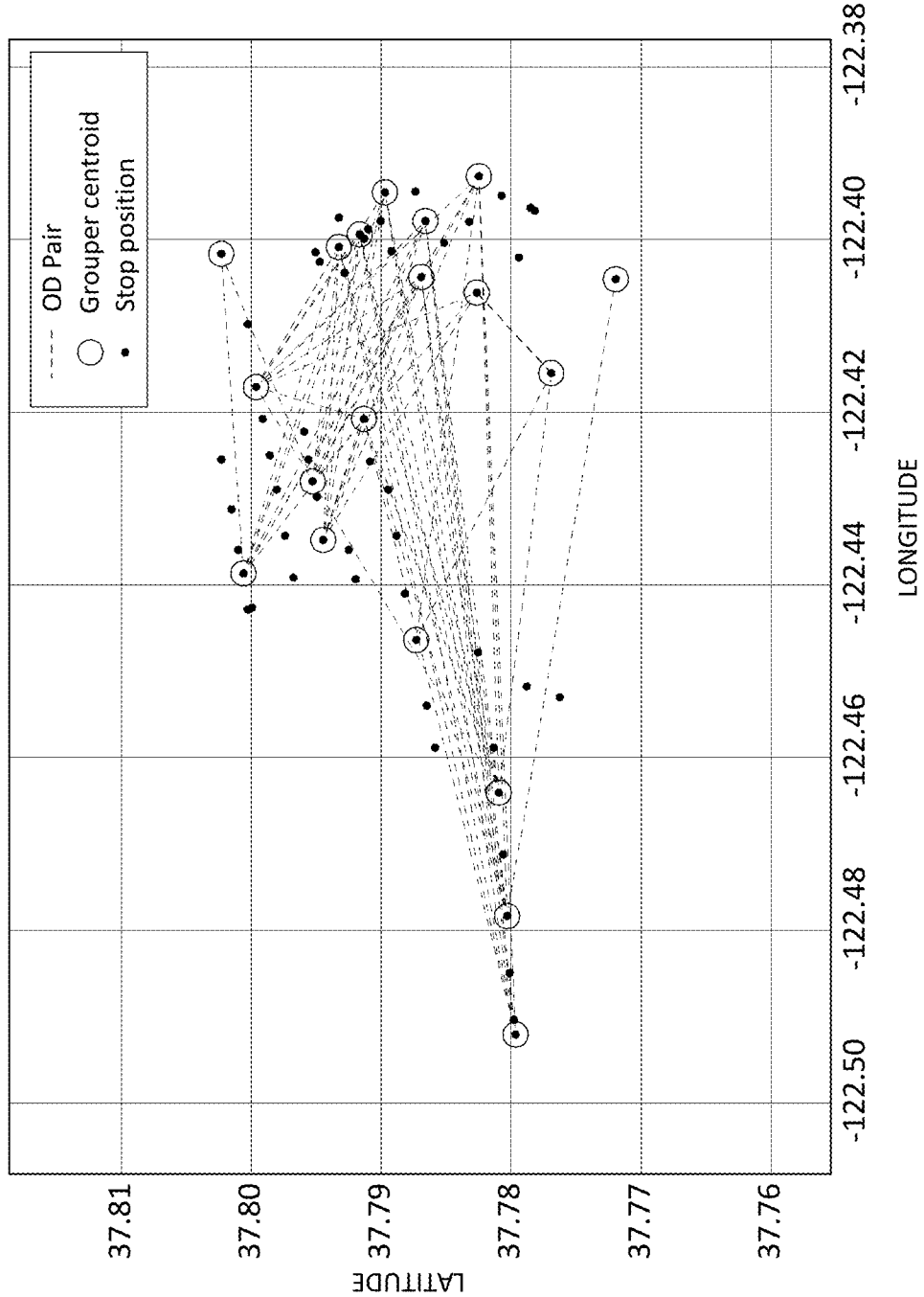
FIG. 22 is a two-dimensional spatial representation illustrating creation of cluster pairs of vehicles, in accordance with some embodiments.

In some embodiments, cluster pairs are represented as centroids with edges corresponding to load/demand to traverse between clusters, as shown in FIG. 22.

Each vehicle of the plurality of vehicles, now assigned a set of cluster pairs, becomes a sub-plan that is solved in parallel by planner 1908. The number of cluster pairs assigned to a vehicle is a function of the vehicle's capacity and load on the cluster pair.

Figure 23:
FIG. 23 is a two-dimensional map a combined (e.g., unioned) route for a plurality of vehicles, in accordance with some embodiments.

Each vehicle sub-plan is then unioned to form the global fleet plan, as shown in FIG. 23. For example, FIG. 23 illustrates the combined (e.g., global fleet) plan of a plurality of distinct vehicles. Each sub-plan for each vehicle of the plurality of distinct vehicles corresponds to a portion of the combined plan. In some embodiments, the sub-plans of the vehicles at least partially overlap with each other. In some embodiments, each sub-plan for each vehicle is distinct from the sub-plans of the other vehicles.

The planner 1908 is a service that interfaces with the router 1902 and solver 1910 to service plan request and updates (e.g., additions of pick-up/drop-off requests to existing routes, as described below). In some embodiments, the planner 1908 creates cost matrices for each of the plurality of FRP problem instances generated by the grouper 1906. In some embodiments, the cost matrices are generated from real-time ETAs (and, optionally, historical/predictive ETAs). The planner 1908 pipes the plurality of FRP problem instances, with their cost matrices, into the solver 1910 to solve.

The solver 1910 solves FRP problem instances (e.g., the plurality of FRP problem instances passed to the solver from the planner). In some embodiments, the solver 1910 solves the FRP problem instances as instances of the dial-a-ride-problem (DARP), which is a formulation of the fleet routing problem.

To that end, in some embodiments, the problem is broken down from a generalized dynamic programming implementation into a graph search problem, and solved using an A* with an admissible heuristic or Bidirectional Dijkstra's (for the non-time window variant). In some embodiments, states are broken down into the following representation:

$$s=(L_1, \ldots, L_M, k_1, \ldots, k_N)$$

$$L_i \in \{0, 1, \ldots, N, N+1, \ldots, 2N, 2N+1\}$$

$$k_i \in \{W, V_j, D\}$$

$$M = |V|$$

where N is the number of vehicle drop-off pairs. An L state represents a vehicle location: L=0 indicates the vehicle is in an unbounded state, 0<L≤N indicates a pickup location (e.g., L=i is the pick-up state of the $i^{th}$ vehicle when 0<i<N), and N+1≤L≤2N indicates a drop-off. The k states represent the various passenger states, which are part of the set "waiting", "in the jth vehicle", or "dropped off". Thus, s represents the overall state of passengers and vehicles (e.g., the state of the system). In some embodiments, a termination state is a state in which all k states are in the dropped off state. The number of total states f of the system can be calculated exactly as a function of the number of requests and the number of vehicles (O is the "order" of the total number of states):

$$f(M,N) = (2N+1)^M \times (2+M)^N$$

$$O(M,N) = N^M \times M^N$$

Because of the exponential growth rate as a function of the number of vehicles and number of passengers, some embodiments use exact optimality algorithms and keep requests to the solver limited. In some embodiments, however, capacity, time-based, Maximum-Position Shift (MPS), and consistency constraints are used to help keep the graph search limited and efficient for small problems (e.g., 2 vehicles with 5 pickup-dropoff pairs).

Graph Space Representation of the State of a Plurality of Passengers and Vehicles An FRP problem instance can be solved as an optimization problem of the following form:

$$\min \Sigma_i (w_1 \Sigma T_i + w_2 (\alpha WT_j + (1-\alpha) \times RT_j))$$

Where Ti represent the traversal time of the legs of the route, WTj represents the total waiting time of the jth customer and RTj represents the total ride time of the jth customer. This function can be minimized and solved for the optimal routes by mapping our state space to a graph with transition edges that incorporate individual elements in this function. Alpha ($\alpha$) is a constant that expresses a preference for passengers being in the vehicle rather than waiting.

In some embodiments, the graph search is initialized from $s_0 = (0, 0, \ldots, 0, W, W, \ldots, W)$, and terminated when the terminating node is reached: $s_T = (2N+1, 2N+1, \ldots, 2N+1, D, D, \ldots, D)$.

Figure 24:
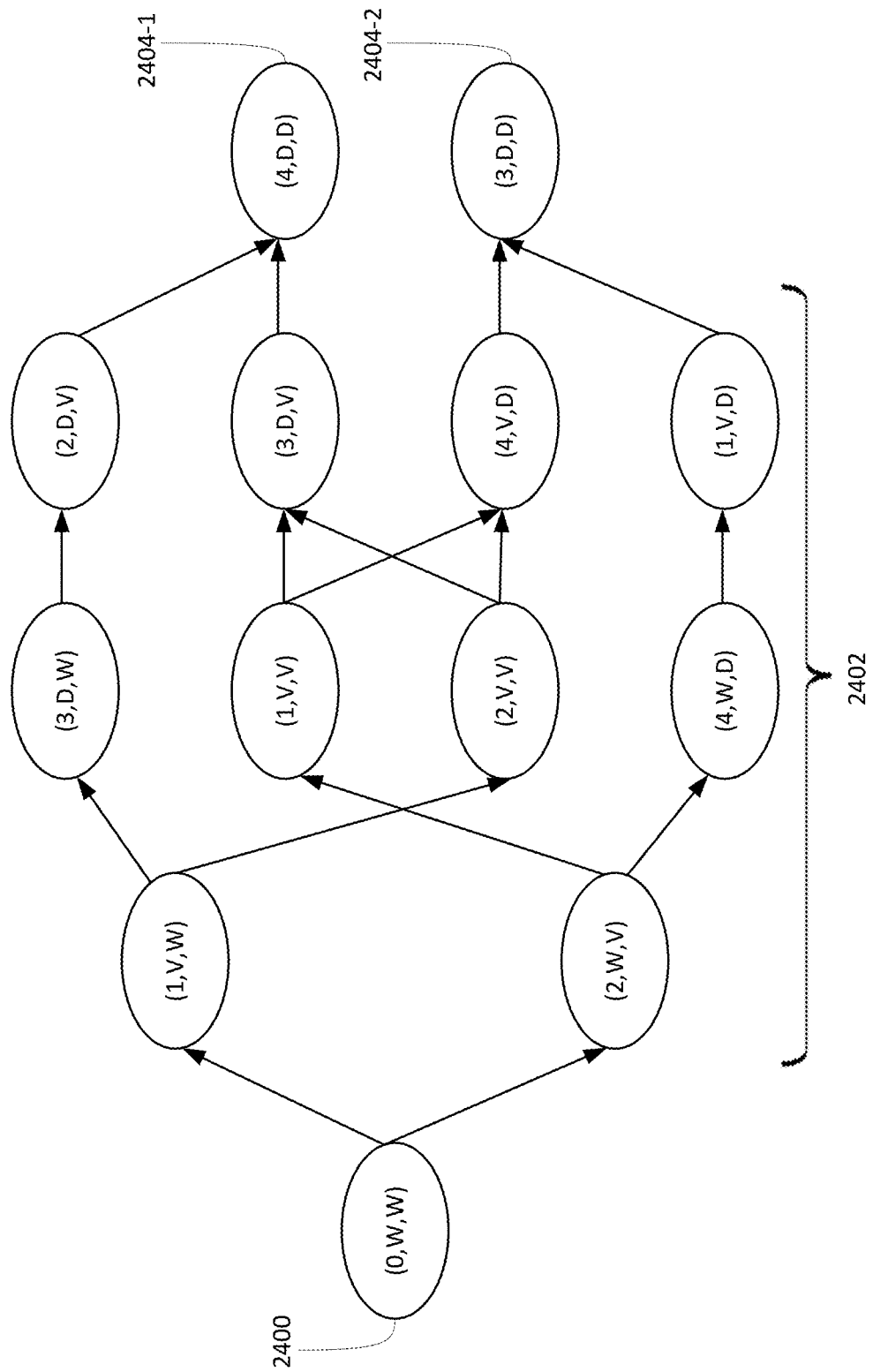
FIG. 24 is a state graph representation of a plurality of passengers and vehicles, in accordance with some embodiments.

Consider, as an example, one vehicle with two pick-up/drop-off locations. From the optimization function above we can calculate the total number of states as 45, however many of those will be inconsistent, e.g., (1, W, W). The graph for this example is shown in FIG. 24 (e.g., which shows a state graph representation of the plurality of passengers and vehicles).

Here the first node 2400, "(0, W, W)", indicates the initial state (a vehicle in an unbounded position with no passengers), the nodes 2402 indicate various states during the plan, and the nodes 2404-1 and 2404-2 are terminal nodes. From a shortest path perspective, the problem is to route from the first node 2400 to either of the terminal nodes 2404-1 or

2404-2 (a one-to-any routing problem), where an edge from state $s_i$ to $s_j$ is given edge weights:

$$w(s_i,s_j)=w_1 \times t(s_i,s_j)+w_2 \times (\alpha \times x_W+(1-\alpha) \times X_V)$$

Here the t function indicates the travel time to go from to $S_j$, $X_W$ indicates how many passengers are waiting in the state $S_i$, and $X_V$ indicates how many riders are in the vehicle in $S_i$. Note that a sum of edge weights for a path exactly equals the minimization function, and so finding the shortest path through this graph is equivalent to solving the optimization problem.

Also note that the effective search space size (13 nodes) is significantly smaller than the total number of states (45). A large number of states are inconsistent, and may not be practically reachable, which allows the graph to be traversed in a narrow subspace for the graph. In some circumstances, the size of the subspace for the graph asymptotically approaches ⅓ of the size of the total space. Adding constraints like capacity or MPS narrows the subspace even further, rather than increasing the search space as they might in a general MILP or CP solver.

Search Algorithms

Because some embodiments solve the DARP in graph space, some embodiments apply graph search techniques and algorithms to speed up the search. For example, instead of applying a breadth first search, some embodiments Dijkstra's algorithm to speed up the search. For non-time-window searches, some embodiments search in the reverse direction and implement Bidirectional Dijkstra's algorithm to resolve the search more quickly.

Even with time windows however, some embodiments apply a unidirectional search in the forward direction with an admissible lower bound heuristic and use the A* search algorithm. Furthermore, any heuristics can be combined via a max function to find the best heuristic during the search. Below, exemplary heuristics are discussed.

Simple Lowest Bound Heuristic

A cost from a state $S_i$ to a terminal state $S_T$ can be written as follows:

$$C(S_i,S_T)=\Sigma_P(w_1 \Sigma_P T_j + w_2 \Sigma_P(\alpha \times WT_j + (1-\alpha) \times RT_j))$$

Where the inner summations are over the shortest path P from state $S_i$ to terminal state $S_T$. Because $w_1$ and $w_2$ are nonnegative, as well as the inner summands, and combined with the triangle inequality for routing distances, a lower bound of the cost can be established:

$$\Sigma_P(w_1 \Sigma_P T_j + w_2 \Sigma_P(\alpha \times WT_j + (1-\alpha) \times RT_j)) \geq w_1 \times t(S_i,S_T)=h(S_i,S_T)$$

An A* heuristic function, $h_S$, can then be defined as a minimum over all termination nodes:

$$h_{S(s_i)}=\min h(S_i,S_T)$$

Pickup-Dropoff Bound Heuristic

A heuristic can be constructed taking into account information about the current state's number of waiting, picked up, and dropped off passengers. To that end, in some embodiments, the following values are defined:

$$t_P=\min t(S_D,S_P)$$

$$t_D=\min t(S_P,S_D)$$

Where SD are the drop-off states and $s_P$ are the pickup states. If a vehicle is in a drop off currently and needs to make another pickup before being done, a lower bound of the cost can be established:

$$h_P(S_D)=w_1 \times t_D$$

Similarly, if there is a need for a pickup and a need to drop off at least one person a lower bound of the cost can be established:

$$h_P(S_P)=W_1 \times t_P$$

Dynamic Requests

For large problems (e.g., 10 or more pickup requests and a fleet of vehicles), a graph space exploration becomes quickly infeasible as requests cross an acceptability threshold (e.g., the non-real time latency threshold). For these cases, in some embodiments, the solver supports incremental plan updates, where it takes an existing solution and inserts new requests into an existing path in the state space, instead of running an entire graph exploration.

Greedy Incremental Update

Some implementations insert a new pickup or drop-off into the existing path by minimizing the change in time when inserting that new point. Some embodiments find the optimal insertion point p by solving the following:

$$p=\text{argmin } c(s_i,p)+c(p,s+1)-c(s_i,s+1)$$

Where the $s_i$ refers to the ith state in the solution, and $c(s_i, s_j)$ is the cost to go from $s_i$ to $s_j$. For example, FIGS. 25A and 25B illustrate adding an insertion point, triangle 2500, to an existing path.

Suppose there is an existing route with pickup/dropoff points and a need to service the triangle 2500 (e.g., pick-up the triangle at its current location and drop it off somewhere else). Some embodiments calculate where to insert the triangle 2500 (e.g., which leg of the path to break) by minimizing the difference in time gained by breaking the leg. Note that the time change should always be positive because of the triangle inequality.

Routing Method for a Ride-Share Transportation Network

Figure 26B:
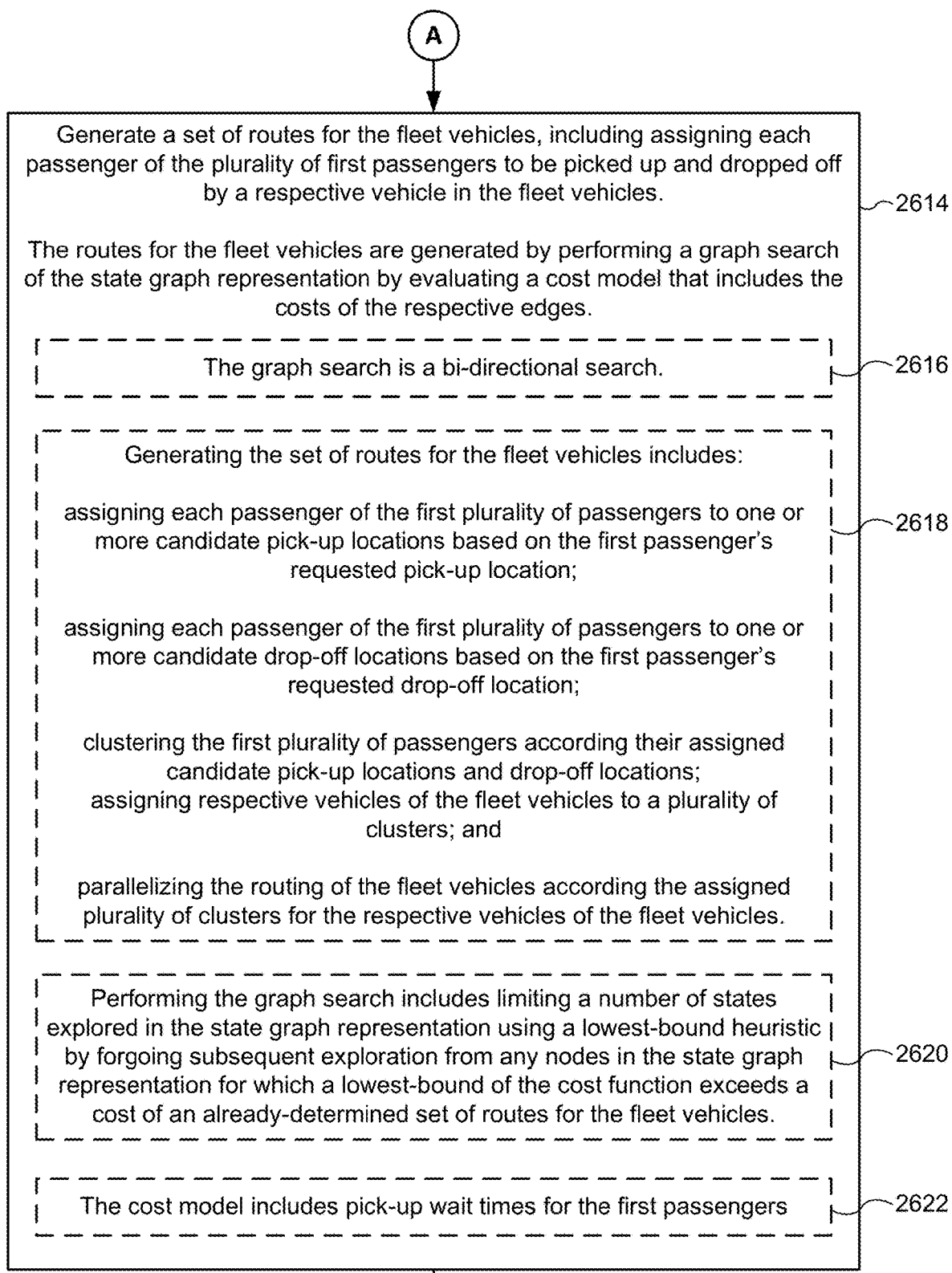
Figure 26C:
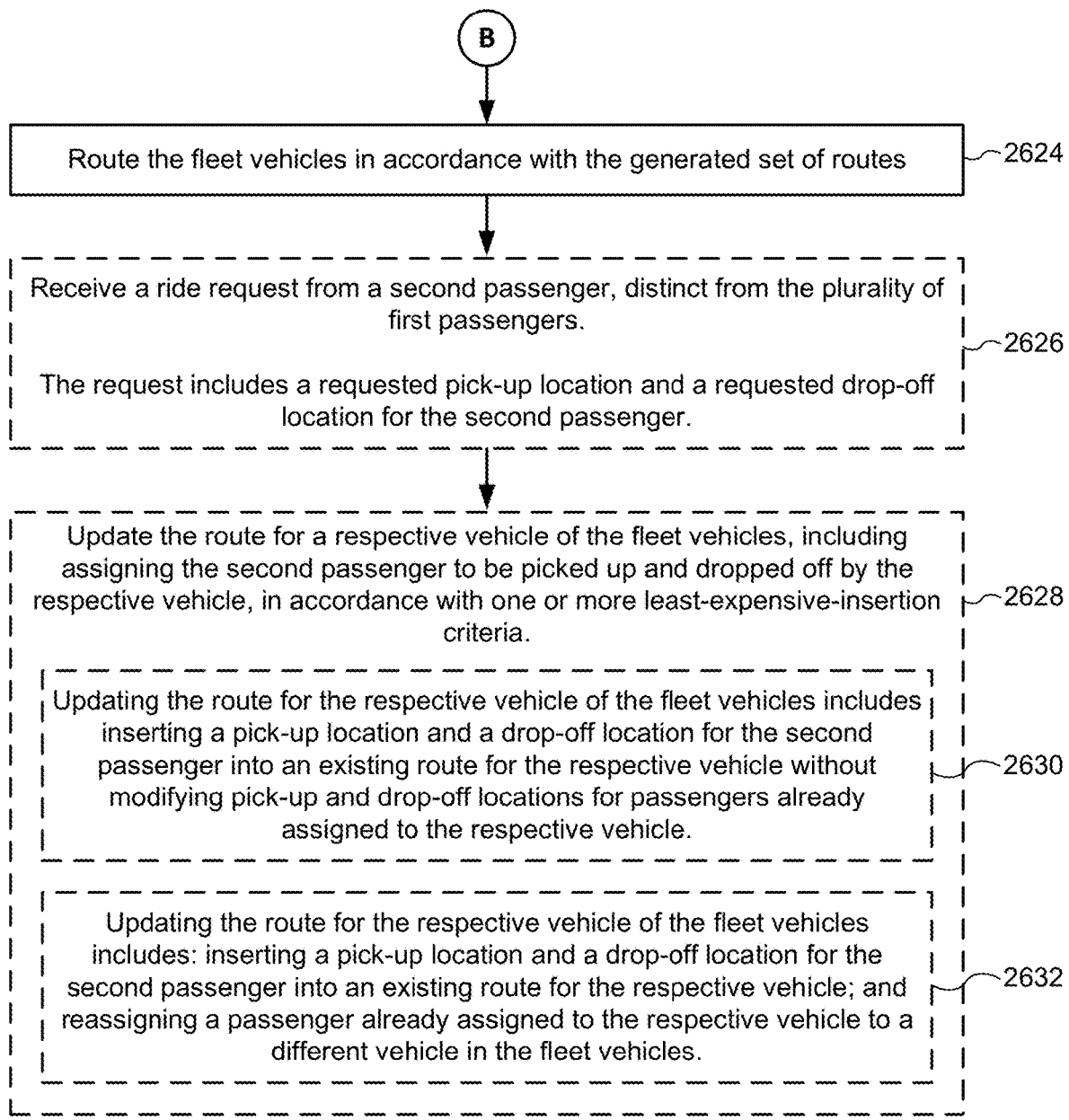

FIGS. 26A-26C are a flow diagram illustrating a routing method 2600 for a ride-share transportation network, in accordance with some embodiments. The method 2600 is performed at an electronic device (e.g., vehicle routing server 1420, FIG. 14, which may use the architecture shown in FIG. 19). While the following discussion describes implementations where the vehicle routing server 1420 performs the steps of the method 2600, in other embodiments, one or more of the steps are performed by another electronic device, such as autonomous vehicle 1410-2 (e.g., a computer system on vehicle 1410-2 with non-transitory memory storing instructions for executing the method and one or more processors for executing the instructions). Moreover, some operations in method 2600 are, optionally, combined and/or the order of some operations is, optionally, changed. In some embodiments, some or all of the operations of method 2600 are performed automatically, without human intervention.

As described below, method 2600 provides technical solutions to the fleet routing problem, discussed above. In particular, method 2600 addresses the problem of how to route a fleet of vehicles to fulfill ride requests that can be scheduled in advance, requested in real-time, or a combination of the two. More efficiently routing a fleet of vehicles (e.g., a plurality of vehicles) to fulfill ride requests conserves resources (e.g., cuts down on carbon emissions and/or battery usage from autonomous vehicles), reduces traffic, and increases passenger comfort and safety.

The vehicle routing server 1420 stores (2602) representations of a plurality of first passengers. Each of the representations of the plurality of first passengers includes a requested pick-up location and a requested drop-off location for a respective first passenger of the plurality of first passengers.

In some embodiments, prior to storing the representations of the plurality of first passengers, the vehicle routing server 1420 receives a ride request from each of the plurality of first passengers. The request includes a requested pick-up location and a requested drop-off location for a respective first passenger. In some embodiments, the ride request from each of the plurality of first passengers is a request to schedule a ride and includes a requested pick-up and/or a requested drop-off time. For example, in some embodiments, the ride request from each of the plurality of first passengers is received at least an hour before the requested pick-up and/or requested drop-off time (e.g., in some circumstances, the ride requests from at least some of the first passengers are received the night before the rides are needed). For example, in some embodiments, as described below, the ride requests from the plurality of first passengers are clustered. To that end, in some embodiments, the vehicle routing server 1420 separately clusters batches of scheduled requests that fall within a predefined pick-up or drop-off time window (e.g., the vehicle routing server 1420 separately batches scheduled ride requests for pick-ups within each half-hour window).

In some embodiments, the ride request from each of the plurality of first passengers is a real-time request (sometimes referred to as a dynamic request) (e.g., a request to be picked-up and/or dropped off as soon as possible). In some embodiments, the ride requests from the plurality of first passengers are dynamic requests that are received near each other in time. For example, in some embodiments, as described below, the ride requests from the plurality of first passengers are clustered. To that end, in some embodiments, the vehicle routing server 1420 separately clusters batches of dynamic requests of a predefined number (e.g., 20 requests, 50 requests, 100 requests). In some embodiments, the vehicle routing server 1420 separately clusters batches of dynamic requests that are received within a predefined time window (e.g., 1 second, 5 seconds, 30 seconds, 1 minute).

The vehicle routing server 1420 stores (2604) representations of a plurality of fleet vehicles. In some embodiments, the fleet vehicles include (2606) a plurality of autonomous vehicles (e.g., autonomous vehicles 1410-2). Routing a fleet of autonomous vehicles solves a technical problem because, unlike human-driven vehicles, autonomous vehicles cannot route themselves and thus must (at least in some circumstances) be routed by a computer. In some embodiments, the plurality of fleet vehicles is (2608) operated by a single operator (e.g., Uber®, Ford®, or Waymo®). Routing a fleet of vehicles operated by a single operator solves a technical problem of distributing costs over the fleet rather than an individual vehicle, which conserves resources (e.g., cuts down on carbon emissions and/or battery usage from autonomous vehicles), reduces traffic, and increases passenger comfort and safety. Here, the term "costs" refers to cost model costs, which are described throughout this document (e.g., with reference to method 1500, FIGS. 15A-5C).

In some embodiments, the vehicle routing server 1420 receives information about the fleet vehicles (e.g., from the vehicles themselves or from the operator of the vehicles). In some embodiments, the information about the fleet vehicles includes a location of each vehicle in the fleet. In some embodiments, the information about the fleet vehicles includes a number (e.g., count) of vehicles in the fleet. In some embodiments, the information about the fleet vehicles includes capabilities of each vehicle (or at least a subset of vehicles) in the plurality of fleet vehicles, which can be used for routing the fleet vehicles in accordance with their capabilities as described with reference to method 1600, FIG. 16.

The vehicle routing server 1420 generates (2610) a graph representation of a geographic map that includes the requested pick-up locations and drop-off locations for the plurality of first passengers. As used herein, the term "graph representation" means a set of nodes and edges. In some embodiments, the edges have costs (also referred to as weights). In some embodiments, the graph representation of the geographic map includes edges that represent roads. In some embodiments, as described with reference to method 1700, FIG. 17, the graph representation of the geographic map includes edges that represent paths through an intersection.

The vehicle routing server 1420 generates (2612) a state graph representation of the plurality of first passengers and the fleet vehicles (e.g., as shown and described with reference to FIG. 24). The state graph representation of the plurality of first passengers and the fleet vehicles is distinct and separate from the graph representation of the geographic map. The state graph representation includes a plurality of nodes connected by edges.

Each node of the plurality of nodes of the state graph representation represents a candidate state of the plurality of first passengers and the fleet vehicles. A candidate state is a state that the plurality of first passengers and the fleet of vehicles will acquire if a route is selected through that candidate state (e.g., a candidate state is a potential state that will become a selected state if a route through the potential state is selected). For example, a candidate state may include information indicating that passenger $p_j$ is riding in vehicle $v_i$.

A respective edge (e.g., each respective edge) of the state graph representation represents an action of a respective vehicle picking up or dropping off a passenger. For example, an edge may represent vehicle vi traveling to pick up passenger $p_j$. Thus, a downstream node connected to that edge will include information indicating that passenger $p_j$ is riding in vehicle $v_i$.

The respective edge has a cost that is based at least in part on traversal of the graph representation of the geographic map. For example, the respective edge has a cost associated with the action of the respective vehicle picking up or dropping off the passenger, which includes a travel time cost or any of the other costs described in this document (e.g., the costs described with reference to method 1500, FIGS. 15A-15B). Thus, in some embodiments, some or all of the edges of the state graph representation of the plurality of first passengers and the fleet vehicles represent a solution to an individual vehicle routing problem (e.g., using the graph representation of the map) associated with the action of picking up or dropping off the passenger.

The vehicle routing server 1420 generates (2614) a set of routes for the fleet vehicles, including assigning each passenger of the plurality of first passengers to be picked up and dropped off by a respective vehicle of the fleet vehicles (e.g., assigning a respective vehicle to each passenger, such that the respective vehicle picks up and drops off the passenger). The routes for the fleet vehicles are generated by performing a graph search of the state graph representation by evaluating a cost model that includes the costs of the respective edges. In some embodiments, generating the route for the respective vehicle includes generating a route for the respective vehicle to an assigned pick-up location for the passenger (e.g., either the requested pick-up location or a different pick-up location that is near the requested pick-up location). In some embodiments, generating the set of routes includes generating a route for the respective fleet vehicle from the assigned pick-up location for the passenger to an assigned drop-off location (e.g., either the requested drop-off location or a different drop-off location that is near the requested drop-off location).

In some embodiments, the graph search is (2616) a bi-directional search (e.g., as described elsewhere in this document). Using a bi-directional search solves a technical problem by allowing the graph search to be completed more quickly. In some circumstances, using a bi-directional search makes the use of a state graph representation practicable (e.g., fast enough to be performed with real-time requests), thus giving rise to the technical benefits of method 2600 more generally (e.g., conservation of resources, reduction of traffic, and increased passenger comfort and safety).

In some embodiments, the state graph representation is generated while performing the graph search of the state graph representation. For example, the vehicle routing server 1420 generates an initial set of nodes and edges of the state graph representation. As described in greater detail below, in some embodiments, the vehicle routing server 1420 uses a lower-bound heuristic to eliminate portions of the state graph representation. Thus, in some embodiments, the vehicle routing server 1420 forgoes generating some or all of the nodes and edges for portions of the state graph representation that have been rendered moot by the lower bound heuristic (e.g., forgoes generating all of the edges and nodes rendered moot by the lower bound heuristic except for those needed to calculate the lower bound heuristic in the first place).

In some embodiments, as described with reference to FIGS. 19-23, generating the set of routes for the fleet vehicles includes (2618): assigning each passenger of the first plurality of passengers to one or more candidate pick-up locations based on the first passenger's requested pick-up location; assigning each passenger of the first plurality of passengers to one or more candidate drop-off locations based on the first passenger's requested drop-off location; clustering the first plurality of passengers according to their assigned candidate pick-up locations and drop-off locations; assigning respective vehicles of the fleet vehicles to a plurality of clusters; and parallelizing the routing of the fleet vehicles according the assigned plurality of clusters for the respective vehicles of the fleet vehicles. In some embodiments, the candidate pick-up (drop-off) locations are permissible pick-up (drop-off) locations near the first passenger's requested pick-up location. In some embodiments, the candidate pick-up (drop-off) locations are locations that an autonomous vehicle can access (i.e., accessible locations for an autonomous vehicle). In some embodiments, the vehicle routing server 1420 provides information to the respective passengers directing the respective passengers to their assigned pick-up locations (e.g., informs the respective passengers of their assigned pick-up locations, or routes the respective passengers to walk to their assigned pick-up locations).

In some circumstances, the clustering process described above allows the fleet routing problem to be parallelized in an efficient manner. In some circumstances, the clustering process described above allows method 2600 to be completed more quickly. In some circumstances, the clustering process described above makes the use of a state graph representation practicable (e.g., fast enough to be performed with real-time requests), thus giving rise to the technical benefits of method 2600 more generally (e.g., conservation of resources, reduction of traffic, and increased passenger comfort and safety).

In some embodiments, as described with reference to the sections labeled "Simple Lowest Bound Heuristic" and "Pickup-Dropoff Bound Heuristic," performing the graph search includes (2620) limiting a number of states explored in the state graph representation using a lowest-bound heuristic by forgoing subsequent exploration from any node in the state graph representation for which a lowest-bound of the cost function exceeds a cost of an already-determined set of routes for the fleet vehicles. As used herein, a lower-bound heuristic is a condition that limits a search space (e.g., limits exploration of the state graph representation by forgoing subsequent exploration from a respective node) based on determination of a lower-bound of the cost function. A lower-bound of the cost function for a respective node means that any actual route from the respective node will have a cost that is greater than or equal to the lower-bound of the cost function (e.g., the lower-bound of the cost function is a floor of the cost of a route from the respective node). Thus, in some embodiments, the vehicle routing server 1420 determines a lower-bound for a respective node (e.g., a plurality of nodes) in the state graph representation and forgoes subsequent exploration from the respective node (e.g., the plurality of nodes) in the state graph representation based on the lower-bound heuristic (e.g., if the lower-bound on the cost exceeds the costs of an already-existing solution to the routing problem).

For example, if the graph exploration goes to a respective node that represents a passenger entering a respective vehicle, at a minimum, the vehicle must drop-off that passenger. If the cost of dropping off that passenger results in a cost that exceeds the costs of an already existing solution to the routing problem, the vehicle routing system 1420 forgoes exploring anything downstream of the respective node (e.g., forgoes generating all or some of the graph downstream of the respective node). In some circumstances, eliminating portions of the state graph representation from exploration allows method 2600 to be completed more quickly. In some circumstances, eliminating portions of the state graph representation makes the use of a state graph representation practicable (e.g., fast enough to be performed with real-time requests), thus giving rise to the technical benefits of method 2600 more generally (e.g., conservation of resources, reduction of traffic, and increased passenger comfort and safety).

In some embodiments, the cost model includes (2622) pick-up wait times for the first passengers. In some embodiments, the cost model includes a cost of a passenger waiting for a vehicle and/or a cost of a passenger waiting in a vehicle (e.g., during the ride). In some embodiments, the passengers need not be human (e.g., may be parcels), and thus the cost model does not include a cost of a passenger waiting for a vehicle and/or a cost of a passenger waiting in a vehicle. Instead, for example, when the passengers are parcels, the cost model is weighted heavily toward an on-time delivery. In some embodiments, the passengers comprise a combination of human riders and parcels, the request identifies the passenger as either human or a parcel. When the passenger is human, the cost model includes a cost of the passenger waiting for a vehicle and/or a cost of the passenger waiting in a vehicle. When the passenger is not human, the cost model does not include a cost of the passenger waiting for a vehicle and/or a cost of the passenger waiting in a vehicle.

The vehicle routing server 1420 routes (2624) the fleet vehicles in accordance with the generated set of routes. In some embodiments, routing the fleet vehicles in accordance with the generated set of routes includes sending each vehicle's route to the vehicle. In some embodiments, routing the fleet vehicles in accordance with the generated set of routes includes sending the generated set of routes to the operator of the fleet vehicles. In some embodiments, routing the fleet vehicles in accordance with the generated routes includes routing a respective vehicle assigned to pick up a passenger to an assigned pick-up location for the passenger (e.g., either the requested pick-up location or a different pick-up location that is near the requested pick-up location). In some embodiments, routing the fleet vehicles includes routing the respective vehicle from the assigned pick-up location for the passenger to an assigned drop-off location (e.g., either the requested drop-off location or a different drop-off location that is near the requested drop-off location).

Operations 2626-2632 describe a method of inserting an additional passenger into the generated set of routes. Inserting an additional passenger into the generated set of routes allows the fleet routing problem to continue to be solved efficiently after the set of routes has already been generated, which conserves resources (e.g., cuts down on carbon emissions and/or battery usage from autonomous vehicles), reduces traffic, and increases passenger comfort and safety.

In some embodiments, the vehicle routing server 1420 receives (2626) a ride request from a second passenger, distinct from the plurality of first passengers. The request includes a requested pick-up location and a requested drop-off location for the second passenger. In some embodiments, the request from the second passenger is a dynamic request (e.g., a real-time request to be picked up and dropped-off as soon as possible). In some embodiments, the request from the second passenger is received after receiving the requests from the plurality of first passengers. In some embodiments, the request from the second passenger is received after the set of routes is generated. In some embodiments, the request from the second passenger is received while some or all of the vehicles are performing their respective routes (on their respective routes) of the set of generated routes.

In some embodiments, the vehicle routing server 1420 inserts the second passenger's request into the existing generated set of routes. To that end, in some embodiments, the vehicle routing server 1420 updates (2628) the route for a respective vehicle of the fleet vehicles, including assigning the second passenger to be picked up and dropped off by the respective vehicle, in accordance with one or more least-expensive-insertion criteria. For example, rather than performing the state graph search from scratch with a new cost model for the fleet vehicles, the first plurality of passengers, and the second passenger, the vehicle routing server 1420 determines which existing route is the least expensive route to insert the second passenger's request according to the new cost model for the fleet vehicles, the first plurality of passengers, and the second passenger. In some embodiments, as described below, a limited number (e.g., predefined number) of "trading" passengers is permitted (e.g., trading one passenger).

In some embodiments, updating the route for the respective vehicle of the fleet vehicles includes (2630) inserting a pick-up location and a drop-off location for the second passenger into an existing route for the respective vehicle without modifying pick-up and drop-off locations for passengers already assigned to the respective vehicle (e.g., but not yet picked up). In some embodiments, updating the route for the respective vehicle of the fleet vehicles includes (2632): inserting a pick-up location and a drop-off location for the second passenger into an existing route for the respective vehicle; and reassigning a passenger already assigned to the respective vehicle (e.g., but not yet picked up) to a different vehicle of the fleet vehicles (e.g., trading passengers).

In some embodiments, updating the route for a respective vehicle of the fleet vehicles, including assigning the second passenger to be picked up and dropped off by the respective vehicle, by: assigning the second passenger to an existing cluster (e.g., generated at operation 2618); and updating the route for the vehicle assigned to the existing cluster.

In some embodiments, because the complexity of the state graph representation goes up as more requests come in, updating the route for a respective vehicle of the fleet vehicles includes updating the state graph representation (e.g., such that the state graph representation is a representation of the plurality of first passengers and the second passenger, as well as the fleet of vehicles) and performing a graph search using at least a portion of the updated state graph representation.

It will also be understood that, although the terms "first," "second," etc. are, in some circumstances, used herein to describe various elements, these elements should not be limited by these terms. These terms are only used to distinguish one element from another. For example, a first vehicle could be termed a second vehicle, and, similarly, a second vehicle could be termed a first vehicle, which changing the meaning of the description, so long as all occurrences of the "first vehicle" are renamed consistently and all occurrences of the second vehicle are renamed consistently. The first vehicle and the second vehicle are both vehicles, but they are not the same vehicle (e.g., the second vehicle is an additional vehicle).

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" is, optionally, construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative embodiments. For purposes of explanation, numerous specific details were set forth in order to provide an understanding of various embodiments of the inventive subject matter. It will be evident, however, to those skilled in the art that embodiments of the subject matter are, optionally, practiced without these specific details. In general, well-known instruction instances, protocols, structures and techniques have not been shown in detail.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best use the embodiments and various embodiments with various modifications as are suited to the particular use contemplated.

What is claimed is:

1. A routing method for a ride-share transportation network, comprising:
    storing representations of a plurality of first passengers, wherein each of the representations of the plurality of first passengers includes a requested pick-up location and a requested drop-off location for a respective first passenger of the plurality of first passengers;
    storing representations of a plurality of fleet vehicles;
    generating a graph representation of a geographic map that includes the requested pick-up locations and drop-off locations for the plurality of first passengers;
    generating a state graph representation of the plurality of first passengers and the fleet vehicles, wherein:
        the state graph representation of the plurality of first passengers and the fleet vehicles is different from the graph representation of the geographic map;
        the state graph representation includes a plurality of nodes connected by edges;
        each node of the plurality of nodes of the state graph representation represents a candidate state of the plurality of first passengers and the fleet vehicles;
        a respective edge of the state graph representation represents an action of a respective vehicle picking up or dropping off a passenger, and
        the respective edge has a respective cost that is based at least in part on traversal of the graph representation of the geographic map;
    generating a set of routes for the fleet vehicles, including:
        performing a graph search of the state graph representation by evaluating a cost model that includes the costs of the respective edges;
        assigning each passenger of the plurality of first passengers to be picked up and dropped off by a respective vehicle of the fleet vehicles by selecting, based on the graph search, a subset of edges of the state graph representation, wherein the subset of edges is less than all edges; and
        generating the set of routes based on the assignment of the plurality of first passengers to the respective vehicles of the fleet of vehicles; and
    routing the fleet vehicles in accordance with the generated set of routes.

2. The method of claim 1, wherein the fleet vehicles include a plurality of autonomous vehicles.

3. The method of claim 1, wherein the plurality of fleet vehicles is operated by a single operator.

4. The method of claim 1, including,
    receiving a ride request from a second passenger, distinct from the plurality of first passengers, wherein the request includes a requested pick-up location and a requested drop-off location for the second passenger; and
    updating the route for a respective vehicle of the fleet vehicles, including assigning the second passenger to be picked up and dropped off by the respective vehicle, in accordance with one or more least-expensive-insertion criteria.

5. The method of claim 4, wherein updating the route for the respective vehicle of the fleet vehicles includes inserting a pick-up location and a drop-off location for the second passenger into an existing route for the respective vehicle without modifying pick-up and drop-off locations for passengers already assigned to the respective vehicle.

6. The method of claim 4, wherein updating the route for the respective vehicle of the fleet vehicles includes:
    inserting a pick-up location and a drop-off location for the second passenger into an existing route for the respective vehicle; and
    reassigning a passenger already assigned to the respective vehicle to a different vehicle of the fleet vehicles.

7. The method of claim 1, wherein generating the set of routes for the fleet vehicles includes:
    assigning each passenger of the first plurality of passengers to one or more candidate pick-up locations based on the first passenger's requested pick-up location;
    assigning each passenger of the first plurality of passengers to one or more candidate drop-off locations based on the first passenger's requested drop-off location;
    clustering the first plurality of passengers according to their assigned candidate pick-up locations and drop-off locations;
    assigning respective vehicles of the fleet vehicles to a plurality of clusters; and
    parallelizing the routing of the fleet vehicles according the assigned plurality of clusters for the respective vehicles of the fleet vehicles.

8. The method of claim 7, including:
    receiving a ride request from a second passenger, distinct from the plurality of first passengers, wherein the request includes a requested pick-up location and a requested drop-off location for the second passenger; and
    updating the route for a respective vehicle of the fleet vehicles, including assigning the second passenger to be picked up and dropped off by the respective vehicle, by:
        assigning the second passenger to an existing cluster; and
        updating the route for the vehicle assigned to the existing cluster.

9. The method of claim 1, wherein performing the graph search includes limiting a number of states explored in the state graph representation using a lowest-bound heuristic by forgoing subsequent exploration from any nodes in the state graph representation for which a lowest-bound of the cost function exceeds a cost of an already-determined set of routes for the fleet vehicles.

10. The method of claim 1, wherein the cost model includes pick-up wait times for the first passengers.

11. The method of claim 1, wherein the graph search is a bi-directional search.

12. A computer system, comprising:
    one or more processors; and
    memory storing one or more programs, the one or more programs storing instructions that, when executed by the one or more processors, cause the computer system to perform a set of operations, including:
        storing representations of a plurality of first passengers, wherein each of the representations of the plurality of first passengers includes a requested pick-up location and a requested drop-off location for a respective first passenger of the plurality of first passengers;

storing representations of a plurality of fleet vehicles;

generating a graph representation of a geographic map that includes the requested pick-up locations and drop-off locations for the plurality of first passengers;

generating a state graph representation of the plurality of first passengers and the fleet vehicles, wherein:

the state graph representation of the plurality of first passengers and the fleet vehicles is different from the graph representation of the geographic map;

the state graph representation includes a plurality of nodes connected by edges;

each node of the plurality of nodes of the state graph representation represents a candidate state of the plurality of first passengers and the fleet vehicles;

a respective edge of the state graph representation represents an action of a respective vehicle picking up or dropping off a passenger, and the respective edge has a respective cost that is based at least in part on traversal of the graph representation of the geographic map;

generating a set of routes for the fleet vehicles, including:

performing a graph search of the state graph representation by evaluating a cost model that includes the costs of the respective edges;

assigning each passenger of the plurality of first passengers to be picked up and dropped off by a respective vehicle of the fleet vehicles by selecting, based on the graph search, a subset of edges of the state graph representation, wherein the subset of edges is less than all edges; and generating the set of routes based on the assignment of the plurality of first passengers to the respective vehicles of the fleet of vehicles; and routing the fleet vehicles in accordance with the generated set of routes.

13. A non-transitory computer readable storage medium storing instructions that, when executed by a computer system having one or more processors, cause the computer system to perform a set of operations, including:

storing representations of a plurality of first passengers, wherein each of the representations of the plurality of first passengers includes a requested pick-up location and a requested drop-off location for a respective first passenger of the plurality of first passengers;

storing representations of a plurality of fleet vehicles;

generating a graph representation of a geographic map that includes the requested pick-up locations and drop-off locations for the plurality of first passengers;

generating a state graph representation of the plurality of first passengers and the fleet vehicles, wherein:

the state graph representation of the plurality of first passengers and the fleet vehicles is different from the graph representation of the geographic map;

the state graph representation includes a plurality of nodes connected by edges;

each node of the plurality of nodes of the state graph representation represents a candidate state of the plurality of first passengers and the fleet vehicles;

a respective edge of the state graph representation represents an action of a respective vehicle picking up or dropping off a passenger, and the respective edge has a respective cost that is based at least in part on traversal of the graph representation of the geographic map;

generating a set of routes for the fleet vehicles, including:

performing a graph search of the state graph representation by evaluating a cost model that includes the costs of the respective edges;

assigning each passenger of the plurality of first passengers to be picked up and dropped off by a respective vehicle of the fleet vehicles by selecting, based on the graph search, a subset of edges of the state graph representation, wherein the subset of edges is less than all edges; and generating the set of routes based on the assignment of the plurality of first passengers to the respective vehicles of the fleet of vehicles; and routing the fleet vehicles in accordance with the generated set of routes.

* * * * *